(12) United States Patent
Ermilov et al.

(10) Patent No.: US 9,977,573 B2
(45) Date of Patent: May 22, 2018

(54) FACILITATING INTERACTION BETWEEN USERS AND THEIR ENVIRONMENTS USING A HEADSET HAVING INPUT MECHANISMS

(71) Applicant: Microsoft Technology Licensing, LLC, Redmond, WA (US)

(72) Inventors: Andrei Stefan Ermilov, Reading (GB); Bradley Neville Cotier, London (GB); Catalin Nicolae Doroftei, Iasi (RO); Hani Nabil Chaaban, Bedford (GB); Jarnail Singh Chudge, Reading (GB); Matthew Robin Farmer, Fareham (GB); Michael James Belfield Parker, Farnborough (GB); Oscar James Francis Salandin, London (GB); Robert John Wilcox, Twyford (GB)

(73) Assignee: Microsoft Technology Licensing, LLC, Redmond, WA (US)

(*) Notice: Subject to any disclaimer, the term of this patent is extended or adjusted under 35 U.S.C. 154(b) by 86 days.

(21) Appl. No.: 14/690,422

(22) Filed: Apr. 19, 2015

(65) Prior Publication Data

US 2016/0124707 A1    May 5, 2016

Related U.S. Application Data

(60) Provisional application No. 62/073,762, filed on Oct. 31, 2014.

(51) Int. Cl.
*G06F 3/01*     (2006.01)
*G06F 3/0482*   (2013.01)
(Continued)

(52) U.S. Cl.
CPC .......... *G06F 3/0482* (2013.01); *G01C 21/00* (2013.01); *G01C 21/206* (2013.01);
(Continued)

(58) Field of Classification Search
CPC .......... G06F 3/011–3/012; G06F 3/016; G06F 3/167; H04S 7/304
(Continued)

(56) References Cited

U.S. PATENT DOCUMENTS 6,069,585 A    5/2000 Lanciaux
6,401,028 B1   6/2002 Kamiya et al.
(Continued)

FOREIGN PATENT DOCUMENTS

CN    201854394 U    6/2011
CN    102457791 A    5/2012
(Continued)

OTHER PUBLICATIONS

U.S. Appl. No. 62/073,762, titled "Tools for Facilitating Interaction between Users and their Environments," filed Oct. 31, 2014 by Miller et al., 165 pages.
(Continued)

*Primary Examiner* — Michael Pervan
(74) *Attorney, Agent, or Firm* — Rainier Patents, P.S.

(57) ABSTRACT

A headset is described herein for presenting audio information to the user as the user interacts with a space, e.g., as when a user navigates over a route within a space. The headset may include a set of input mechanisms for receiving commands from the user. The commands, in turn, invoke respective space-interaction-related functions to be performed by a space interaction (SI) module. The headset may operate with or without a separate user computing device.

21 Claims, 33 Drawing Sheets

(51) Int. Cl.

| | | |
|---|---|---|
| G06F 3/0488 | (2013.01) | |
| G06F 9/44 | (2018.01) | |
| G06F 3/16 | (2006.01) | |
| G06F 17/30 | (2006.01) | |
| G01C 21/20 | (2006.01) | |
| G06F 1/16 | (2006.01) | |
| G06F 3/0481 | (2013.01) | |
| G06Q 30/02 | (2012.01) | |
| G08G 1/00 | (2006.01) | |
| G06F 3/0346 | (2013.01) | |
| H04S 7/00 | (2006.01) | |
| G09B 21/00 | (2006.01) | |
| H04W 4/02 | (2018.01) | |
| G08G 1/0968 | (2006.01) | |
| G08G 1/005 | (2006.01) | |
| G08G 1/0962 | (2006.01) | |
| G01C 21/00 | (2006.01) | |
| H04R 27/00 | (2006.01) | |
| G01C 21/36 | (2006.01) | |
| H04R 1/10 | (2006.01) | |
| H04R 5/033 | (2006.01) | |

(52) U.S. Cl.
CPC ..... *G01C 21/3635* (2013.01); *G01C 21/3664* (2013.01); *G06F 1/163* (2013.01); *G06F 3/011* (2013.01); *G06F 3/012* (2013.01); *G06F 3/016* (2013.01); *G06F 3/0346* (2013.01); *G06F 3/0488* (2013.01); *G06F 3/04815* (2013.01); *G06F 3/04883* (2013.01); *G06F 3/04886* (2013.01); *G06F 3/167* (2013.01); *G06F 9/4445* (2013.01); *G06F 9/4446* (2013.01); *G06F 17/3087* (2013.01); *G06F 17/30528* (2013.01); *G06Q 30/0205* (2013.01); *G08G 1/00* (2013.01); *G08G 1/005* (2013.01); *G08G 1/0962* (2013.01); *G08G 1/0968* (2013.01); *G09B 21/006* (2013.01); *H04R 27/00* (2013.01); *H04S 7/304* (2013.01); *H04W 4/02* (2013.01); *H04W 4/021* (2013.01); *G01C 21/3629* (2013.01); *G06F 2203/014* (2013.01); *H04R 1/1041* (2013.01); *H04R 5/033* (2013.01); *H04S 2400/11* (2013.01); *H04S 2420/01* (2013.01)

(58) Field of Classification Search
USPC .......................................... 345/7–9, 156–178
See application file for complete search history.

(56) References Cited

U.S. PATENT DOCUMENTS

| | | | |
|---|---|---|---|
| 6,996,244 B1 | 2/2006 | Slaney et al. | |
| 6,999,066 B2 | 2/2006 | Litwiller | |
| 7,055,110 B2 | 5/2006 | Kupka | |
| 7,209,564 B2 | 4/2007 | Jin et al. | |
| 7,290,219 B2 | 10/2007 | Boyles et al. | |
| 7,386,279 B2 | 6/2008 | Wagner et al. | |
| 7,596,765 B2 | 9/2009 | Almas | |
| 7,912,225 B2 | 3/2011 | Chen | |
| 7,952,961 B2 | 5/2011 | Haque et al. | |
| 7,970,539 B2 | 6/2011 | Lee | |
| 8,028,239 B1 | 9/2011 | Al-Hilali et al. | |
| 8,140,258 B1 | 3/2012 | Dempsey | |
| 8,160,265 B2 | 4/2012 | Mao et al. | |
| 8,326,630 B2 | 12/2012 | Chandrasekar et al. | |
| 8,340,304 B2 | 12/2012 | Chun | |
| 8,787,584 B2 | 7/2014 | Nystrom et al. | |
| 9,467,515 B1 | 10/2016 | Penilla et al. | |
| 2001/0040590 A1 | 11/2001 | Abbott et al. | |
| 2003/0061001 A1 | 3/2003 | Willins et al. | |
| 2004/0030491 A1 | 2/2004 | Hull | |
| 2005/0099291 A1 | 5/2005 | Landau | |
| 2005/0108646 A1 | 5/2005 | Willins et al. | |
| 2007/0018890 A1 | 1/2007 | Kulyukin | |
| 2008/0163062 A1 | 7/2008 | Lee et al. | |
| 2009/0138151 A1 | 5/2009 | Smid | |
| 2010/0109864 A1 | 5/2010 | Haartsen et al. | |
| 2010/0120450 A1 | 5/2010 | Herz | |
| 2010/0306711 A1* | 12/2010 | Kahn ..................... G06F 3/017 715/863 |
| 2010/0317371 A1 | 12/2010 | Westerinen et al. | |
| 2012/0053826 A1 | 3/2012 | Slamka | |
| 2012/0077437 A1 | 3/2012 | Agevik | |
| 2012/0159401 A1 | 6/2012 | Pahud et al. | |
| 2012/0212484 A1 | 8/2012 | Haddick | |
| 2012/0258669 A1 | 10/2012 | Honkanen et al. | |
| 2012/0303266 A1 | 11/2012 | Su et al. | |
| 2013/0065584 A1 | 3/2013 | Lyon et al. | |
| 2013/0066548 A1 | 3/2013 | Gruen | |
| 2013/0154930 A1 | 6/2013 | Xiang | |
| 2013/0158856 A1 | 6/2013 | Xiang | |
| 2013/0225197 A1 | 8/2013 | Mcgregor et al. | |
| 2013/0303084 A1 | 11/2013 | Narendra | |
| 2013/0322634 A1 | 12/2013 | Bennett et al. | |
| 2013/0339850 A1* | 12/2013 | Hardi ...................... G06F 3/016 715/702 |
| 2014/0052681 A1 | 2/2014 | Nitz et al. | |
| 2014/0059460 A1 | 2/2014 | Ho | |
| 2014/0078086 A1 | 3/2014 | Bledsoe et al. | |
| 2014/0087752 A1 | 3/2014 | Zhu et al. | |
| 2014/0107916 A1 | 4/2014 | Urup et al. | |
| 2014/0133658 A1 | 5/2014 | Mentz et al. | |
| 2014/0164080 A1 | 6/2014 | Thompson, Jr. et al. | |
| 2014/0171039 A1 | 6/2014 | Bjontegard | |
| 2014/0185823 A1 | 7/2014 | Seligmann et al. | |
| 2014/0198918 A1 | 7/2014 | Li et al. | |
| 2014/0220883 A1 | 8/2014 | Emigh et al. | |
| 2014/0221017 A1 | 8/2014 | Jensen et al. | |
| 2014/0228044 A1 | 8/2014 | Jones et al. | |
| 2014/0258917 A1 | 9/2014 | Greif et al. | |
| 2014/0274127 A1 | 9/2014 | Beidel | |
| 2014/0282242 A1 | 9/2014 | Denoue et al. | |
| 2014/0287779 A1 | 9/2014 | O'Keefe et al. | |
| 2014/0289642 A1 | 9/2014 | Prasad | |
| 2014/0298268 A1 | 10/2014 | Kang et al. | |
| 2015/0046828 A1 | 2/2015 | Desai et al. | |
| 2015/0049080 A1* | 2/2015 | Purayil ................ H04L 67/2847 345/419 |
| 2015/0052436 A1 | 2/2015 | DiMaria et al. | |
| 2015/0058804 A1 | 2/2015 | Kim | |
| 2015/0063610 A1* | 3/2015 | Mossner ................ H04S 5/005 381/307 |
| 2015/0199020 A1 | 7/2015 | Hatada et al. | |
| 2015/0330787 A1 | 11/2015 | Cioffi | |
| 2016/0040996 A1 | 2/2016 | Skillman et al. | |
| 2016/0061621 A1 | 3/2016 | Hawkins et al. | |
| 2016/0062626 A1 | 3/2016 | Kubota et al. | |
| 2016/0077793 A1 | 3/2016 | Disano et al. | |
| 2016/0124588 A1 | 5/2016 | Cotier et al. | |
| 2016/0196057 A1 | 7/2016 | Choi et al. | |

FOREIGN PATENT DOCUMENTS

| | | |
|---|---|---|
| CN | 203523024 U | 4/2014 |
| EP | 1406150 A1 | 4/2004 |
| EP | 2249239 A1 | 11/2010 |
| EP | 2735845 A1 | 5/2014 |
| EP | 2746726 A1 | 6/2014 |
| GB | 2490479 A | 11/2012 |
| JP | 2011-234139 A | 11/2011 |
| WO | 95/04440 A1 | 2/1995 |
| WO | 98/08108 A1 | 2/1998 |
| WO | 2006/087709 A1 | 8/2006 |
| WO | 2006/115930 A2 | 11/2006 |

(56) References Cited

FOREIGN PATENT DOCUMENTS

WO   2007/147450 A1   12/2007
WO   2012/022361 A1   2/2012

OTHER PUBLICATIONS

International Search Report and Written Opinion mailed Feb. 5, 2016 from PCT Patent Application No. PCT/US2015/057684, 10 pages.
International Search Report and Written Opinion mailed Mar. 4, 2016 from PCT Patent Application No. PCT/US2015/057919, 11 pages.
International Search Report and Written Opinion mailed Mar. 17, 2016 from PCT Patent Application No. PCT/US2015/057683, 12 pages.
Response and Demand filed Apr. 29, 2016 to the International Search Report and Written Opinion mailed Feb. 5, 2016 from PCT Patent Application No. PCT/US2015/057684, 9 pages.
Non-Final Office Action mailed Apr. 18, 2016 from U.S. Appl. No. 14/690,423, 41 pages.
Response and Demand filed Apr. 29, 216 to the International Search Report and Written Opinion mailed Mar. 17, 2016 from PCT Patent Application No. PCT/US2015/057683, 22 pages.
Response and Demand filed Apr. 14, 2016 to the International Search Report and Written Opinion mailed Mar. 4, 2016 from PCT Patent Application No. PCT/US2015/057919, 10 pages.
Response and Demand filed Feb. 17, 2016 to the International Search Report and Written Opinion mailed Dec. 14, 2015 from PCT Patent Application No. PCT/US2015/057680, 25 pages.
Non-Final Office Action mailed Jul. 1, 2016 from U.S. Appl. No. 14/690,421, 38 pages.
Response filed Aug. 15, 2016 to the Non-Final Office Action mailed Apr. 18, 2016 from U.S. Appl. No. 14/690,423, 16 pages.
Response filed Aug. 18, 2016 to the Non-Final Office Action mailed Jul. 1, 2016 from U.S. Appl. No. 14/690,421, 12 pages.
Final Office Action mailed Oct. 25, 2016 from U.S. Appl. No. 14/690,423, 22 pages.
Response filed Nov. 23, 2016 to the Final Office Action mailed Oct. 25, 2016 from U.S. Appl. No. 14/690,423, 11 pages.
Final Office Action mailed Nov. 30, 2016 from U.S. Appl. No. 14/690,421, 27 pages.
Second Written Opinion mailed Oct. 11, 2016 from PCT Patent Application No. PCT/US2015/057919, 5 pages.
Wilson et al., "Swan: System for Wearable Audio Navigation", Proceedings of the 2007 11th IEEE International Symposium on Wearable Computers, Oct. 11, 2007, pp. 91-98, 8 pages.
Second Written Opinion mailed Dec. 2, 2016 from PCT Patent Application No. PCT/US2015/057680, 9 pages.
After Final Consideration Pilot Program Request and Response filed Dec. 21, 2016 to the Final Office Action mailed Nov. 30, 2016 from U.S. Appl. No. 14/690,421, 10 pages.
Second Written Opinion mailed Nov. 4, 2016 from PCT Patent Application No. PCT/US2015/057683, 8 pages.
Second Written Opinion mailed Nov. 25, 2016 from PCT Patent Application No. PCT/US2015/057684, 8 pages.
Notice of Allowance mailed Dec. 19, 2016 from U.S. Appl. No. 14/690,423, 12 pages.
Notice of Allowance and After Final Consideration Pilot Program Decision mailed Jan. 10, 2017 from U.S. Appl. No. 14/690,421, 6 pages.
"Google TV Design Patterns," available at <<https://developers.google.com/tv/android/docs/gtv_android_patterns>>, Google Developers, Google Inc., Mountain View, California, published on Jan. 28, 2012, 18 pages.
Kane, et al., "Slide Rule: Making Mobile Touch Screens Accessible to Blind People Using Multi-Touch Interaction Techniques," in Proceedings of the 10th International ACM SIGACCESS conference on Computers and Accessibility, Oct. 2008, 8 pages.
"Touch Exploration," available at <<https://support.google.com/accessibility/android/answer/6006598?hl=en>>, retrieved on Oct. 15, 2014, Google Inc., Mountain View, California, 3 pages.
Fohl, et al., "A System-On-Chip Platform for HRTF-Based Realtime Spatial Audio Rendering," in Proceedings of the Second International Conference on Creative Content Technologies, Nov. 2010, 6 pages.
Loomis, et al., "Navigation System for the Blind: Auditory Display Modes and Guidance," in Presence, vol. 7, No. 2, Apr. 1998, 11 pages.
Inoue, et al., "Indoor Emergency Evacuation Service on Autonomous Navigation System using Mobile Phone," in Proceedings of the Second International Symposium on Universal Communication, Dec. 2008, 7 pages.
"Insiteo First to announce Bluetooth 4.0 indoor location on Android," available at <<http://www.insiteo.com/joomla/index.php/en/latest-news/185-insiteo-first-to-announce-bluetooth-40-indoor-location-onandroid-2>>, published on Aug. 29, 2013, 3 pages.
Kim, Eric, "DeepBLE—Localized Navigation using Low Energy Bluetooth," available at <<http://www.seas.upenn.edu/~cse400/CSE400_2013_2014/reports/18_report.pdf, retrieved on Oct. 20, 2014, 7 pages.
Belloni, Fabio, "Bringing Navigation Indoors," available at <<http://geta.aalto.fi/en/courses/
bringing_navigation_indoors_pdf>>, Nokia Research Center, Espoo, Uusimaa, Finland, 2012, 41 pages.
"The Next Big Thing—Indoor Location Beacon Tag & Solutions," available at <<https://www.sticknfind.com/indoornavigation.aspx>>, retrieved on Oct. 20, 2014, Stick-N-Find Inc., Fort Lauderdale, Florida, 1 page.
"Bluetooth Low Energy solution released," available at <<http://indoo.rs/bluetooth-low-energy-solution-released/>>, published on Nov. 27, 2013, 3 pages.
Chawathe, Sudarshan S., "Low-Latency Indoor Localization Using Bluetooth Beacons," in Proceedings of 12th International IEEE Conference on Intelligent Transportation Systems, Oct. 2009, 7 pages.
"Motorola HC1 Headset Computer," available at <<http://www.motorolasolutions.com/web/Business/Products/Mobile
%20Computers/Wearable%20Computers/HC1/
HC1_HeadsetSpec_Final.pdf.pdf>>, Specification Sheet, Motorola, Inc., Schaumburg, Illinois, retrieved Oct. 2014, 2 pages.
Davies, Chris, "This is Microsoft HoloLens," available at <<http://www.slashgear.com/this-is-microsoft-hololens-21365621/>>, Slash Gear, Jan. 21, 2015, 10 pages.
"Bone Conduction Technology," available at <<http://www.aftershokz.com/technology/>>, AFTERSHOKZ, LLC, Syracuse, NY, accessed on Feb. 16, 2015, 5 pages.
"Products," available at <<http://www.aftershokz.com/products/>>, AFTERSHOKZ, LLC., Syracuse, NY, accessed on Feb. 16, 2015, 9 pages.
Cotier, et al., "User Interface Functionality for Facilitating Interaction between Users and their Environments," U.S. Appl. No. 14/690,420, filed Apr. 19, 162 pages.
Cotier, et al., "Use of Beacons for Assistance to Users in Interacting with their Environments," U.S. Appl. No. 14/690,421, filed Apr. 19, 160 pages.
Miller, et al., "Facilitating Interaction between Users and their Environments Using Sounds," U.S. Appl. No. 14/690,423, filed Apr. 19, 160 pages.
International Search Report and Written Opinion mailed Dec. 14, 2015 from PCT Patent Application No. PCT/US2015/057680, 12 pages.
Non-Final Office Action mailed Apr. 20, 2017 from U.S. Appl. No. 14/690,420, 90 pages.
Supplemental Notice of Allowability mailed Mar. 3, 2017 from U.S. Appl. No. 14/690,421, 19 pages.
Supplemental Notice of Allowability mailed Apr. 14, 2017 from U.S. Appl. No. 14/690,421, 10 pages.
Corrected Notice of Allowability mailed Mar. 1, 2017 from U.S. Appl. No. 14/690,423, 10 pages.

(56) References Cited

OTHER PUBLICATIONS

International Preliminary Report on Patentability mailed Jan. 30, 2017 from PCT Patent Application No. PCT/US2015/057680, 10 pages.
International Preliminary Report on Patentability mailed Feb. 3, 2017 from PCT Patent Application No. PCT/US2015/057683, 9 pages.
International Preliminary Report on Patentability mailed Feb. 15, 2017 from PCT Patent Application No. PCT/US2015/057684, 9 pages.
Corrected Notice of Allowability mailed Jan. 20, 2017 from U.S. Appl. No. 14/690,423, 10 pages.
Corrected Notice of Allowability mailed Jan. 31, 2017 from U.S. Appl. No. 14/690,423, 10 pages.
International Preliminary Report on Patentability mailed Jan. 9, 2017 from PCT Patent Application No. PCT/US2015/057919, 6 pages.
Response filed Jul. 20, 2017 to the Non-Final Office Action dated Apr. 20, 2017 from U.S. Appl. No. 14/690,420, 12 pages.
Response filed Jul. 18, 2017 to the Communication pursuant to Rules 161(1) and 162 EPC dated Jun. 8, 2017 from European Patent Application No. 15795264.9, 17 pages.
Response filed Jul. 11, 2017 to the Communication pursuant to Rules 161(1) and 162 EPC dated Jun. 8, 2017 from European Patent Application No. 15797203.5, 15 pages.
Response filed Jul. 12, 2017 to the Communication pursuant to Rules 161(1) and 162 EPC dated Jun. 8, 2017 from European Patent Application No. 15804243.2, 14 pages.
Communication pursuant to Rules 161(1) and 162 EPC dated Jun. 8, 2017 from European Patent Application No. 15791454.0, 2 pages.
Communication pursuant to Rules 161(1) and 162 EPC dated Jun. 8, 2017 from European Patent Application No. 15795264.9, 2 pages.
Communication pursuant to Rules 161(1) and 162 EPC dated Jun. 8, 2017 from European Patent Application No. 15804243.2, 2 pages.
Communication pursuant to Rules 161(1) and 162 EPC dated Jun. 8, 2017 from European Patent Application No. 15797203.5, 2 pages.
Applicant-Initiated Interview Summary dated Aug. 3, 2017 from U.S. Appl. No. 14/690,420, 3 pages.
Response filed Aug. 22, 2017 to the Communication pursuant to Rules 161(1) and 162 EPC dated Jun. 8, 2017 from European Patent Application No. 15791454.0, 10 pages.
Final Office Action dated Sep. 11, 2017 from U.S. Appl. No. 14/690,420, 27 pages.

\* cited by examiner

EXAMPLE OF DEFAULT MENU IN
THE HOME WORKSPACE

EXAMPLE OF A CONTEXT MENU
IN THE HOME WORKSPACE

EXAMPLE OF OTHER CONTEXT INFORMATION
IN THE HOME WORKSPACE

EXAMPLE OF A TABS MENU IN
THE HOME WORKSPACE

EXAMPLE OF A MENU IN THE
MAIN WORKSPACE

EXAMPLE OF A MENU IN THE
SETTINGS WORKSPACE

EXAMPLE OF A MENU IN THE
INFORMATION WORKSPACE

EXAMPLE OF A MENU IN THE
"NEARBY ME" WORKSPACE

EXAMPLE OF A TRANSIENT MENU IN
THE HOME WORKSPACE

EXAMPLE OF AN OVERLAY TRANSIENT
MENU IN THE SETTINGS WORKSPACE

TABS PAGE, WITH NO ACTIVE TABS

TABS MENU, WHEN THERE ARE ACTIVE TABS

GESTURE: MOVE FINGER DOWN
USING A PANNING GESTURE

RESPONSE: SCROLL DOWN
THROUGH THE LIST

GESTURE: MOVE FINGER TO
THE EDGE AND RELEASE

RESPONSE: PERFORM
SELECTED ACTION

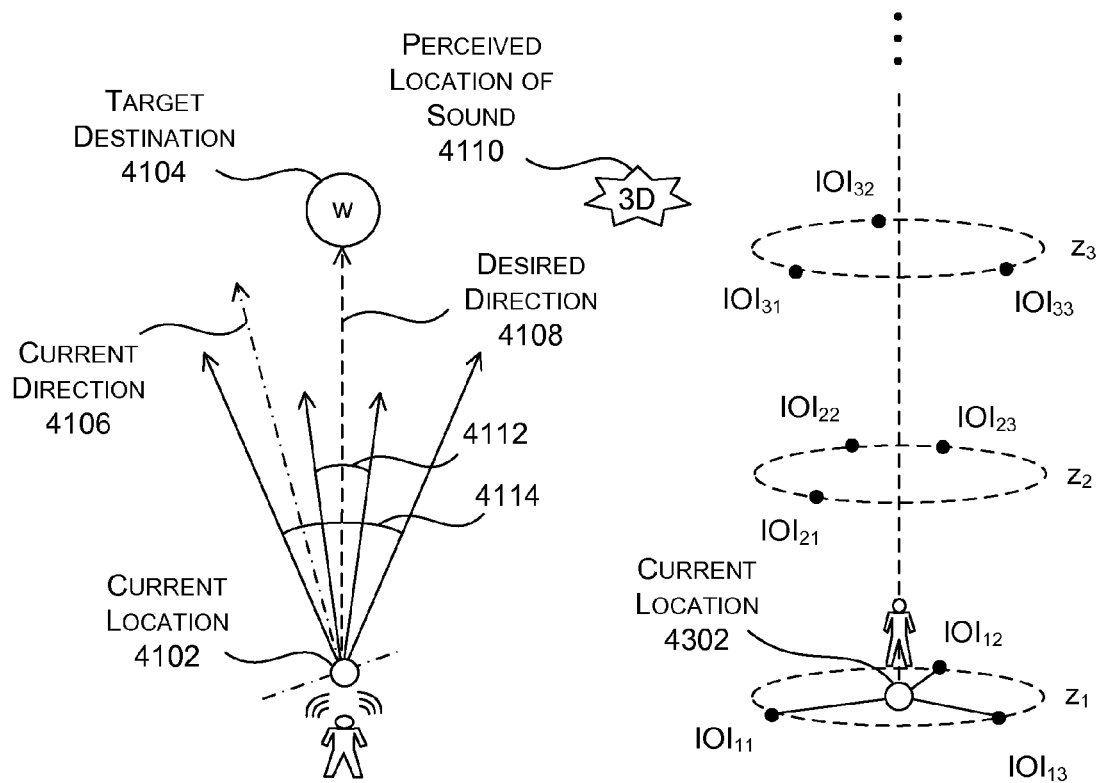
FIG. 41
FIG. 43
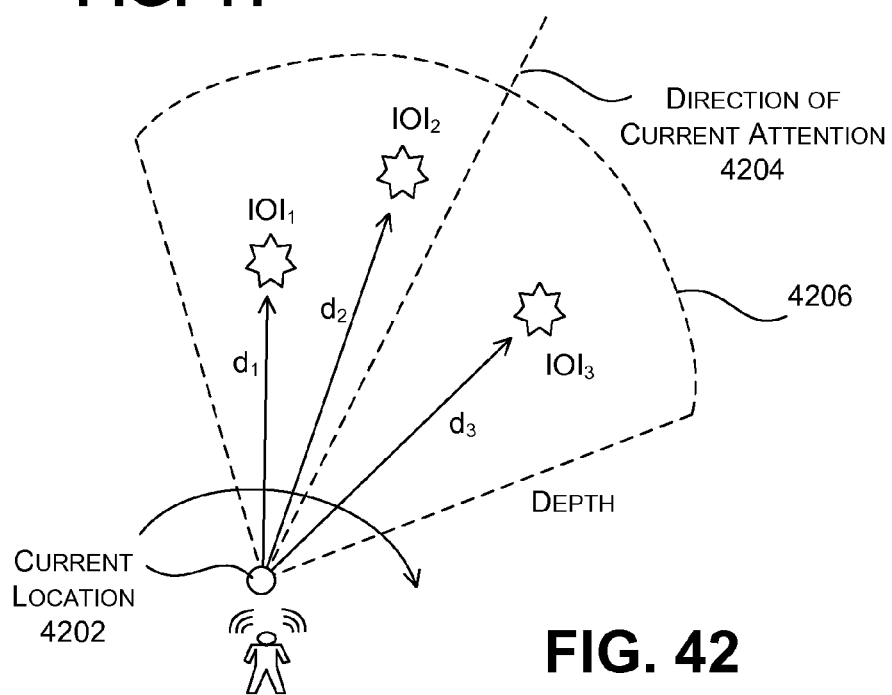
FIG. 42

FACILITATING INTERACTION BETWEEN USERS AND THEIR ENVIRONMENTS USING A HEADSET HAVING INPUT MECHANISMS

This application claims the benefit of U.S. Provisional Application No. 62/073,762 (the '762 application), filed Oct. 31, 2014. The '762 application is incorporated by reference herein in its entirety

BACKGROUND

A user may rely on various conventional mechanisms in generating and executing travel plans and/or in exploring his or her environment in a more spontaneous and unconstrained manner. For example, a user may use a route selection application to generate a route for use in traveling between two locations. That same application may then guide the user as the user travels over the route through a series of prompts. The prompts may correspond to spoken and/or displayed messages, such as a message that verbally instructs the user to make a turn within a prescribed distance. There is nevertheless considerable room for improvement in these conventional mechanisms.

SUMMARY

Various tools are described herein for assisting a user in interacting with physical and/or virtual spaces. Such assistance, for example, may facilitate a user's navigation within the physical and/or virtual spaces. As used herein, navigation refers a user's purposeful movement through a space according to a predetermined plan, and/or movement that may reflect spontaneous decisions that do not necessarily conform to any predetermined plan. The tools may also assist a user's exploration within a space at any given moment in time, e.g., corresponding to a process by which the user orients himself or herself in the space.

As a general principle, the tools are designed to provide highly informative and timely assistance to the user in a user-friendly manner, thereby enriching the user's experience of the physical and virtual spaces through which the user moves, but without unduly distracting the user from the actual task of interacting with the spaces. In view of these characteristics, the tools may be successfully used even by users with vision impairments and/or other handicaps. However, the tools are general-purpose in nature, and thus may provide user-friendly and unobtrusive guidance to any user in performing any task in which the user interacts within his or her environment.

The tools have various aspects which contribute to the above-summarized performance. According to one aspect, a headset is described herein for presenting audio information to the user as the user interacts with the space. The headset may also include a set of input mechanisms for receiving commands from the user. The commands, in turn, invoke respective space-interaction-related functions to be performed by a space interaction (SI) module.

For instance, commands may instruct the SI module to: stop delivering the audio information; repeat a last-delivered item of audio information; repeat a set of last-delivered items of audio information (e.g., by "rewinding"); start an explore mode; start an orientation mode; perform a more-information function (to request additional information); start or stop a listening mode (in which voice recognition is enabled and disabled, respectively), and so on. In the explore mode, the space interaction module provides information regarding a set of items of interest that are associated with a subspace to which attention of the user is currently directed. In the orientation mode, the space interaction module provides information regarding a set of items of interest that are associated with an entire space round the user, at a current time.

In one implementation, the headset may include its own orientation, motion, and/or position determination mechanism(s) (e.g., a compass). In another implementation, the headset relies on a separate orientation, motion, and/or position determination mechanism(s) provided by a separate user device (e.g., a smartphone).

In one implementation, a system implements the SI module using processing resources associated with the headset alone. In another implementation, the system implements the SI module using processing resources associated with the separate user computing device alone. In other implementations, the functions performed by the SI module may be shared by any of the headset, and/or the user computing device, and/or one or more remote processing resources (e.g., "cloud-implemented" services).

The above features contribute to the above goal of allowing the user to safely and efficiently move through his or her environment. For instance, the features provide a convenient way by which the user may activate various operational modes (e.g., by interacting with the user input mechanisms of the headset) without unduly distracting the user as the user moves through the environment, e.g., without requiring the user to access and interact with a separate user device.

The above approach can be manifested in various types of systems, devices, components, methods, computer readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 41 demonstrates a manner in which a path guidance module can use three-dimensional sounds (e.g., a periodic beat sound) to guide the user in a desired direction.

FIG. 42 demonstrates a manner in which an exploration module can use three-dimensional sounds to identify locations of IOIs that are associated with a current focus of interest of the user.

FIG. 43 demonstrates a manner in which an orientation module can use three-dimensional sounds to identify IOIs that are associated with an entire space around the user.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A provides an overview of a system for assisting a user in interacting with a real and/or virtual space. Section B describes different types of headset and handheld user computing devices that can be used in the system of Section A. Section C describes an illustrative user interface experience that may be provided by the system of Section A. Section D describes functionality for generating and using three-dimensional sounds, and other (non-three-dimensional) types of sounds. Section E describes beacon-based guidance functionality for assisting the user in navigating through an environment that is populated with beacons having, in one illustrative implementation, non-overlapping ranges. And Section F describes illustrative computing functionality that can be used to implement any aspect of the features described in the previous sections.

Figure 53:
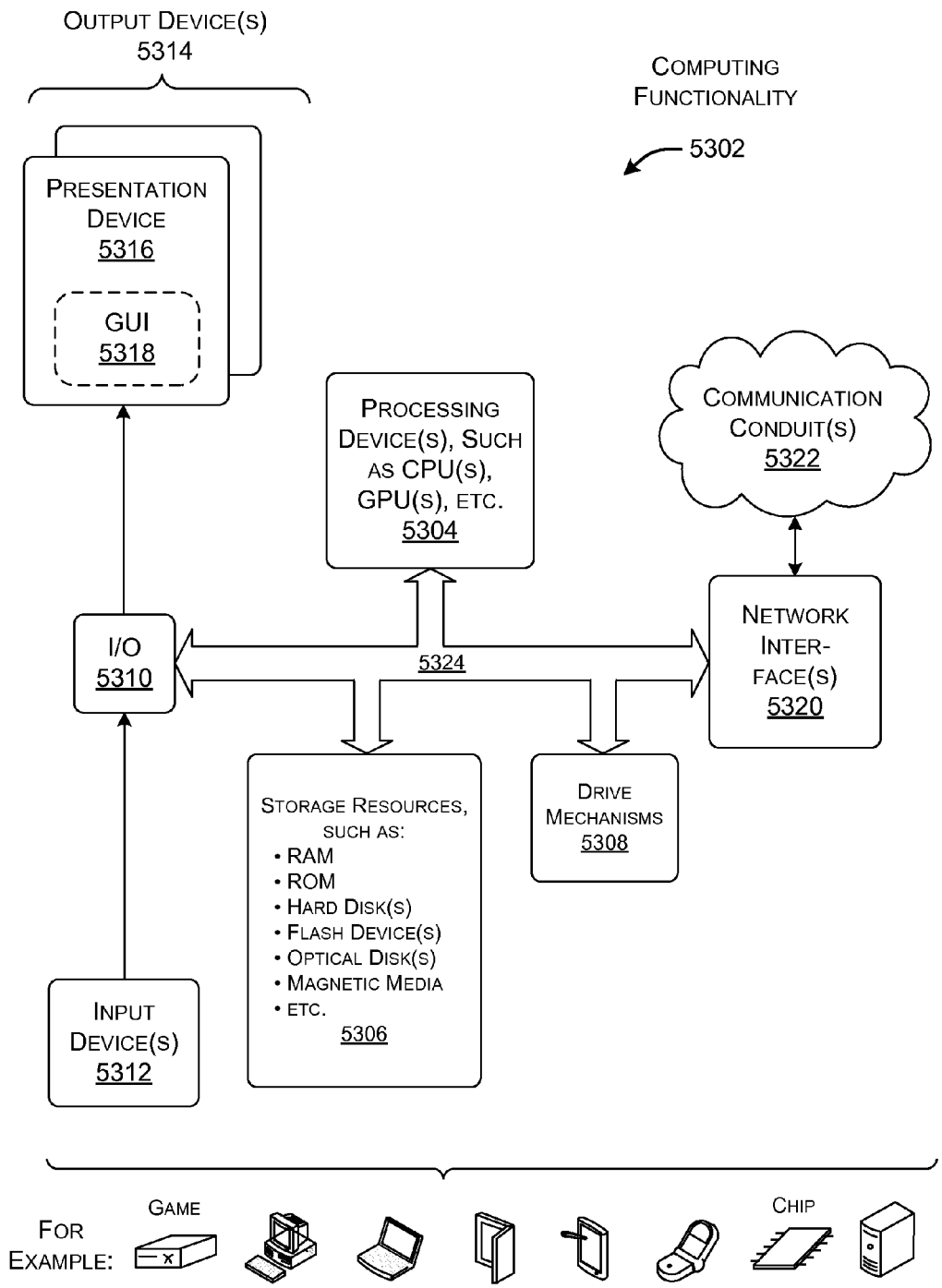
FIG. 53 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software running on computer equipment, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 53, to be described in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Overview of the System

Figure 1:
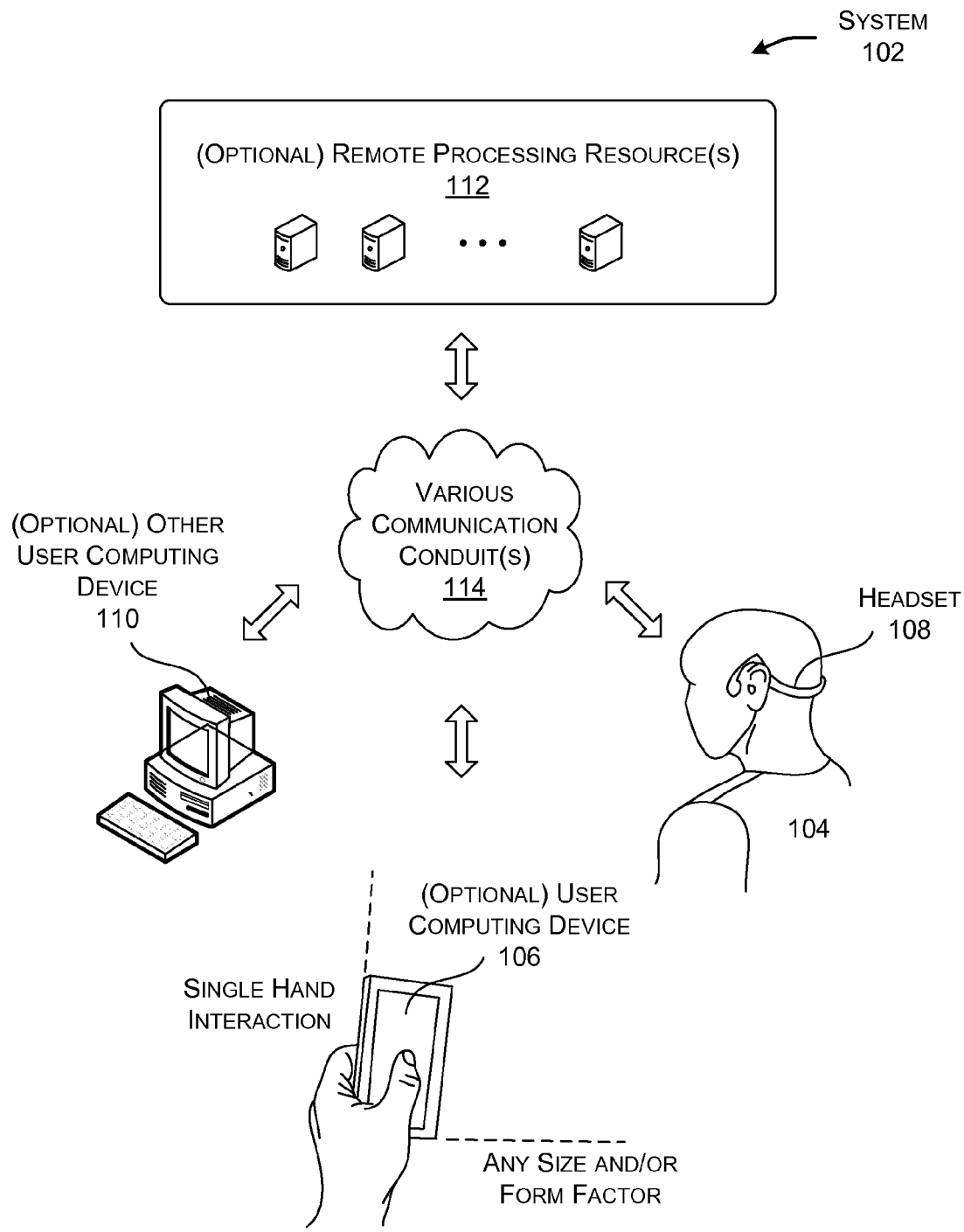
FIG. 1 shows an overview of a system for assisting a user in interacting with a physical and/or virtual space.

FIG. 1 shows an overview of a system 102 for assisting a user 104 in interacting with a physical and/or virtual space. A physical space may correspond, for example, an indoor space defined by the interior of one or more buildings, or to an exterior space that exist outside of the interior of buildings, or to some combination of indoor and outdoor spaces. A virtual space may correspond, for example, to a domain that is populated with virtual objects of any type or types. In some scenarios, a virtual space may be overlaid on a physical space through which the user may physically move. In those cases, some virtual objects in the virtual space may be assigned corresponding real positions in the physical space (to be clarified below).

FIG. 1 broadly introduces illustrative components that may be used in the system 102. The components are optional in the sense that a particular implementation of the system 102 may omit one or more of the illustrated components. In addition, or alternatively, a particular implementation of the system 102 may include additional components that are not shown in FIG. 1.

During his or her exploration of the space(s), the user 104 may interact with the system 102 via a user computing device 106 of any type (referred to as a simply a "user device" for brevity below) and a headset 108, or just the headset 108 alone. The user device 106 may correspond to any type of portable computing device having any form factor. For example, the user device 106 may correspond to a smartphone, a tablet-type computing device, a laptop computing device, a netbook-type computing device, a media consumption device (such as a book reader-type computing device or a music-playing computing device), a portable game device, a wearable computing device (such as eyewear, goggles, etc.), and so on. In other cases (not shown), a user 104 may carry and utilize two or more user computing devices, such as a smartphone in combination with a tablet-type computing device.

The headset 108 may likewise correspond to any type of device for delivering audio information to the user 104. In one case, for example, the headset 108 may deliver audio information using conventional speakers positioned over, or in proximity to, one or more ears of the user 104. In another case, the headset 108 may deliver audio information using a bone conduction technique. In a bone conduction technique, the headset 108 passes information to the user's eardrums via vibrations imparted to the bones of the user's head. A headset that uses bone conduction may not block the ear canals of the user 104, and thus allows the user 104 to hear other (exterior) sounds produced by the spaces through which he or she navigates; this outcome may be desirable, in some cases, to increase the safety with which users interact with their physical environments, particularly for the case of sight-impaired users and the case of users who are unfamiliar with their surroundings.

According to one general manner of use, the user 104 may interact with the user device 106 to receive information regarding his or her interaction with a space in primarily visual form. In addition, or alternatively, the user device 106 can deliver information in non-visual forms, such as by producing haptic feedback cues (e.g., vibration-based cues). The user 104 may primarily interact with the headset 108 to receive audio information regarding his or her interaction with a space. That audio information may include spoken information, other sounds, etc. The system 102 may also receive instructions from either the user device 106 or the headset 108, or both.

The user 104 may also optionally interact with the system 102 via one or more traditionally stationary computing devices 110, such as a desktop computing device, a game console device, a set-top box device, and so on. For example, the user 104 may interact with the system 102 using the other user computing device 110 prior to a journey to create journey information that defines a particular route through a space. The user 104 may then load that journey information on the user device 106 and/or the headset 108. Following the journey, the user 104 may again interact with the system 102 via the other user computing device 110. For example, the system 102 may download information regarding a completed journey to the other user computing device 110, allowing the user 104 to review information regarding that journey at any time, for any purpose.

In one case, all functions associated with the system 102 are performed by processing functionality provided by the above-identified components, namely, the user device 106, the headset 108, and the other user computing device 110. In another case, one or more remote processing resources 112 may implement at least some aspects of the processing performed by the system 102, such as those aspects which are particularly computation-intensive in nature. For example, the remote processing resources 112 may include functionality for creating new journeys, modifying existing journeys, interpreting the user's spoken instructions, and so on. In one case, the remote processing resources 112 may correspond to one or more server computing devices, one or more data stores, and so on.

The system 102 may use any combination of communication conduits 114 to couple the above-described components together. For example, the user device 106 may interact with the headset 108 via any wireless communication mechanism (e.g., using BLUETOOTH communication), and or any hardwired communication mechanism (e.g., via a USB connection, etc.). The user device 106 and the headset 108 may communicate with remote components of the system 102 via a cellular connection, a Wi-Fi connection, a hardwired connection, etc., or any combination thereof.

Further, although not shown, the user device 106 may interact with any remote position-determination systems for the purpose of determining the position of the user device 106. The headset 108 may perform the same function. The remote position-determination mechanisms may correspond to any satellite-based position-determination system (e.g., a GPS system), terrestrial communication towers, and so on. Still further, the user device 106 and/or the headset 108 may also interact with local beacons through any communication mechanism (e.g., via BLUETOOTH communication, Wi-Fi communication, etc.).

The remainder of this section (Section A) provides an overview of the functionality provided by the system 102. Later sections provide additional details regarding individual components of the system.

In general, a user may use the system 102 as a way of enriching the user's experience as the user moves through any type of space, familiar or unfamiliar. In one scenario, for instance, the user may use the system 102 as a guide in conducting a planned journey from a source location to a target location, subject to a desired timetable. In other cases, the user may use the system 102 to provide assistance in exploring a space in a more open-ended and spontaneous manner, e.g., without a preplanned journey and/or timetable. For example, a user may use the system 102 to provide assistance as he or she wanders through an unfamiliar city, or meanders past the exhibits of a fair or museum; the user may engage in this activity with no fixed itinerary, and may alter his or her journey's course and objectives in a free-form and spontaneous manner. In yet another case, the user may use the system 102 as a way of enlivening a familiar route through a familiar environment, and so on. In yet another case, a user may use the system in a hybrid manner of operation, e.g., in which some aspects of the user's interaction conform to a prepared plan and other aspects are more open-ended and spontaneous in nature.

Figure 2:
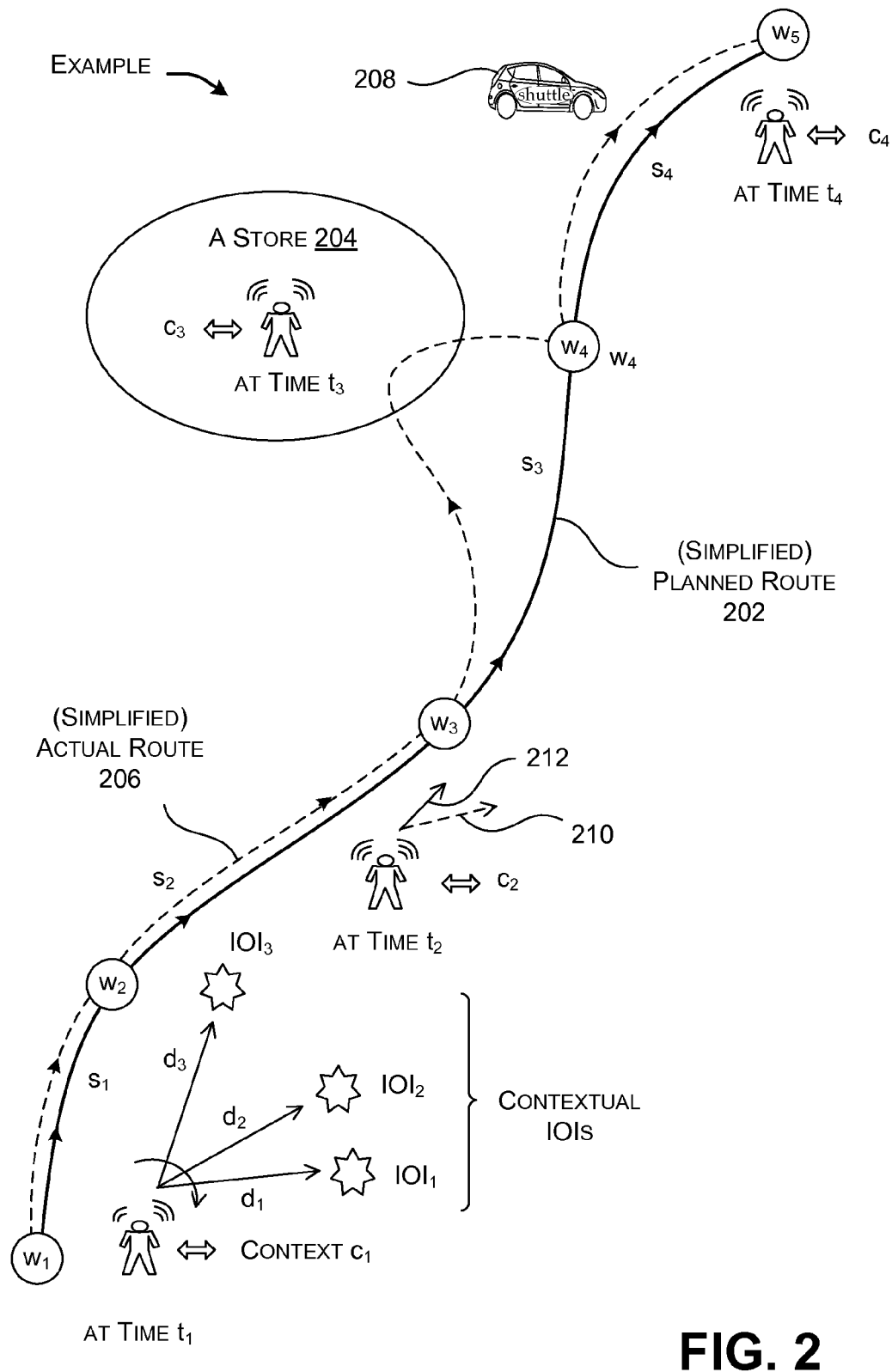
FIG. 2 shows an example in which the user uses the system of FIG. 1 to take a journey that is defined by plural waypoints. In other cases, the user may use the system to interact with an environment in a more open-ended and spontaneous manner.

Advancing to FIG. 2, this figure shows one example in which a user uses the system 102 of FIG. 1 to take a preplanned journey. The user's illustrative experience in conducting this journey will be described below, as a way of introducing the reader to the types of functions that the system 102 may perform. Note that this example experience is presented in the spirit of illustration, not limitation; as noted above, the system 102 can be applied in a wide variety of other contexts in which a user interacts with his or her environment, for any purpose.

In the non-limiting case of FIG. 2, assume that the user (a man named John) has created a journey prior to embarking on the journey (although, again, this need not be the case). For example, assume that the user has created a route to take him from his residence in London to a doctor's appointment in another part of the city. The user may have created a journey for this task because he is unfamiliar with the part of the city over which he is to travel. Or the user may have one or more handicaps which present various mobility-related challenges. For example, the user may have any form (and degree) of vision impairment. In this context, the user may have created the journey to assist him in navigating the route, even though he may be familiar with the route. In another case, some entity other than the user may have created the journey on behalf of the user. In these cases, the planned journey is defined by journey information, which describes all aspects of the journey.

FIG. 2 specifically represents the planned route 202 of the journey as a solid line. In some cases, the user may use the system 102 to generally adhere to the planned route 202. In other cases, the user may diverge from the planned route 202 for any reason, e.g., because he encounters an obstacle along the planned route 202, or he makes a spontaneous decision to change the course of his travel for any reason. For example, in this merely illustrative case, the user has departed from the planned route 202 for the purpose of visiting a store 204 along the way, to purchase some item (e.g., a sandwich, etc.). FIG. 2 represents the actual route 206 of the user as a dashed line.

The planned route 202 in the illustrated case of FIG. 2 is defined by a series of transitional points ($w_1$, $w_2$, $w_3$, $w_4$, and $w_5$) or stations, referred to as waypoints herein. For example, the waypoint $w_1$ may correspond to the starting point of the user's journey, while the waypoint $w_5$ may correspond to the destination of the user's journey. The waypoints $w_2$ and $w_3$ may correspond to two intersections; at each such intersection, the user transitions from a first road to a second road. The waypoint $w_4$ may correspond to any station at which a user may change his mode of transportation. For example, the user may travel to waypoint $w_4$ on foot. The waypoint $w_4$ may correspond to a shuttle station at which the user waits for the arrival of a shuttle 208, which arrives per a predetermined schedule. The user may then continue to the waypoint $w_5$ on the shuttle 208. In other cases, the mode of transportation may correspond to a train, subway bus, tram, or any mode of private transportation (e.g., private automobile, bicycle, etc.).

Hence, the planned route may be conceptualized as having a series of segments ($s_1$, $s_2$, $s_3$, and $s_4$). The example of FIG. 2 is a simplified case. In other cases, a journey may include many more waypoints and associated segments. And that journey may encompass any combination of modes of transportation. In yet other cases, a journey may be less complex than the one shown in FIG. 2, e.g., including only a beginning and ending waypoint. And, to repeat, in other cases, the journey may not be defined in advance.

A context, as the term is used herein, generally refers to the circumstance that confronts a user at any given time while conducting the journey or otherwise interacting with the environment. The circumstance, in turn, is governed by at least features of the environment with which the user may wish to interact, the current time of day (and day of week), etc., and the goals that confront the user at the current time, etc. For example, at a time $t_1$, the user is traversing the segment $s_1$ in an attempt to travel from the waypoint $w_1$ to the waypoint $w_2$. The context $c_1$ of the user's journey is therefore defined, at least in part, by the user's current location along the planned journey, and the user's effort to reach the waypoint $w_2$ over the planned segment $s_2$. The user's context at other times will differ depending on the environment that confronts the user at those times, coupled with the users' respective local goals at that time.

With the above preliminary description of the planned route 202 and the actual route 206, now consider an illustrative user experience as the user travels from waypoint $w_1$ to waypoint $w_5$. Assume, in one example, that the user carries at least the user device 106, and wears the headset 108 (shown in FIG. 1). The user device 106 is referred to below as a smartphone to simplify reference to this device, although the user device 106 can include any type of device mentioned above with reference to FIG. 1. In yet other cases, the user may navigate with just the use of the headset 108 (that is, by eliminating the use of the smartphone).

As a general principle, the system 102 exposes the user to relevant information at appropriate junctures along the path of the user, as the user conducts his journey or otherwise interacts with the space. Instances of the information that may be automatically presented to the user in audible, visual, and/or haptic form are referred to herein as items of interest (IOIs). To perform this function, the system 102 determines the current context of the user at each moment of time. For instance, the system 102 senses the location and orientation (and optionally, the motion) of the user at each particular time. The system 102 can use any technology or combination of technologies to perform this task, examples of which are provided below in the context of the description of FIG. 3. The system 102 then identifies IOIs that are relevant to the user's current context. In some cases, for instance, the system 102 can determine that an IOI is relevant to the user's current context because the user is within a prescribed distance of a physical object (or region) that is associated with the IOI, where that distance is defined and stored in advance. The system 102 then delivers information regarding those IOIs to the user. As will be described in greater detail below, the user can also manually explore future contexts with which he will (or may) be confronted, at later times in the journey, allowing the user to prepare for those situations.

The system 102 can provide the IOIs based on information extracted from various sources. For instance, the system 102 can determine the locations of roads, natural features, etc. from publically-available map information (such as map information provided by the BING map service provided by MICROSOFT Corporation of Redmond, Wash.). The system 102 can determine the locations of public and private entities (e.g., stores, government buildings, etc.) from any published directory information. The system 102 can determine the occurrence of relevant events from various published sources, such as public transportation schedule information, public safety information. The system 102 can determine user-related information from various services, such as one or more online social networking applications, one or more calendar applications, etc., and so on.

Each IOI pertains to a particular topic or experiential focus. The IOIs can be categorized in different ways, along different explanatory dimensions. For instance, IOIs of a first class directly map to physical objects or physical events in the space through which the user is moving or otherwise interacting. For example, an IOI of this type may correspond to a store that lies in proximity to the user, or an open manhole that lies in front of the user, or a next waypoint that the user is within a prescribed distance of reaching, etc. IOIs of a second class of IOIs do not necessarily have a direct physical counterpart in the environment. For example, an IOI of this type may correspond to an advertisement that plays when the user approaches a bus stop. The advertisement may be associated with a space around the bus stop, but otherwise is not a description of the bus stop per se.

Another "virtual-type" IOI may correspond to a news headline that is brought to the user's attention as he approaches a coffee stand. The system 102 may present information regarding that IOI to the user based on the premise that a user may wish to consume that IOI while drinking a cup of coffee. Another virtual-type IOI may correspond to a weather report that is delivered to the user as the user leaves a subway station. The system 102 may present information regarding that IOI to the user based on the premise that the user may wish to prepare for the weather which he is about to confront upon leaving the station. Another virtual-type IOI may correspond to a message retrieved from a social network application as the user approaches his or her personal residence. The system 102 may present information regarding that IOI to the user based on the premise that the user may wish to catch up on any messages sent by family members or friends, prior to entering his home. Many other scenarios are envisioned in which the user receives some type of information (and/or opportunity to interact with functionality) that is germane to the user's present circumstance, yet might not serve to describe an actual object or event in the user's immediate vicinity.

Different IOIs (of either the first "real" class or second "virtual" class described above) can also be categorized based on their roles that they serve in the exploration of space. For example, the IOIs may be classified along this dimension as warning IOIs, journey IOIs, contextual IOIs, and available-information IOIs, etc. (although such categories may not be, strictly speaking, mutually exclusive). The system 102 sends information regarding warning IOIs to alert the user to occurrences that may affect the safety of the user during the journey (such as an indication that there is an open manhole in front of the user). Warning messages are sharp and to the point. The system 102 sends information regarding journey IOIs to alert the user to occurrences that may affect the progress of the user's journey (such as an indication that a next waypoint is approaching, or that a bus will be late). The system 102 sends information regarding contextual IOIs to the user to alert the user to objects and events in the vicinity of the user (whether real or virtual) that may interest the user (such as an indication that a coffee shop is ahead of the user on his journey). The system 102 alerts the user to the existence of available-information IOIs, without automatically delivering them. A user may then choose to receive this information in an on-demand manner, or ignore it. For example, a user may access the available-information by tapping on an appropriate function button on the headset 108 or through an information menu provided by the user device 106, or using the equivalent voice command.

The system can deliver information regarding each IOI in any manner. For example, for at least some IOIs, the system can deliver the IOI by sending a telltale sound, followed by a spoken message. The preliminary sound enables the user to "tune in" to hear the spoken announcement, that is, by directing attention to the spoken announcement. The sound also alerts the user as to the type of information that is to follow, so that the user is better able to decide whether he or she will devote attention to it. For example, users may choose to give heightened attention to journey information, but devote less attention to contextual information (e.g., regarding a store in the user's vicinity, or a promotional offer pertaining to the user's current circumstance).

At any point in the journey, the user can make a request to hear the information regarding one or more journey IOIs (and/or other types of IOIs) that were most recently read aloud. That request can be made in various ways to be described below. If a warning has been read aloud within the last 30 seconds, then the system 102 will respond to the user's action by also repeating the warning, followed by repeating the journey information. In some cases, the user may request the system 102 to repeat information, but this information is no longer available. The system 102 can play an appropriate sound to alert the user to this situation, following by a spoken message, "information is unavailable at this time," or the like.

As another general feature, the system 102 may automatically present information regarding some IOIs at times at which the user is not expected to be overwhelmed with other sensory information from the environment. For example, the system 102 may refrain from sending the user messages regarding the planned route 202 until the user reaches a prescribed "quiet zone" along the planned route, at which the user can safely and enjoyably consume the information. The system 102 can store, in advance, the locations of regions that are considered "quiet zones."

Now more closely consider the user's particular experience while navigating over the space shown in FIG. 2. Assume that, at time $t_1$, the user is attempting to reach the second waypoint $w_2$. After sensing the location (and heading) of the user, the system 102 can send the user directions (in visual and/or audible form) that assist the user in reaching the second waypoint $w_2$. Further, the system 102 can send the user information regarding the second waypoint $w_2$ itself when the user is within a prescribed distance from the second waypoint $w_2$. This will enable the user to make suitable preparations for any change in course that the second waypoint $w_2$ may entail. The above-described information may be formulated primarily as journey IOIs.

In certain situations, the user's actual journey may depart from the planned journey, e.g., with respect to the route that is actually taken and/or the timing of the user's traversal of the space. To address those situations, the system 102 can automatically (or in an on-demand manner) determine whether the user's current situation will impact any remaining parts of the user's journey. For example, the system 102 can update the user's estimated time of arrival at a bus station and then determine whether the user will continue to arrive on time to catch a previously-identified bus or shuttle. If the user's current situation impacts the user's journey in this manner, the system 102 can automatically re-generate information that is used to assist the user in navigating within the space. That information may be expressed as a new set of IOIs. For example, the system 102 can advise the user to take a later bus or shuttle (and can automatically make appropriate reservations, send appropriate notifications, and/or make other arrangements). Further, as noted above, the user may explore the updated information in any manner, e.g., by expressly requesting information regarding a waypoint to be encountered in the future, etc.

FIG. 2 also generally indicates that, at time $t_1$, the system 102 automatically informs the user of the existence of various items of interest (IOIs) of a contextual nature (that is, in the terminology set forth above, "contextual IOIs"). For example, an illustrative contextual IOI may correspond to a store, a restaurant, a government office, a natural landmark, etc. In one case, the system 102 may present a contextual IOI for the user's consideration only if it is within a prescribed distance of the user the present time, and the user has not already passed it by.

The user may customize the behavior of the system 102 in any manner (with respect to contextual IOIs and/or any other type of IOI). For example, the user can specify the types of prompts that he wishes to receive along his route, e.g., by indicating he would like to receive information regarding a first type of store, but not a second type of store. The user may also specify the timing at which he would like to receive the information. For example, the user can specify the maximum distance (from his current location) that should be considered when notifying him of the existence of contextual IOIs. The user may make these settings prior to embarking on the journey. In addition, the user may dynamically change the type and quantity of information delivered by the system over the course of the journey, e.g., by dialing back on the amount of information that is automatically provided by the system. The user may opt to reduce the amount of information because he finds it unnecessary or distracting at a particular juncture along the journey.

The system 102 can present information regarding contextual IOIs in any application-specific manner. For example, in one case, the system 102 may announce a collection of contextual IOIs in the order in which they appear in front of the user, from left to right or from right to left (e.g., by essentially forming an angular sweep, with the user positioned at the origin of the sweep), or from front to back (in terms of distance from the user), or back to front, etc. As noted above, in one implementation, the system 102 can precede each announcement with a telltale sound that alerts the user that information regarding a contextual IOI is about to follow. The system 102 may then describe the contextual IOI, e.g., by providing audio information which announces, "Jane's Coffee Shop, 150 feet." The system 102 may alternatively provide different preliminary sounds associated with different types of establishments, such as by providing a first type of preliminary sound for restaurants, and a second type of sound for bus stops, etc.

In some cases, there may be a large quantity of contextual IOIs within the vicinity of the user at a current time. To cut back on the amount of information imparted to the user, the system 102 may consolidate this information into one or more summary messages, such as by announcing, "Restaurants, generally at 100 feet." The same holds true for any type of IOI. In general, the system 102 can determine whether a group of individual IOIs to be delivered to the user at a given time have at least one common characteristic. The system 102 can then provide a summary message which announces the group of IOIs as a block or set, rather than individually. In the specific example noted above, the system 102 determines that a group of contextual IOIs are located in the vicinity of the user and that these IOIs pertain to the same type of establishment. In another example, the system 102 may provide the summary warning IOI, "Numerous large potholes in the next 100 yards."

The system 102 may use other rules to provide announcements in an intelligent manner. For example, some IOIs are relevant only if the user is in close proximity to these IOIs. For example, a user may be interested in a park bench only if the user is within a few feet of this object. Hence, the system 102 may announce the presence of these kinds of objects only when the user is relatively close to these objects. But here again, the user may customize the behavior of the system in this regard.

According to another illustrative feature, the system 102 may use three-dimensional sounds to announce the presence of some types of IOIs, such as some types of contextual IOIs. A three-dimensional sound refers to a sound that the user perceives as emanating from a particular location (or locations) within physical space. In reality, however, the audio information is presented to the user via the headset 108 and has no physical origin within the environment. As will be described below in Section D, the system 102 can achieve the above result through the use of Head-Related Transfer Functions (HRTFs), in conjunction with different types of wideband audio sounds. In other implementations, the system 102 can use other techniques and technologies to create a three-dimensional audio effect (instead of HRTFs or in addition to HRTFs), such as Ambiophonics, Ambisonics, wave field synthesis etc.

For example, at the context $c_1$ (at time $t_1$), the system 102 may send a series of directional announcements to the user which identify at least three contextual IOIs ($IOI_1$, $IOI_2$, and $IOI_3$). The system 102, for instance, can announce the presence of contextual $IOI_1$ by sending a preliminary sound to the user which the user perceives as emanating from a particular location in space at which the entity associated with the contextual IOI is physically located. That is, if the contextual IOI corresponds to Jane's Coffee Shop, the message would direct the user's attention to the actual location of Jane's Coffee Shop. The system 102 can also provide the description of this establishment using a three-dimensional sound, such as by announcing "Jane's Coffee Shop, 150 feet" in a directional manner, that is, using three-dimensional spoken information.

In addition, or alternatively, the system 102 may send the user information regarding one or more information-available IOIs. As explained above, the system 102 can perform this operation by sending a message which generally alerts the user to the existence of information that may pertain to the user's current context, but without immediately announcing the particular substance of that information. The user may then manually ask the system 102 to receive the information, e.g., by making a "more information" instruction. Or the user may ignore the information.

All of the above information-delivery features contribute to the goal of surfacing useful information to the user as the user traverses a space, without overwhelming the user with too much information.

As another feature, at any juncture along the user's path, the system 102 can compare the user's actual direction of travel with a desired direction of travel. The system 102 can determine the user's actual direction of travel using any of the mechanisms described below in connection with FIG. 3. The system 102 can determine the desired direction by determining where the user is expected to be headed at the present time. The system 102 can then determine deviation information which determines an extent to which the actual direction of the user deviates from the desired direction. The system 102 can then send the user information which attempts to steer the user along a desired path.

For example, consider the user at time $t_2$. At this juncture, the user is attempting to reach waypoint $w_3$. Assume that the user's actual direction is represented by arrow 210, and the user's desired direction is represented by arrow 212. The system 102 will send the user instructions that attempt to steer the user away from his current errant direction, towards the desired direction.

In one implementation, the system 102 accomplishes the above goal using a three-dimensional beat sound or other type of periodic sound. The three-dimensional beat sound is any type of repeating sound (such as a clicking sound) that is perceived by the user as originating from a particular location (or locations) in the physical space. In the case of FIG. 2, at the time $t_2$, the system 102 will deliver a three-dimensional beat sound that appears to originate to the left of the user along his direction of travel. This will advise the user to the fact that: (a) he is headed in a non-optimal direction; and (b) he should turn slightly left to achieve a more desirable trajectory.

The system 102 can modulate the beat sound to achieve other effects. For example, the system 102 can change the tone and/or periodicity and/or volume (and/or some other aspect) of the beat sound depending on the extent to which the user is currently headed in a non-optimal direction. The user will interpret the beat sound as an indication of the extent to which he is headed in the wrong direction.

So far, the description has mostly emphasized the ability of the system 102 to automatically deliver information to the user at appropriate junctures along the user's path. In this mode of operation, the user's encounter with the environment may constitute the events which trigger the delivery of information, e.g., in the form of the above-described different types of IOIs. In addition, at any time, the user may manually interact with either the smartphone or the headset 108 to manually explore his environment and to obtain information regarding any of the IOIs described above. For example, in a first manner of interaction, the user may tap on a touch-sensitive surface of the smartphone at any given time along the journey. In response to a single tap, the system 102 will announce top-level information regarding the user's present context. For example, at time $t_1$, the system may respond to a single tap by announcing that the user is headed to waypoint $w_2$, which may be considered a journey IOI. In response to a double tap, the system 102 will provide more detailed information regarding the present context. In response to a triple tap, the system 102 will provide instructions which allow the user to interact with the smartphone, e.g., for the purpose of obtaining additional information regarding the context, and to invoke various functions pertaining to the current context.

As another feature, at any juncture, the user may interact with the smartphone to activate one or more menus that are relevant to the user at a given time. For example, at time $t_1$, the user may perform a tap-and-hold gesture on the surface of the smartphone. In response, the system 102 may activate a menu associated with the user's present context. The user may then interact with the smartphone to explore the immediately presented menu, or navigate to any other menu.

More specifically, as will be explained in detail in Section C below, the system 102 may represent a collection of menus that are accessible through a set of workspaces. Each workspace has a fixed positional relationship with respect to each other workspace. The user may access desired information and/or functionality by navigating to an appropriate workspace and associated menu.

According to one feature, the user may perform all of the above screen-interaction tasks with a single hand, e.g., using the thumb of the hand that holds the smartphone. The system 102 can also provide audible and/or haptic feedback cues as the user interacts with the smartphone's touch-sensitive surface. Collectively, all of these features reduce to extent to which the user needs to divert his attention from the environment while interacting with the system 102. For example, the user may keep his eyes on the road on which he is walking while interacting with the smartphone. A person having impairment of his sight can also successfully interact with the system 102 due to the above-summarized non-visual characteristics.

As will be described in Subsection C.3, the user may also manually interact with the system 102 via voice instructions. In addition, or alternatively, the user may manually interact with the system 102 via input mechanisms provided by the headset 108 (as described in Section B). The system 102 may provide yet other mechanisms by which the user may manually interact with the system 102.

The user may also invoke special modes for use in exploring his immediate environment. For example, in response to activating an explore mode, the system 102 can determine the current focus of attention of the user, which may correspond to the direction at which the user is presumed to be looking at the current time (which, in turn, may be determined based on one or more orientation determination mechanisms). The system 102 can then determine the contextual IOIs that are encompassed by (or otherwise associated with) a subspace formed around the user's direction of attention. The system 102 can then read off these contextual IOIs by announcing these contextual IOIs using three-dimensional sounds, and/or by sending visual messages for presentation on the user's smartphone, etc.

Some of these contextual IOIs may pertain to real objects in the environments having respective real positions within the subspace. These IOIs serve principally to identify or mark the locations of these physical entities in physical space. Other contextual IOIs may be virtual in nature, in that they pertain to the subspace (given the user's current context), but may not directly describe objects in that subspace. In other words, these other contextual IOIs convey information and/or an experience that relates to the user's current context, beyond that of identifying the locations of physical entities.

To cite one example, a contextual IOI of the "virtual" variety may correspond to a message, "Remember our fallen troops" as the user approaches a military barracks. That message is related to the barracks but cannot be accurately said to simply mark the location of the barracks. The intent of that message is to create a mental association to enrich the user's experience as he approaches the barracks. Alternatively, the contextual IOI in that circumstance may correspond to a song or an excerpt from an inspirational speech or a personal message that has particular meaning to the user (as previously specified and loaded into the system 102 by the user).

The same is true for other types of IOIs (other than contextual IOIs). That is, some IOIs serve mainly as labeling tags, while other IOIs are intended to stimulate cognitive associations, memories, emotions, etc. The latter group of IOIs is referred to as "virtual" herein in the sense that they pertain to a realm of associations, experiences, meanings, etc. that is not a surface-level transcription of events and objects in the environment. Such IOIs could alternatively be referred to as inferential, suggestive, relational, etc. IOIs.

According to another feature, in response to activating an orientation mode, the system 102 can perform a complete 360 scan around the user to identify all items of interest that are associated with a prescribed distance from the user. The system 102 can also perform this 360 degree scan for successive levels in the vertical dimension, e.g., to determine stores provided on different levels of a mall complex or the like. The user can customize the behavior of the explore mode and the orientation mode in any manner described above, e.g., by changing the types of IOIs that are identified, the dimensions of the space that is searched for the presence of the IOIs, and so on. In addition, the user may interact with the system 102 to govern the manner in which the system 102 reads off the IOIs.

Now assume that, at time $t_3$, the user spontaneously decides to veer off from the planned route 202 to visit the store 204, e.g., to purchase a sandwich. When in the store, the context $(c_3)$ of the user at this time pertains to a store environment. Hence, the system 102 may perform the same functions as described above, but now in the context of the indoor environment of the store. For example, the system 102 can automatically determine contextual IOIs as the user traverses an isle of the store 204, and announce those contextual IOIs to the user. For example, upon approaching the dairy section of the store 204, the user may receive a message that reads, "Milk, cheese, and yogurt, 20 feet ahead." The system 102 may send progressively more detailed information as the user draws closer to products that may interest him. Again, some of the contextual IOIs can have a less direct correspondence with physical objects in the store, e.g., as in a message that is delivered in the soup section, which alerts the users of the presence of high sodium in many soups.

The user may also manually interact with the system 102 within the store environment in any manner. For example, the user may manually explore different menus associated with different products. The user may also use the smartphone to perform various transactions in the store environment, such as purchasing an item, researching an item, etc.

In some implementations, the system 102 can determine the location of the user within the store 204 by determining whether the user is within the range of one of a set of beacons, which have been placed (in advance) at different locations within the store 204. As will be described in Section E, the beacons may have non-overlapping ranges.

Upon leaving the store 204, the system 102 may recalculate the user's journey to lead the user back to the planned route 202. For instance, the system 102 may provide the user with instructions that allow the user to reach the waypoint $w_4$, associated with a shuttle stand. Upon reaching that waypoint, the system 102 may then deliver information that is relevant to the user at this juncture, such as by announcing the expected time of arrival of the user's shuttle 208. That information may be delivered as one or more journey IOIs.

The system 102 may continue to provide services to the user while he is travelling on the shuttle 208. For example, the system 102 may notify the user of the expected time of arrival at the ultimate destination, i.e., waypoint $w_5$ (the user's doctor's office). The system 102 can also provide other messages that may be of use to the user, depending on the nature of the public (or private) transportation on which the user is traveling. For example, when riding on a bus and approaching a final destination, the system 102 can alert the user to the existence of a high curb that he is expected to encounter upon exiting the bus. Further, the system 102 can, with the user's permission, alert the driver of the bus that a person requiring assistance will be disembarking at an upcoming bus stop.

In summary, throughout the user's journey, the user may receive a large quantity of information in audible form, e.g., in the form of spoken messages, other sounds (three-dimensional sounds and non-three-dimensional sounds), etc. The system 102 may use various techniques to manage the presentation of this information, some of which have been already mentioned above (such as the ability to dial back or dial up on the quantity of information that is delivered). This feature allows the user to receive the most relevant information in a timely manner, without overwhelming the user with too much information.

For example, the system 102 may play back sounds during a journey subject to different rules to address the situation in which the delivery of one sound potentially interferes with the delivery of another sound. According to one illustrative rule, the system 102 will play the beat sound in a continuous loop to steer the user in a desired direction, e.g., while walking. The system 102, however, may temporally disable this sound (or reduce the volume of this sound compared to a normal state of this sound) when any other sound is being played. This enables the user to hear the other sounds without interference from the beat sound, which is considered a low priority sound.

According to another illustrative rule, the system 102 may unconditionally play sounds that represent interface-related events, such as flick gestures which change which menu or context is presented to the user. To avoid overloading the user with too much audio information, these types of sounds may be designed to be short and distinct. A user may control the playback of these types of cues, at least to some extent, by temporally suspending his or her interaction with the system 102 (because no interaction cue will be produced if the user is not actively interacting with the system 102).

According to additional illustrative rules, the system 102 can prioritize navigational sounds by assigning the highest priority level to warning sounds (e.g., for warning IOIs), the next highest priority level to journey information (e.g., for journey IOIs), and the next highest level to contextual information (e.g., for any type of contextual IOIs). In some cases, the system 102 will delay the delivery of information, e.g., because more critical information is being played back. Further, in some cases, a delayed message will no longer be relevant by the time that the system 102 is capable of presenting it (e.g., because the user has moved to a new context in which the information is no longer relevant); if so, the system 102 may refrain from presenting that information.

In conclusion, the above-described scenario is also useful in highlighting some of the advantageous technical effects of the system 102. Generally, the system 102 allows any user to receive guidance that serves different but related goals. First, the system 102 attempts to expose the user to the most useful information at any given time along his or her journey, thus empowering the user to more effectively navigate within his or her environment, or to achieve other objectives. Second, the system 102 enriches the user's experience of the environment beyond providing navigational assistance, allowing the user to learn new information about the environment that may not be immediately apparent to the user without the use of the system 102; in this regard, the system 102 allows the user to metaphorically delve beneath the surface of the environment to understand formerly hidden aspects and connections which pertain to the environment 102. Third, the system 102 attempts to provide this useful information to the user in a manner which minimizes the distractions placed on the user. The third goal is useful to provide a more enjoyable and useful experience to the user, e.g., by allowing the user to maintain primary focus on his or her interaction with the "real world," not on the tools which he or she is using to interact with the real world. Stated in the negative, the third goal attempts to reduce the anxiety that may occur by asking the user to interact with a cumbersome and complex tool, to which the user would be expected to devote significant attention. The third goal also allows the user to efficiently and quickly access desired information in a safe manner, without being overwhelmed at any given time with too much information.

A number of technical features contribute to the above-summarized goals, particularly with respect to the third goal. The features include, but are not limited to: a) the use of a one-handed interaction experience; b) the use of a user-friendly menu structure that accommodates gestures that can be performed on a touch-sensitive surface in a location-agnostic manner (to be described below); c) the use of a user-friendly and easy-to-learn workspace structure which provides access to a "safe" home workspace (to be described below); d) the use of multiple mechanisms to enter commands (e.g., via the headset 108, user device 106, voice recognition, etc.); e) the use of audio information and/or haptic cues to convey information without unduly disrupting the user's focus on the journey; f) the use of three-dimensional and non-three-dimensional sounds to help steer the user in a desired direction without inundating the user with complex instructions, or to alert the user to the location of IOIs, and so on.

The above advantages apply to any user of the system 102. The system 102 may also be successfully used by people with any type of condition that impairs their ability to make journeys. These users may include users having partial or full loss of sight, users with cognitive or other psychological impairments, users having mobility-related handicaps, and so on. For these users, the system 102 acts as a virtual guide dog, assisting the user in each stage of their journey in a safe manner, or otherwise assisting the user in interacting with their environment, whatever the user's goal happens to be at the moment. For these users, in addition to the above-summarized general benefits, the system 102 also allows the user to access information and guidance that would not otherwise be available to them, thus potentially improving the mobility, confidence, and general quality of life of these users.

Figure 3:
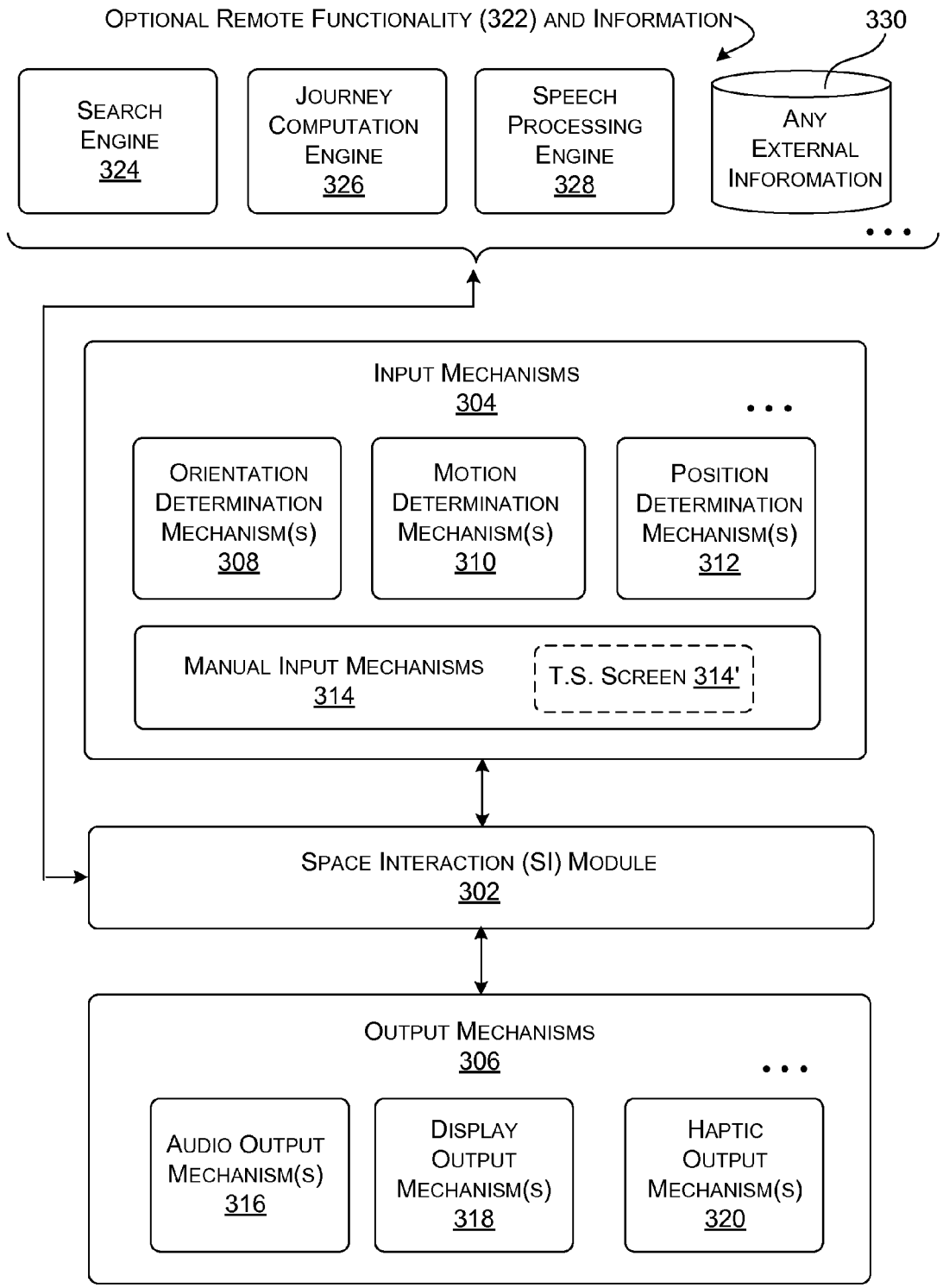
FIG. 3 shows an overview of computing functionality that may be used to implement the system of FIG. 1.

Advancing now to FIG. 3, this figure shows a high-level overview of computing functionality that may be used to implement the system 102 of FIG. 1. The functionality of FIG. 3 is shown in a device-agnostic manner. In an actual implementation, the functionality may be allocated, for instance, to any of the components introduced in FIG. 1, or any combination of these components. For instance, FIG. 3 shows that the functionality includes a space interaction (SI) module 302. The SI module 302 performs all (or most) of the functions described with respect to the scenario of FIG. 2. Some parts of the SI module 302 may be implemented by the user device 106, while other parts of the SI module 302 may be implemented by processing components located on the headset 108. In addition, or alternatively, some parts of the SI module 302 may be performed by the remote processing resources 112.

The SI module 302 may receive input information from any combination of input mechanisms 304, and may provide its output information for presentation on any output mechanisms 306. For example, the input mechanisms 304 may include one or more orientation determination mechanisms 308, and/or one or more motion determination mechanisms 310, and/or one or more position determination mechanisms 312, and so on.

The orientation determination mechanism(s) 308 determine the orientation of the device which incorporates these mechanism(s) 308. For example, if housed by the user device 106, the orientation determination mechanism(s) 308 determine the three-dimensional orientation of this user device 106. If housed by the handset 108, the orientation determination mechanism(s) determine the three-dimensional orientation of the headset 108. More generally stated, the orientation determination mechanism(s) 308 may determine the direction that the user is pointing his smartphone or turning his or her head (on which the headset 108 is placed). The motion determination mechanism(s) 310 determine the nature and degree of movement of the device which incorporates these mechanism(s) 310. The position determination mechanism(s) 312 determine the absolute and/or relative position of the device which incorporates these mechanism(s) 312.

The mechanisms (308, 310, 312) can be implemented using any combination of sensors, including but not limited to: magnetometers, accelerometers, gyroscopic sensors, gravity-based sensors, torque sensors, strain gauges, flex sensors, optical encoder mechanisms, and so on. In addition, some of the mechanisms (308, 310, 312) may receive signals from external systems or sources. For example, the mechanisms (308, 310, 312) may include a sensor for determining the position of a device based on signals received from a satellite-based navigation system (e.g., a Global Positioning System (GPS) system). In addition, or alternatively, the mechanisms (308, 310, 312) may include functionality for determining the position of a device by performing triangulation and/or other processing based on signals received from plural external sources, such as signals received from plural radio towers and/or localized directional antennas, etc. In addition, or alternatively, the mechanisms (308, 310, 312) can include functionality for determining the position of a device using a dead reckoning technique. In addition, or alternatively, the mechanisms (308, 310, 312) can include functionality for determining the position of a device by processing information from local beacons (e.g., Wi-Fi and/or BLUETOOTH beacons, etc.), and so on.

The input mechanisms 304 may also include any combination of manual input mechanisms 314. These mechanisms can include any of: key input mechanisms, touch-sensitive input mechanisms (e.g., a touch-sensitive screen 314'), joysticks, microphones (e.g., for receiving voice instructions), video cameras and/or depth cameras (e.g., for receiving free space gestures), and so on. For example, in the case of FIG. 1, the user device 106 may use a touch-sensitive display screen as its primary manner of interacting with the user. For instance, without limitation, that touch-sensitive display screen may incorporate a capacitive touchscreen mechanism that determines when a user touches and/or hovers above the screen. The user device 106 may also include a camera, a microphone, etc. The headset 108 may include a microphone (for receiving voice instructions) together with one or more dedicated input mechanisms, e.g., as implemented as buttons on the side of the headset 108 (to be described in greater detail in the next section).

The output mechanisms 306 can incorporate one or more audio output mechanisms 316, one or more display output mechanisms 318, one or more haptic output mechanisms 320, and so on. For example, the audio output mechanism(s) 316 can correspond to conventional speakers of any type. In addition or alternatively, the audio output mechanism(s) 316 can incorporate bone conducting audio devices (e.g., as provided by the headset 108), such as bone conducting transducers produced by AFTERSHOKZ, LLC, of Syracuse, N.Y. The display output mechanism(s) 318 may correspond, for instance, to a LCD type display (e.g., as provided by the user device 106). The haptic output mechanism(s) 320 may correspond, for instance, to a vibration-producing mechanism (e.g., as provided by the user device 106 and/or the headset 108, etc.). A vibration-producing mechanism may achieve a vibration effect using a rotating off-balance weight, and/or by some other mechanism(s).

The SI module 302 may also interact with remote functionality 322 that may be considered external to the SI module 302 per se. For example, the SI module 302 may interact with a search engine 324 for the purpose of conducting a search. For example, the search engine 324 may correspond to the BING search engine provided by MICROSOFT Corporation of Redmond, Wash. In addition, or alternatively, the SI module 302 may interact with a journey computation engine 326 for the purpose of generating a new journey and/or modifying an existing journey. In addition, or alternatively, the SI module 302 may interact with a speech processing engine 328 to interpret the spoken instructions made by the user. For example, the speech processing engine 328 may correspond to the CORTANA system provided by MICROSOFT Corporation of Redmond, Wash. In other cases, one or more aspects of the remote functionality 322 may be incorporated in the SI module 302 as native resources.

In addition, the SI module 302 may interact with any external information provided in one or more data stores 330. For example, the external information may provide publically accessible map information, transportation schedule information, alert information, business and personal directory information, social network information, calendar information, etc., and so on. In some cases, the SI module 302 may interact with external sources (e.g., external websites) using application programming interfaces (APIs) provided by those external sources.

Figure 4:
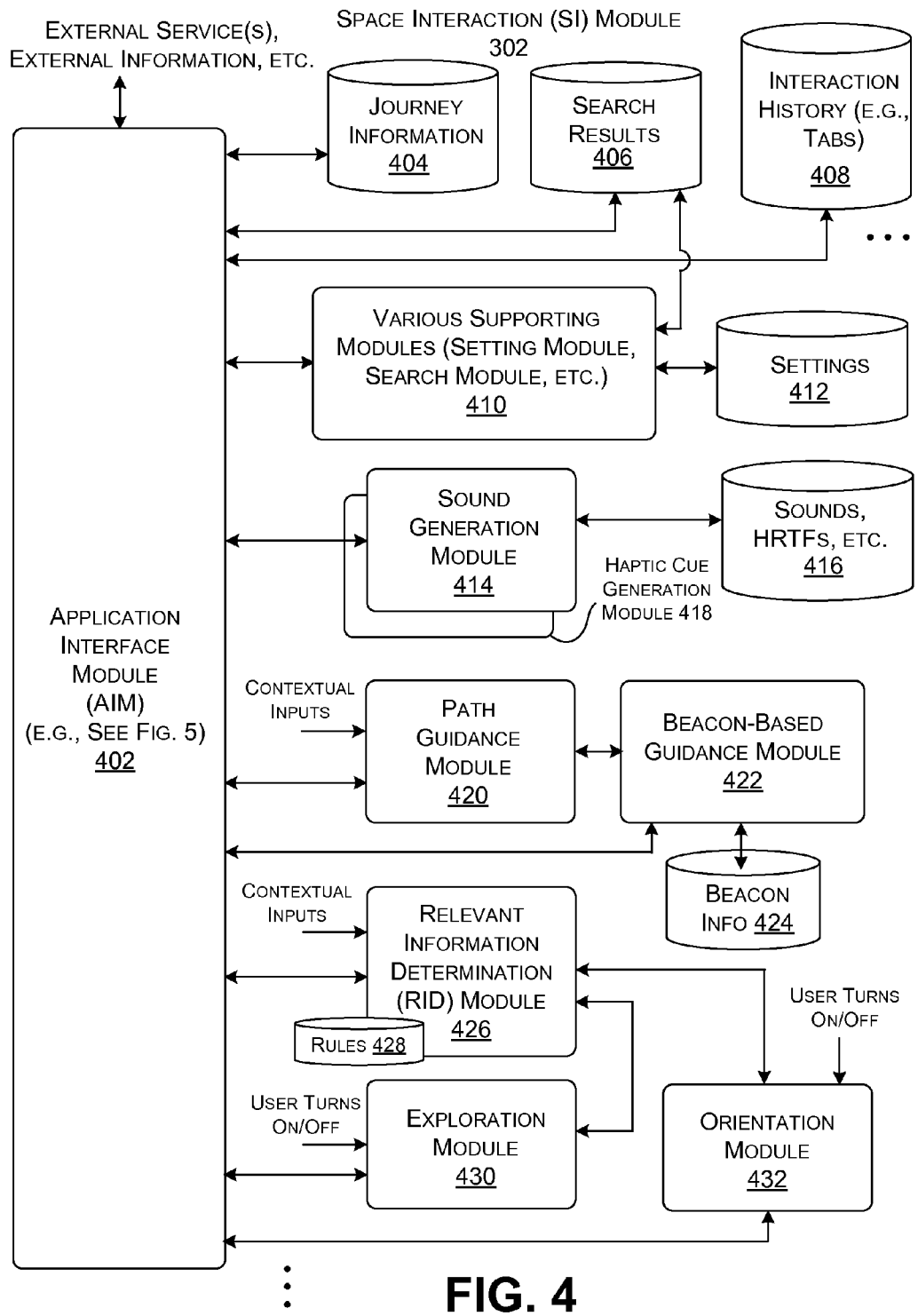
FIG. 4 shows one implementation of a space interaction module, which is a component of the computing functionality of FIG. 3.

Now referring to FIG. 4, this figure shows one implementation of the SI module 302, which was introduced above. From a high-level standpoint, the SI module 302 may include (or may be conceptualized as including) a plurality of sub-components that perform different respective functions. Further, some sub-components may rely on the results generated by other sub-components. An application interface module (AIM) 402 allows the user to interact with any of the sub-components. For example, the application interface module 402 may provide menu functionality which exposes various functions provided by the sub-components.

Generally referring to the sub-components from top to bottom, the SI module 302 may include various data stores for storing information that may be used by the SI module 302 in performing its functions. For example, a data store 404 may store information which defines one or more journeys. For example, the journey information may describe the waypoints in the journey, and/or any other information regarding the journey. A data store 406 may store search results provided by a search engine; those results may be produced, upon direction of the user, during the course of the journey or a user's more general interaction with a space. A data store 408 may store a history of tabs created by the user in the course of the user's interaction with the SI module 302. A tab generally corresponds to a bookmark to a menu or other item of information and/or functionality and/or option. A user may create a tab when he or she visits that menu or other item or information and/or functionality and/or option; in one implementation, the data store 408 initially contains no tabs when a user embarks on a journey and has not yet started to interact with the system 102. The system 102 may use any manner of representing a collection of tabs, e.g., as a list of tabs, a radial menu of tabs, etc.

The SI module 302 can also provide various supporting modules 410 that perform any type of support services. For example, a setting module may allow a user to assign a value to any parameter which affects the operation of the system 102. A data store 412 may store all such settings. The supporting modules 410 may also include a portal for interacting with an external search engine, to provide search results. Or the supporting modules 410 may include a natively-provided search engine.

A sound generation module 414 performs various operations relating to the generation of sounds. For example, the sound generation module 414 may play particular sounds when various triggering circumstances are encountered. Some triggering circumstances correspond to actions made the user when interacting with the application interface module 402. Other triggering circumstances correspond to changes in the state of the system 102 that are not directly caused by the user's interaction with the system 102. Other trigger circumstances correspond to events which occur during the course of a journey (or more generally, the user's interaction with a space), and so on. A data store 416 may store files which, when played back, produce the desired sounds. Subsection C.2 (below) provides additional information regarding different types of sounds that may be generated, and the circumstances under which these sounds are played.

Some sounds are non-three-dimensional or non-spatial in nature. In addition, the sound generation module 414 can produce three-dimensional audio information. As described above, the audio information is three-dimensional in the sense that a user will perceive this information as emanating from one or more locations within a three-dimensional physical or virtual environment. The sound generation module 414 may create these sounds by transforming original sound information using one or more Head-Related Transfer Functions (HRTFs).

Similarly, a haptic cue generation module 418 can produce different types of haptic feedback experiences in different triggering circumstances. In one case, the haptic cue generation module 418 produces signals which produce vibration cues, e.g., when delivered to the user device 106, the headset 108, and/or some other device.

A path guidance module 420 uses the sound generation module 414 to generate the above-described three-dimensional periodic (e.g., beat) sound. The purpose of this periodic sound is to guide the user in a particular direction. The path guidance module 420 produces this effect by determining the current actual heading of the user, the desired heading, and the difference between the actual and desired headings (corresponding to deviation information). Then the path guidance module 420 then leverages the sound generation module 414 to produce an appropriate looping sound that is perceived by the user as originating from a particular direction. That is, the sound generation module 414 produces the looping sound based on the deviation information fed to it by the path guidance module 420. The user may respond to this sound by moving in the desired direction. In another case, the beat sound may be perceived as travelling across a series of locations in physical space. The user may interpret this experience as an instruction to move in the direction of the traveling sound.

A beacon-based guidance module 422 provides assistance to the user in navigating within an indoor and/or output space by means of the detection of signals emitting from a collection of beacons having, in one illustrative implementation, respective non-overlapping ranges. Section E provides additional information regarding the operation of the beacon-based guidance module 422. The beacon-based guidance module 422 may consult beacon information provided in a data store 424. The beacon information may describe the codes associated with the beacons that have been placed in the environment and their respective locations within the environment.

A relevant information determination (RID) module 426 performs the general function of determining relevant information to present to the user at any given time. In context of the description of FIG. 2, the RID module 426 determines different types of information (IOIs) that have a bearing on the user's current context. To perform this task, the RID module 426 receives various contextual inputs that define the context of the user at the present time. These contextual inputs may describe the current location of the user, the current heading of the user, the current goals of the user, and so on. The contextual input may also describe the environment itself, such as objects and events associated with the environment, both physical and virtual. Any such inputs may be mined from map information, directory information, social network information, calendar information, etc. The contextual inputs may also describe environmental factors which affect the user's interaction with the space, such as public transportation information, weather information, etc., as obtained from any source(s).

The RID module 426 operates by determining whether it is appropriate to notify the user of any information at a given time, based on the contextual inputs at the present time, and based on various rules (provided in a data store 428). The behavior of the RID module 426 may also be defined by one or more parameters set by the user and stored in the data store 412. For example, the RID module 426 may determine whether there are any contextual IOIs in proximity to the user at the present time, based on a depth range defined by the user. If such contextual IOIs exist, the RID module 426 can interact with the sound generation module 414 and/or menu functionality provided by the application interface module 402 to notify the user of these contextual IOIs.

An exploration module 430 and an orientation module 432 perform respective services that may be invoked in an on-demand manner by the user. As described with reference to the scenario of FIG. 2, the exploration module 430 determines any contextual IOIs that are associated with a subspace that lies in front of the user (which, in turn, may be determined by the position of the user's head, together with a setting parameter which defines the depth of investigation, and a setting parameter which describes the span of the search space). To perform this task, the exploration module 430 leverages the services of the RID module 426. The exploration module 430 then notifies the user of the contextual IOIs using three-dimensional sounds, displayed messages, etc. The orientation module 432 performs a similar task to the exploration module 430. But instead of investigating IOIs associated with a subspace that projects out in front of the user, the orientation module 432 can scan the entire three-dimensional space which exists around the user at the present time.

Figure 5:
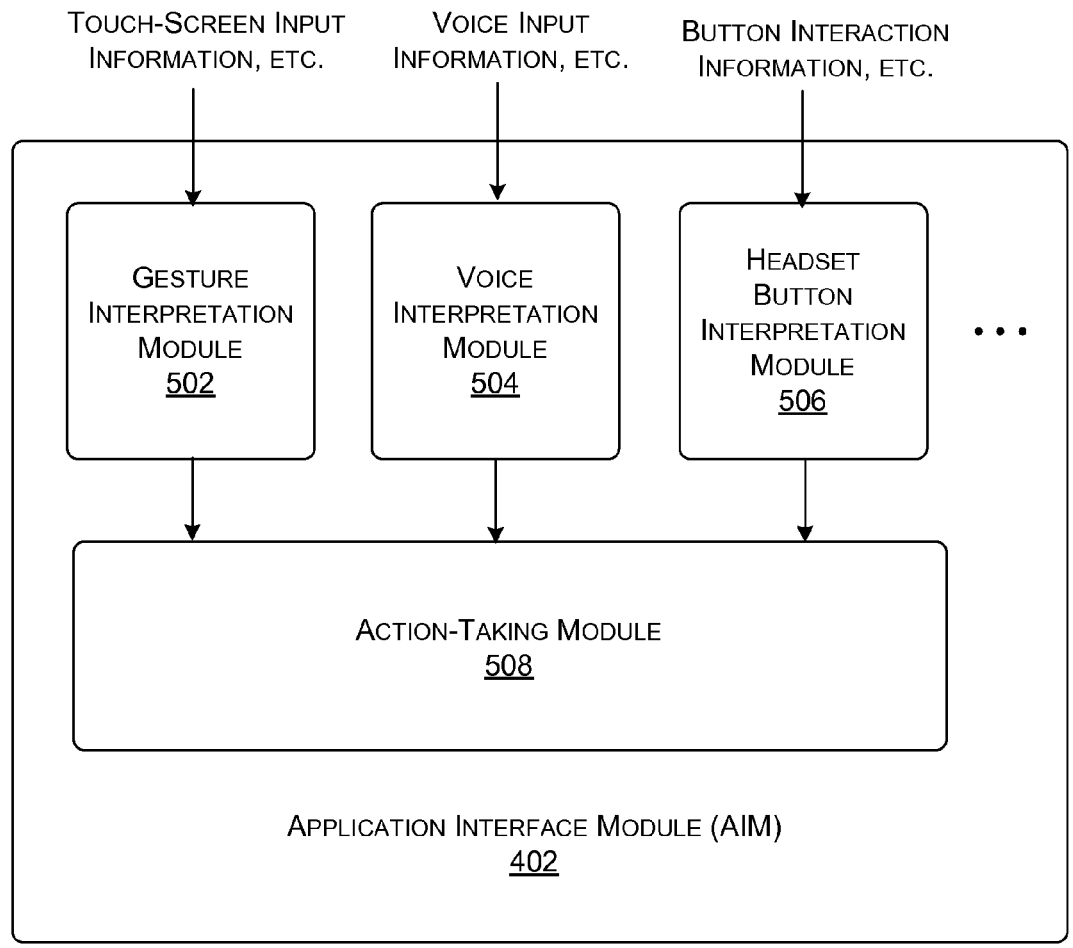
FIG. 5 shows one implementation of an application interface module, which is a component of the space interaction module of FIG. 4.

FIG. 5 shows one implementation of the application interface module (AIM) 402. As noted above, the application interface module 402 generally provides an interface that allows the user to interact with the various sub-components described above, with reference to FIG. 4.

The application interface module 402 may include various components that interpret the input of the user, e.g., to determine the nature of an instruction that the user is making. For example, a gesture interpretation module 502 may determine a gesture that the user has made by interacting with the touch-sensitive screen of the user device 106, or a free-space gesture, etc. The gesture interpretation module 502 may perform this task by comparing the marks or touches or hovers (or other behavior) made by the user with a data store that identifies patterns associated with known gestures. If the behavior of the user matches a pattern associated with a particular gesture with a determined degree of matching confidence, then the gesture interpretation module 502 may conclude that the user has made that gesture.

A voice interpretation module 504 may interpret spoken instructions by the user, e.g., which may be received via a microphone on the user device 106 and/or the headset 108. In one case, the voice interpretation module 504 may correspond to a portal to the remote speech processing engine 328 (e.g., the CORTANA system). In another case, the voice interpretation module 504 may correspond to any type of native functionality for interpreting spoken utterances. In any event, the agent which performs voice recognition can use any technology to perform this task, such as Hidden Markov Model-based technology, neural network based technology, etc.

A headset button interpretation module 506 interprets the manner in which the user interacts with the input mechanisms of the headset 108 (to be described below). For example, in some cases, a set of buttons can perform different functions depending on the manner in which the user interacts with them, e.g., depending on whether the user touches a button but does not press it, or based on whether the user touches and releases the button one or more times, or based on whether the user presses and holds the button, etc. The headset button interpretation module 506 maps the user's behavior to a particular instruction.

An action-taking module 508 may invoke an action based on the interpretations provided by the above-described interpretation modules (502, 504, 506). For example, in response to the interpretation, the action-taking module 508 may: invoke a menu; close a menu; transition between workspaces (to be described below); perform a function; save a setting; present an information item, and so on.

Figure 6:
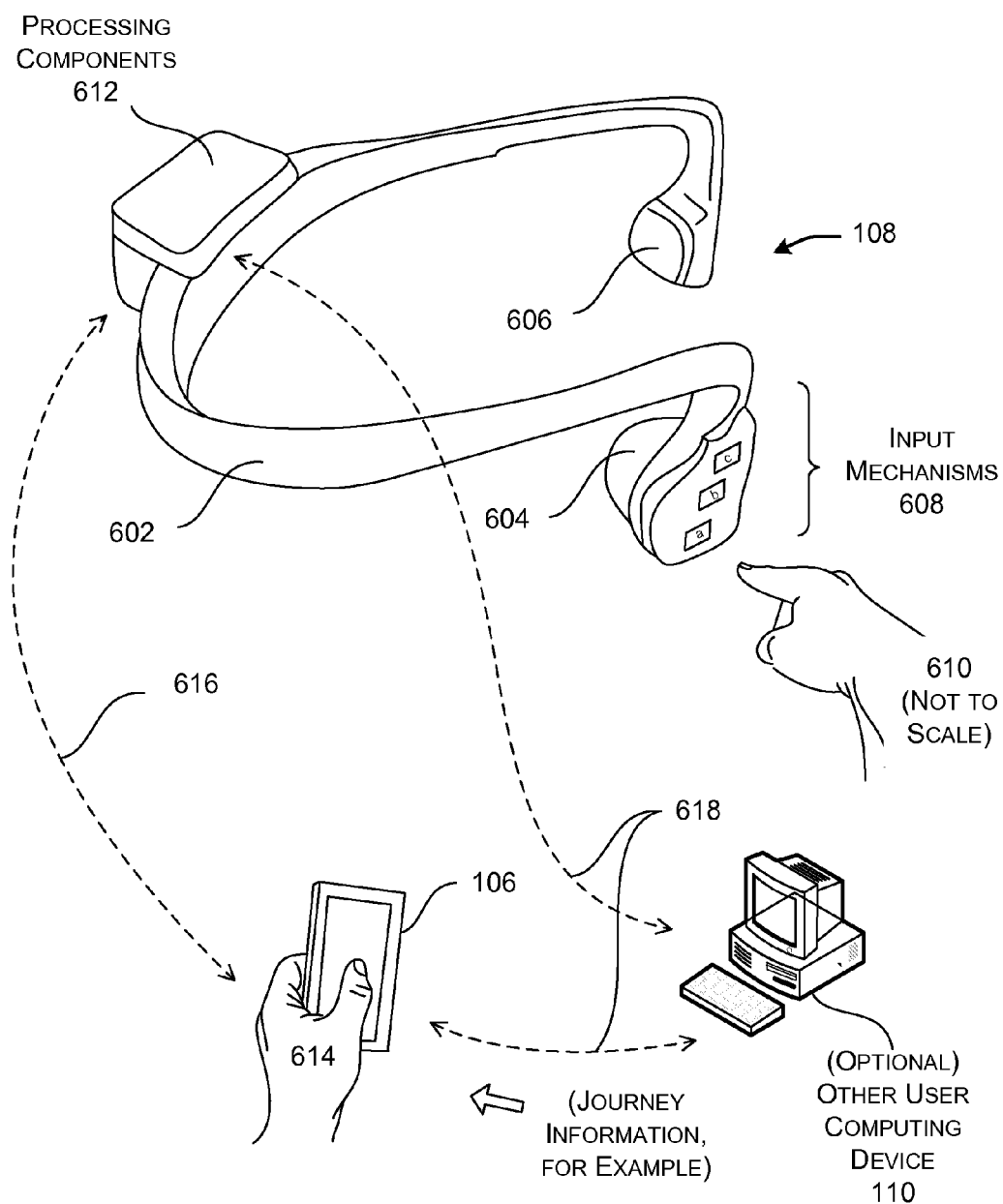
FIG. 6 shows an example of a headset, handheld user computing device ("user device" for brevity), and another user computing device; these devices may implement one or more aspects of the system of FIG. 1.

B. Headset and User Device Options for Facilitating Interaction Between Users and their Environments FIG. 6 shows additional details regarding the headset 108, the user device 106, and the other user computing device 110 introduced above, in the context of FIG. 1. The features of these devices are presented herein in the spirit of illustration, not limitation.

Referring first to the headset 108, this device may provide a frame 602 made of plastic and/or metal and/or any other material. The frame 602 may be flexible, and may be secured to the user's head via tension in the frame which pushes laterally inward against the user's head, and/or through some other securing mechanism. The headset 108 includes transducers (604, 606) which transmit vibrations to the bones of the user's head; the bones of the user's head then transfer these vibrations to the user's eardrums, where they are perceived as audio information. The use of a bone conduction-type headset prevents the headset 108 from occluding the user's ear canals, and thereby allows the user to safely respond to other sounds in the environment. However, alternatively, the headset 108 may include conventional speakers that are placed over, or near, the user's ears.

The headset 108 may also optionally include a set of input mechanisms 608 anywhere on its frame. The user may interact with the input mechanisms 608 with one or more fingers of his or her hand 610 (or hands). Alternatively, a separate device (not shown) may provide the input mechanisms 608, and that separate device may communicate with the headset 108 via wireless communication (e.g., BLUETOOTH communication) and/or wired communication. FIG. 6 shows that the input mechanisms 608 include three buttons, but, more generally, the input mechanisms 608 can include any number of mechanisms, and these input mechanisms can be placed on the frame in any manner. Further, the input mechanisms 608 can include other types of input mechanisms besides buttons, such as wheel or knob mechanisms, slider mechanisms, etc. Alternatively, or in addition, the headset 108 may incorporate one or more touch-sensitive surfaces. For example, different regions of the headset 108 may incorporate different touch-sensitive mechanisms, and those regions may be associated with different respective functions.

The headset 108 may include processing mechanisms which perform various tasks (to be described below). The headset 108 may include a compartment 612 which houses those processing mechanisms. For example, in one case, the compartment 612 lies in the back of the headset 108. However, the processing mechanisms can be physically located at any location (or locations) on the headset 108. The processing mechanisms themselves may include one or more processing devices of any type, memory, etc., and/or dedicated logic components, e.g., one or more application-specific integrated circuits (ASICs), etc.

The input mechanisms 608 can initiate any operations when activated. For example, without limitation, the user may use the input mechanism 608 to instruct the SI module 302 to invoke the explore mode or the orientation mode (described above). In addition, or alternatively, after hearing a summary of a certain topic (e.g., the name of a contextual IOI), a user may use the input mechanisms 608 to instruct the SI module 302 to provide additional information regarding the identified topic; this instruction may be referred to as a "more information" instruction.

In addition, or alternatively, the user can use the input mechanisms 608 to instruct the SI module 302 to activate a listening mode, or to stop the listening mode. In the listening mode, the voice interpretation module 504 processes the user's speech to determine whether the user has spoken an instruction.

In addition, or alternatively, the user can use the input mechanisms 608 to instruct the SI module 302 to repeat the most recent audio message that it has provided. In addition, or alternatively, the user can use the input mechanisms 608 to request the SI module 302 to repeat a set of previously-delivered audio messages, e.g., by starting with the most recent message and advancing back in time, message by message, for a predetermined number of prior messages. Such an instruction may be referred to as a "rewind" instruction.

Alternatively, or in addition, the user may use the input mechanisms 608 to turn the three-dimensional beat sound on or off, and so on. Other implementations can use the input mechanisms 608 to issue other instructions, and/or to omit one or more of the instructions set forth above.

The above functions, or some subset thereof, can be mapped to any number of respective buttons and/or other input mechanisms in any manner. Further, in some implementations, the system 102 may include a customization module that allows a user to define the mapping between input mechanisms and operations which the mechanisms invoke. Further, as described above, the same button can also perform two or more functions depending on the manner in which the user interacts with it. In one implementation, the SI module 302 may announce the function performed by a button when the user touches it, but does not press it.

According to another feature, the user may deactivate a function that is currently in active state by pressing the same button that was used to activate it. For example, the user can stop the SI module 302 from announcing information by pressing the same button that was used to ask the SI module 302 to deliver this information, etc. Alternatively, or in addition, the headset 108 can incorporate a dedicated button which stops whatever function is currently being executed.

The user device 106 may correspond to any of the types of portable devices described above, such as a smartphone or a tablet-type computing device. As described above, a user may interact with the user device 106 using a single hand 614 (and/or optionally with two hands). The other user computing device 110 may correspond to any type of traditionally stationary computing device, such as a workstation computing device, a game console, a set-top box device, etc.

One or more communication paths 616 may couple the user device 106 with the headset 108. Such a communication path, for example, may correspond to a BLUETOOTH communication path, a hardwired communication path (e.g., a USB communication path), etc. One or more communication paths 618 may couple the other user computing device 110 to the user device 106 and/or the headset 108. As described above, one reason that a user may wish to establish a connection between the other user computing device 110 and the user device 106 and/or the headset 108 is to upload information to these devices. The communication paths 618 can be implemented in any manner, e.g., via any type of wireless and/or wired communication path described above.

Other implementations of the system 102 can use different types of headsets, e.g., compared to the particular type of headset 108 shown in FIG. 6. For instance, in another implementation, a headset can incorporate any of the above-identified features (including the input mechanisms 608) together with a head-mounted display (HMD) device of any type, e.g., as physically implemented as eyewear (e.g., goggles), a helmet, etc. The system 102 may display any type of information using the head-mounted display device. For example, the system 102 may display any of the menus and other information described in the next section (Section C) via the head-mounted display device, or some subset thereof. In another case, the system 102 may display computer-generated information that is mixed with information associated with the real world with which the user interacts, to thereby provide an augmented reality experience. For example, the system 102 can display descriptive tags in positional proximity to associated objects and events within the field of vision of the user. In another case, the system 102 can display directional prompts which assist the user in moving in a recommended direction, and so on. Moreover, the system 102 can modify the type of information that is displayed to accommodate any visual impairments that may affect a particular user, e.g., by displaying simplified and enlarged information for users with impairments in sight.

The system 102 can achieve an augmented reality experience using any technology, e.g., through the use of an optical mixer which displays computer-generated information "over" the user's direct visual perception of the actual environment (e.g., using partially reflective mirrors or the like). In another implementation, the system 102 can use a video camera to capture the actual environment, together with an optical mixer which mixes video information from the video camera with computer-generated information. In either case, the system 102 can determine the user's presumed field of view using one or more devices which detect the location of the user within the environment, one or more devices which detect the position and orientation of the user's head, and/or one or more devices which detect the direction of the user's gaze, etc.

In another case, another type of wearable device, besides a headset, or in addition to a headset, can perform any of the functions set forth above. For example, the wearable device may correspond to a wrist-mounted device, an item of apparel, etc.

To simplify the explanation, the following description will assume that the user interacts with the headset 108 of the basic type shown in FIG. 6, although, to repeat, the headset 108 can incorporate any number of supplemental features mentioned above (such as a head-mounted display). Further, another type of wearable device can be used instead of a headset, or in addition to a headset.

Figure 7:
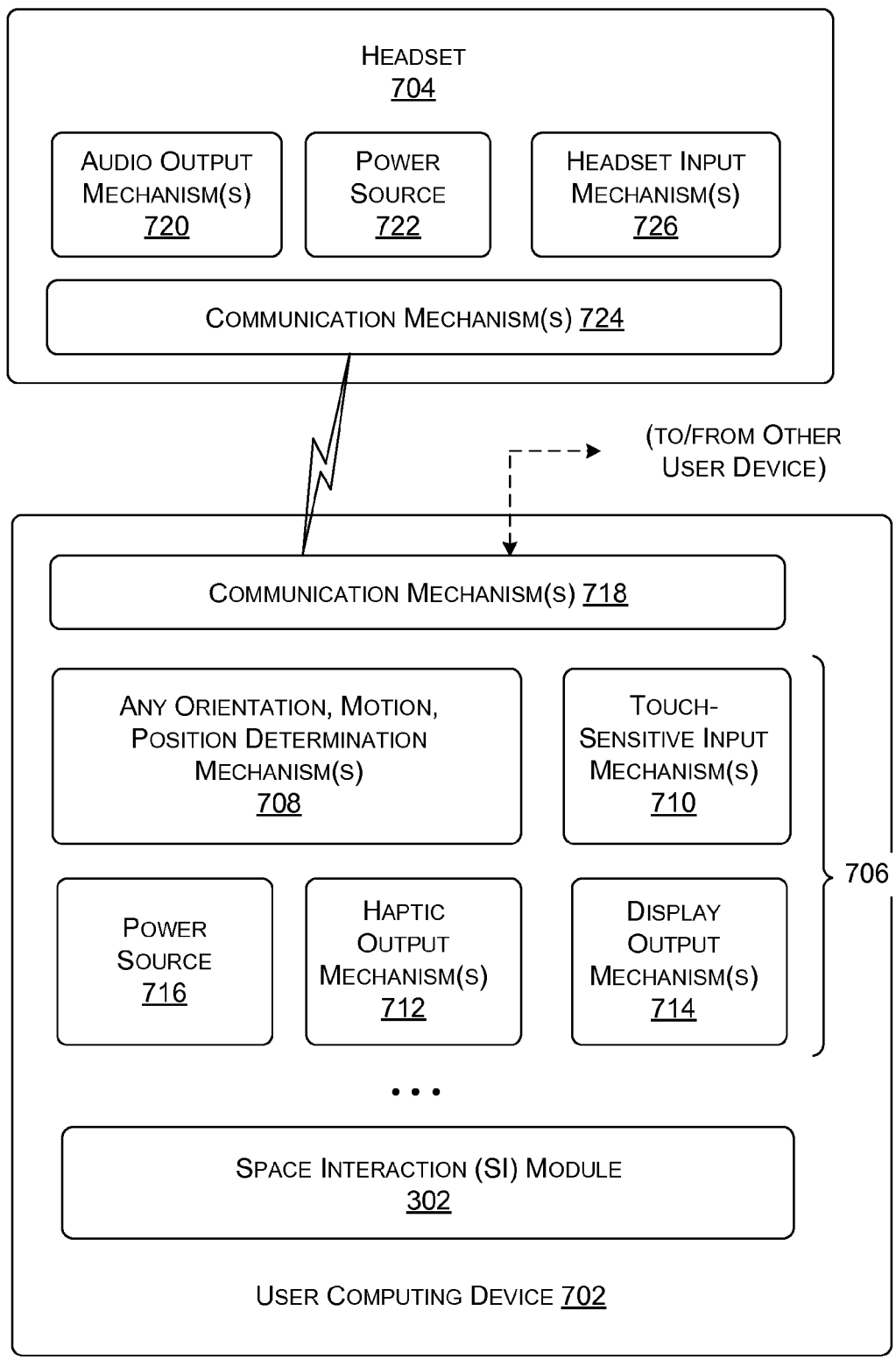
FIG. 7 shows one manner of implementing the headset and user device of FIG. 6.

FIG. 7 shows one manner of implementing the system 102 of FIG. 1. In this implementation, the system 102 makes use of both a user computing device 702 (a "user device" for brevity) and a headset 704. More specifically, according to one allocation of functions, the user device 702 implements most of the functionality of the system 102. That is, the user device 702 includes the SI module 302 and a collection of input/output mechanisms 706, including any orientation, motion, and/or position determination mechanisms 708, any touch-sensitive input mechanisms 710, any haptic output mechanisms 712, any display output mechanisms 714, and so on. Examples of these mechanisms were provided above in connection with the description of FIG. 3. The user device 702 also includes a power source 716 (e.g., a battery) and one or more communication mechanisms 718 for communicating with the headset 704.

On the other hand, the headset 704 includes just one or more audio output mechanisms 720 (such as a bone conducting audio mechanism), a power source 722 (such as a battery), and one or more communication mechanisms 724 for communicating with the user device 702. In addition, the headset 704 may include any of the type of input mechanisms 726 described above with reference to FIG. 6 (e.g., corresponding to the input mechanisms 608 of FIG. 6). The communication mechanisms 724 can transmit instructions, invoked by the input mechanisms 726, to the user device 702. The user device 702, in turn, can send audio information to the headset 704 for presentation by the audio output mechanism(s) 720.

Figure 8:
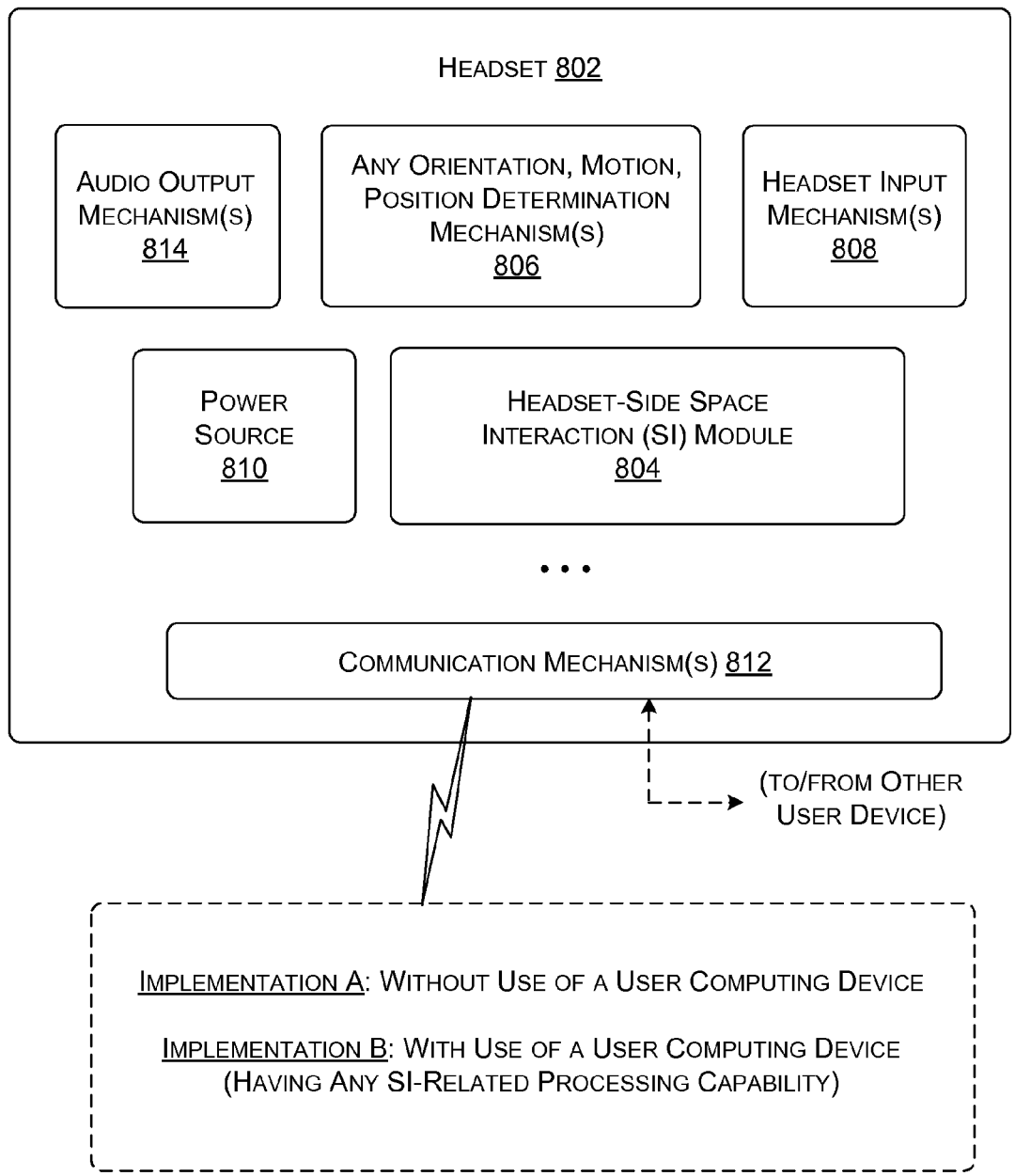
FIG. 8 shows another manner of implementing the headset and the (optional) user device of FIG. 6.

FIG. 8 shows another way of implementing system 102. Here, the system 102 includes a headset 802 having more processing capability compared to the headset 704 of FIG. 7. Indeed, in one implementation, the headset 802 may perform all space-interaction-related aspects of the system 102, without the use of any separate user device 106. In another implementation, the headset 802 may still interact with a separate user device 106 (not shown in FIG. 8). That separate user device 106 can include all of the components of the user device 702 of FIG. 7, or any subset thereof.

More specifically, the headset 802 in the case of FIG. 8 may include a headset-side SI module 804 that performs any subset of the functions described above with reference to FIG. 4. In addition, the headset 802 may include any orientation, motion, and/or position determination mechanisms 806. These mechanisms are generally referred to below as head-sensing mechanisms because they determine the physical posture or movement of the user's head, which may, in turn, reflect the direction of the user's focus of attention. In addition, the headset 802 may include any of the type of input mechanisms 808 described above with reference to FIG. 6. In addition, the headset 802 may include a power source 810 and one or more communication mechanisms 812 for interacting with the user device 106 (if the system 102 makes use of such a user device 106 in this implementation, which it need not). In addition, the headset 802 includes any type(s) of audio output mechanism(s) 814 described above.

In one mode of operation, the system 102 of FIG. 8 can make use of the head-sensing mechanisms provided on the headset 802 when they are provided and working properly. The head-sensing mechanisms provided by the headset 802 may be preferable to the counterpart sensing mechanisms provided by the user device 106 because the head-sensing mechanisms may more accurately reflect the orientation, movement, and/or position of the user. Further, the use of the head-sensing mechanisms eliminates the need for the user to interact with the user device 106 to register his or her orientation, movement, and/or position.

In some cases, the headset 108 may optionally forward the information generated by the head-sensing mechanisms to the user device 106. The user device 106 may use this information to perform processing and then forward the results of its processing back to the headset 802. The headset 802 may then transmit sounds to the user's ears via a bone conducting technique that convey the results. In another case, the headset-side SI module 804 can perform this processing without the need for forwarding the information provided by the head-sensing mechanisms to the user device 106. In still another case, the headset-side SI module 804 can natively perform some operations, and rely on the user device 106 to perform other operations. For example, the headset-side SI module 804 can rely on the user device 106 to perform computationally intense operations (such as the calculation of three-dimensional sounds, etc.) because those operations can be more efficiently performed on the user device 106 compared to the headset 108.

In another case, the system 102 may make use of the orientation determination mechanism(s), motion determination mechanism(s), and/or position determination mechanism(s) provided by the user device 106 when the counterpart components are not working properly on the headset 802.

In still another case, the system 102 may leverage the sensor readings provided by both the headset 802 and the user device 106, e.g., by using sensor readings of one device to identify obvious errors in the sensor readings of the other device, and/or to form an average of the two different versions of the sensor readings, and so on.

In either of the implementations of FIGS. 7 and 8, at least some of the functions performed by the headsets (e.g., 704, 802) and/or the user devices (e.g., 702, 106), can be alternatively, or in addition, performed by the remote processing resources 112 of FIG. 1 (e.g., corresponding to cloud computing resources).

Figure 9:
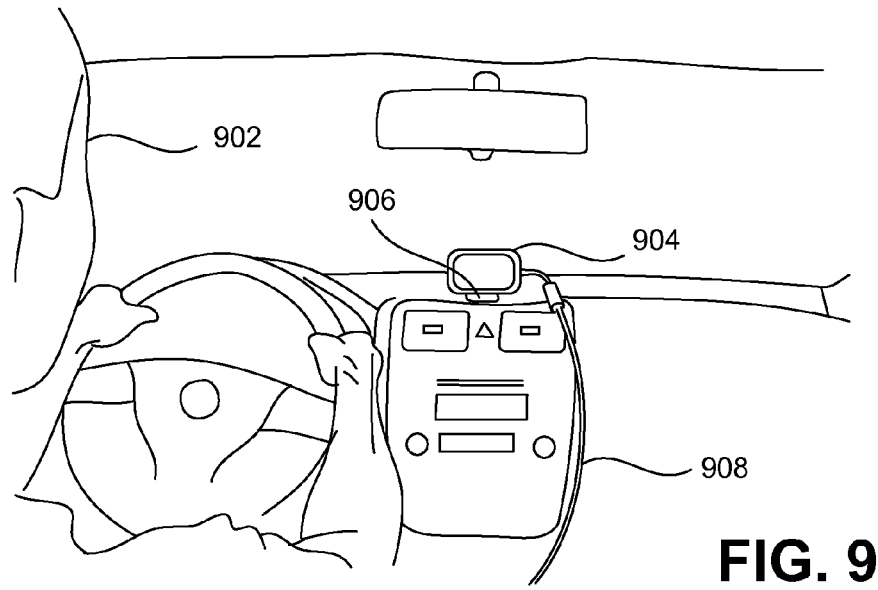
FIG. 9 shows a scenario in which a user interacts with the user device of FIG. 6 within a vehicle.

FIG. 9 shows a scenario in which a user 902 interacts with a user device 904 within a vehicle. Although not specifically illustrated in FIG. 9, the user 902 may also make use of a bone conducting headset that relays audio information to the user without occluding the user's ears. More generally, FIG. 9 is an example of the more general point that the functionality described above can be applied to additional use scenarios than the cases described above.

In the case of FIG. 9, the user 902 has mounted the user device 904, using a mount 906, onto the dashboard-region of a vehicle. The user 902 may be the driver of the vehicle (as shown in FIG. 9) or a passenger. A power cord 908 may deliver power to the user device 904 from a power outlet provided by the vehicle.

Figure 10:
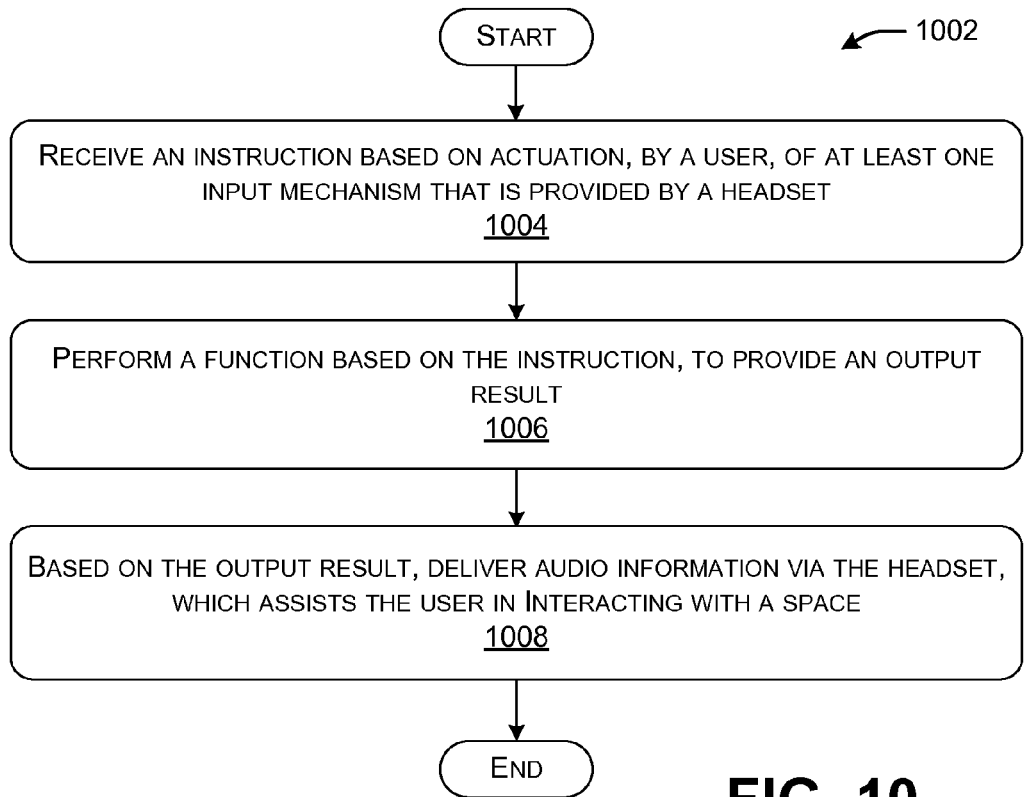
FIG. 10 is a flowchart which illustrates one manner of operation of the equipment shown in FIG. 6.

FIG. 10 shows a process 1004 which describes one manner of operation of the equipment shown in FIG. 6. In block 1004, the system 102 receives an instruction as a result of the user's actuation of at least one headset input mechanism (e.g., based on the user's actuation of one of the headset input mechanisms 608 shown in FIG. 6). In block 1006, the system 102 performs a function based on the instruction provided in block 1004, to provide an output result. Block 1006 may be performed by the headset 108 and/or the user device 106. In block 1008, the headset 108 applies the output result to deliver audio information, which assists the user in navigating over a route, within a space, or, more generally, interacting with the space.

In summary, the above features contribute to the above goal of allowing the user to safely and efficiently move through his or her environment. For instance, the features provide a convenient way by which the user may activate various operational modes (e.g., by interacting with the user input mechanisms 608 of the headset 108) without unduly distracting the user as the user moves through the environment, e.g., without requiring the user to access and interact with a separate user device.

C. Illustrative User Interface Functionality for Facilitating Interaction Between Users and their Environments This section provides illustrative details regarding one manner of operation of the application interface module 402 of FIGS. 4 and 5. To repeat, the application interface module 402 allows the user to interact with the various components of the SI module 302. To facilitate repeated reference to the application interface module 402, this section will make reference to this component in abbreviated form as the AIM 402. The AIM 402 may refer to a discrete component, or to an aggregation of functions performed by two or more components in an actual implementation of the system 102.

The user interface experience, in turn, has different components or aspects. Subsection C.1, below, provides details regarding one illustrative manner in which the AIM 402 allows a user to interact with the SI module 302 via a visual user interface presentation, e.g., as provided by the user device 106. Subsection C.2 provides details regarding one illustrative manner in which the AIM 402 may provide various sounds and haptic feedback cues to the user. Subsection C.3 provides details regarding one illustrative manner in which the AIM 402 allows the user to interact with the SI module 302 via spoken instructions.

Generally note that the following explanation describes the AIM 402 in the context of a journey taken by a user through space, e.g., as in the example of FIG. 2. But the AIM 402 provides a similar service in other scenarios in which a user interacts with a space, including the case in which the user wanders through the space without a prepared route for the purpose of exploring the space in an ad hoc manner. As a further note, the user interface features described below are also general purpose in nature, and thus can be applied in other contexts that are not necessarily related to a user's interaction with a space.

As another prefatory note, the description sets forth many gestures interpreted by the AIM 402 by describing gesture-related actions performed by a user, together with corresponding operations taken by the AIM 402 in response to the gesture-related actions. As more fully described above with reference to FIG. 5, the AIM 402 performs this task in each case by: (a) detecting input information which describes a gesture performed by the user, for example, when the user makes a telltale flick gesture, etc.; (b) comparing the input information with stored patterns associated with known gestures, to determine the particular gesture that the user has invoked; and (c) executing the operations associated with the detected gesture. Explicit recitation of these individual operations is omitted in many cases below in the interest of brevity.

C.1. Visual Experience: Interacting with Workspaces and Menus

In one approach, the AIM 402 organizes a master workspace into a collection of smaller workspaces. The workspaces have positional relationships with respect to each other. This structure is beneficial because it allows the user to develop a mental picture of the organization of the application, much like he or she would become familiar with the zones of a physical space through repeated encounters with its zones. This feature, in turn, allows the user to efficiently access the information and/or functionality being sought.

Figure 11:
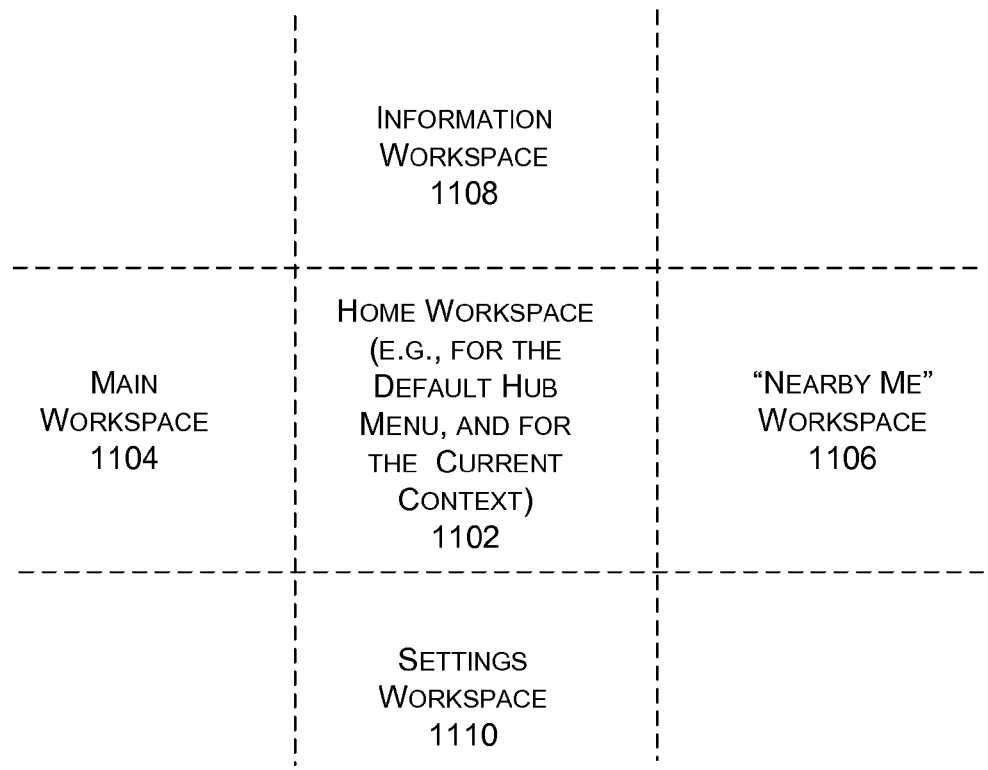
FIG. 11 shows different workspaces that may be presented by the application interface module of FIGS. 4 and 5, e.g., in a user interface presentation provided by a display output mechanism of a user device.

For instance, FIG. 11 shows an example in which the AIM 402 organizes a master workspace into five smaller workspaces. A home workspace 1102 serves as the central focus in the user's interaction while conducting a journey. For example, as will be described below, the home workspace 1102 presents information regarding the current context of the user, at each particular point in the journey or any other interaction with a space. If the user has not yet started the journey, the home workspace 1002 may present a default hub page.

A main workspace 1104 lies to the left of the home workspace 1102, and a "nearby me" workspace 1106 lies to the right of the home workspace 1102. An information workspace 1108 lies to the top of the home workspace 1102, while a settings workspace 1110 lies to the bottom of the home workspace 1102. The respective roles of these workspaces will be described in greater detail below.

The position of each workspace described above is set forth in the spirit of illustration, not limitation. Other implementations can provide other placements of the workspaces. Further, other implementations can vary the number of workspaces that are provided by the AIM 402. For example, another implementation can provide another four workspaces by providing workspaces that are diagonally positioned relative to the home workspace 1102.

Figure 12:
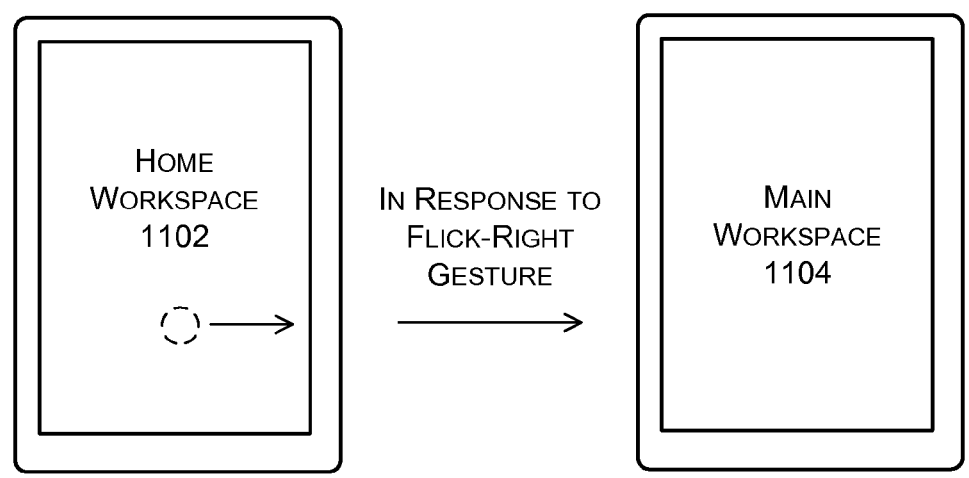
FIG. 12 shows a gesture that may be used to transition from a first workspace to a second workspace.

FIG. 12 shows one manner by which a user may navigate from the home workspace 1102 to the main workspace 1104. In this non-limiting case, the user executes a flick-right gesture on the home workspace 1102 to navigate to the main workspace 1104. Although not shown, the user may execute a flick-left gesture (or another flick-right gesture) to move from the main workspace 1104 back to the home workspace 1102.

In a similar manner, the user may execute a flick-left gesture on the home workspace 1102 to navigate to the "nearby me" workspace 1106. The user may execute a flick-down gesture on the home workspace 1102 to navigate to the information workspace 1108, and a flick-up gesture on the home workspace 1102 to navigate to the settings workspace 1110. The user can perform any of these gestures, for example, using the thumb of the hand that holds the user device, e.g., by placing the thumb on the touch-sensitive surface of the user device 106 and flicking it in a desired direction. In a flick movement, the user makes contact with the touch-sensitive surface with one or more fingers, moves the finger(s) for a distance across the surface, and then removes the finger(s) from the surface, all in relatively rapid succession (as if flicking a physical object across a flat surface).

In one implementation, in order to navigate to any peripheral zone, the user is expected to first navigate to the home workspace 1102. However, in another implementation, the AIM 402 may allow the user to navigate from one peripheral region to another without first moving back to the home work space 1102.

More generally, in all examples in this section, a dashed-line circle on the surface of a display represents the point at which the user contacts the surface with a digit. In some cases, the surface of the display will show two dashed-line circles of different sizes. The larger of the two circles represents the location at which the user applied his or her digit, while the smaller of the two circles represents the location at which the user removed his or her digit. In other cases (not shown), a user may perform at least one gesture that involves simultaneously touching the touch-sensitive surface at two or more locations (e.g., to execute a pinch-type gesture). In other cases (not shown), a user may perform at least one gesture by hovering above the surface of the device without actually touching it. In other cases (not shown), a user may perform a free-space gesture, which may be detected by a video camera and/or a depth camera, etc.

As a final introductory note, this section describes particular gestures, menu structures, and menu items, all in the spirit and illustrative, not limitation. Other implementations can vary any aspects of these user interface features. For example, in another implementation (not illustrated), the AIM 402 could allow the user to transition among workspaces using a tap-type gesture, or by drawing a particular shape on the surface of the display, etc.

Figure 13:
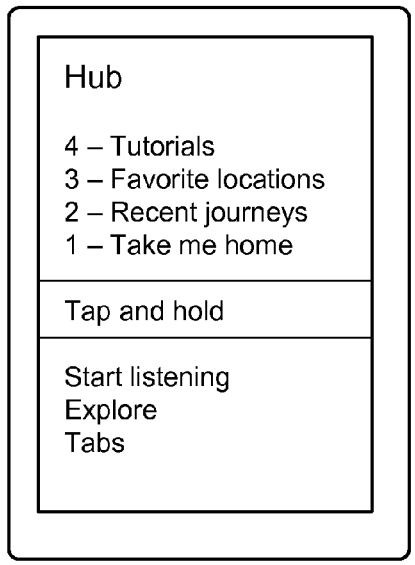
FIG. 13 shows a default hub menu that may be presented in a home workspace, according to one implementation.
Figure 14:
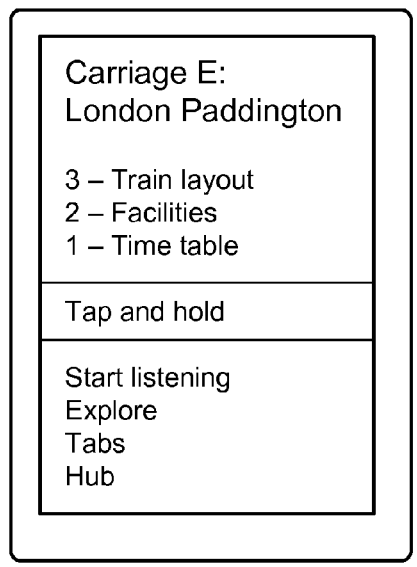
FIGS. 14-16 show respective context menus that may be presented in the home workspace.

FIGS. 13-16 illustrate the types of information that may be presented in the home workspace 1102. As mentioned above, the home workspace 1102 serves as the primary focus of the user's attention as they navigate over a route or otherwise interact with the space. In a default state, as shown in FIG. 13, the home workspace 1102 may present a hub page. The particular nature of the menu structure, and the menu items within that structure, will be described below.

Figure 15:
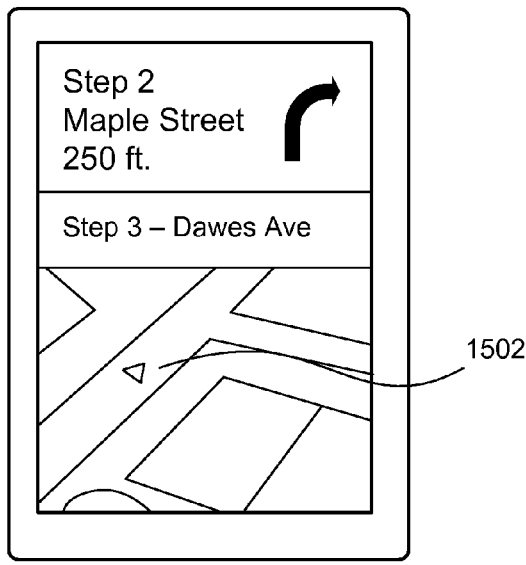
Figure 16:
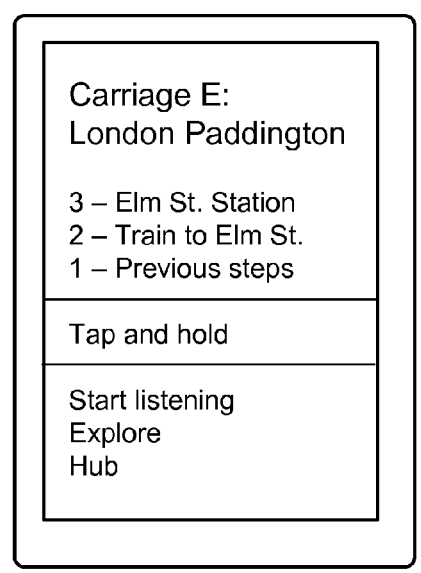

In the course of the user's journey, the home workspace 1102 may present information regarding the user's current context (although other information can also be presented in the home workspace 1102 during the journey, upon request by the user). For example, in the case of FIG. 14, assume that the user is currently riding on a train. The home workspace 1102 may present a menu that focuses on the user's experience in the train. In the case of FIG. 15, assume that the user is now walking down a particular street. As a default, the home workspace 1102 will now present information regarding the user's experience on the street. For example, the home workspace 1102 can present a map that shows the user's current location 1502 on the street. Alternatively, the user may interact with the AIM 402 to produce the type of menu shown in FIG. 14, but where that menu will now contain menu items that pertain to the user's experience while walking on the street. By virtue of the above behavior, the AIM 402 surfaces the information that is most relevant to the user in his or her current context in the environment, and presents that information within the home workspace 1102; the user can thus readily find and consume the most relevant information without having to "hunt" for it, e.g., without having to navigate through a cumbersome menu structure. Such a feature also reduces the distractions placed on the user, and thus contributes to the safety of the system 102.

The user may nevertheless interact with the AIM 402 to activate information, for presentation in the home workspace 1102, that does not pertain to the user's immediate surroundings. For example, the user may activate a tab menu, e.g., by activating a tab menu option, to be described below. In response, the AIM 402 will present the tab menu shown in FIG. 16. The tab menu shows a collection of open tabs, corresponding to previously opened menus. Some of these tabbed menus may correspond to information regarding prior journey segments that the user has already completed. The user may activate any such tab-related menu item. In response, the AIM 402 may represent information regarding a prior journey step in the home workspace 1102, e.g., in the form of a menu or some other format. The menu structure may also allow the user to examine future journey steps, upon request by the user, that have not yet been encountered on the journey.

Further, even after having embarked on a journey, the user may instruct the AIM 402 to return to the hub menu shown in FIG. 13, e.g., so that the user may access the information and/or functionality specified in that default hub menu.

As a further clarification, in the example above, the current context pertains to a physical location or segment in the user's overall journey. In other cases, the home workspace 1102 can present context information regarding the user's exploration of a virtual space. For example, the user can navigate within a hierarchy of products offered by a store. In that scenario, the home workspace 1102 may present a menu that pertains to a group of products, an individual product, etc.

Generally speaking, the above-described types of menus shown in FIGS. 13-16 correspond to primary menus. The AIM 402 displays these types of menus in the home workspace 1102. In contrast, the AIM 402 presents secondary menus in the other workspaces that lie on the periphery of the home workspace 1102. FIGS. 17-20 show illustrative secondary menus that may be presented in these peripheral workspaces.

Figure 17:
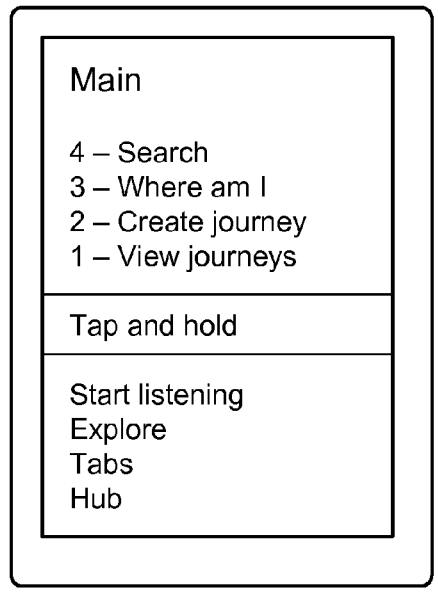
FIG. 17 shows a menu that identifies a plurality of functions that may be invoked; that menu may be presented in a main workspace.
Figure 18:
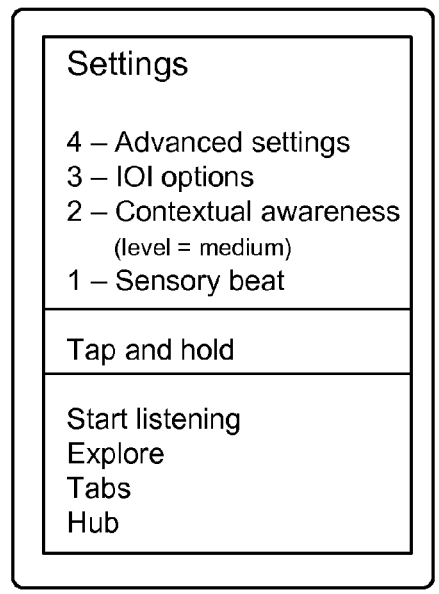
FIG. 18 shows a menu that a user may use to set various parameters; that menu may be presented in a settings workspace.
Figure 19:
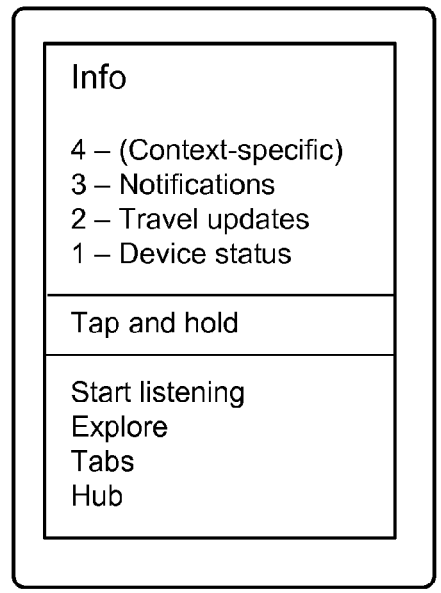
FIG. 19 shows a menu that a user may use to access information that is relevant to the user as he or she conducts a journey or otherwise interacts with an environment; that menu may be presented in an information workspace.

For example, FIG. 17 shows a main menu for presentation in the main workspace 1104. The main menu identifies actions that are commonly used when interacting with different aspects of the SI module 302. FIG. 18 shows a settings menu for presentation in the settings workspace 1110. The settings menu allows the user to change various parameters which affect the operation of the SI module 302. FIG. 19 shows an information menu for presentation in the information workspace 1108. The information menu presents convenient access to system information, such as remaining battery life, signal strength. The information menu also provides a convenient portal to notifications and other useful warning information and journey information, such as real-time updates from public transport services.

Figure 20:
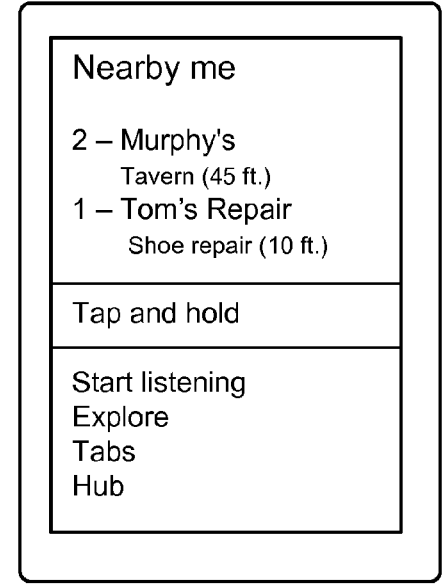
FIG. 20 shows a menu that a user may use to access information pertaining to nearby items of interest (IOIs); that menu may be presented in a "nearby me" workspace.

FIG. 20 provides a "nearby me" menu for presentation in the "nearby me" workspace 1106. The "nearby me" menu presents information regarding contextual items of interest (IOIs) that lie within close distance to the user at the present time (or are otherwise associated with the user's current context), as identified by the RID module 426 of FIG. 4. The user may use the settings menu to specify a maximum distance which determines what constitutes a "nearby" contextual IOI. Each contextual IOI is identified in the "nearby me" menu by its name, its category (such as the "Food and Drink" category), and its distance from the user. A user may activate an item in this menu, causing the SI module 302 to provide audio information regarding this contextual IOI. That audio information may be formulated as three-dimensional sound information, such that, upon delivery, it appears to originate in the same direction at which the entity associated with the contextual IOI can be found in physical space.

Figure 21:
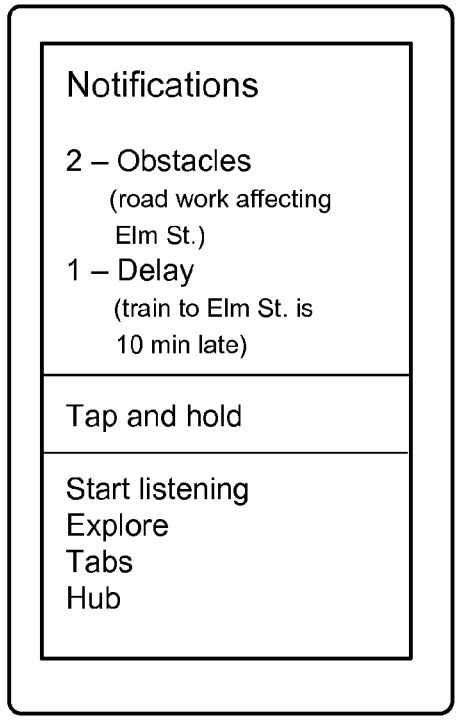
FIG. 21 shows an example of a transient menu that may be presented in the home workspace.

FIG. 21 shows an example of a transient menu that may be presented in the home workspace 1102. For example, a user may activate this transient menu by first navigating to an information menu which is shown in FIG. 19, and which is presented in the information workspace 1108. The user may then activate the "notifications" menu item in the menu. In response, the AIM 402 may present the transient menu shown in FIG. 21.

Figure 22:
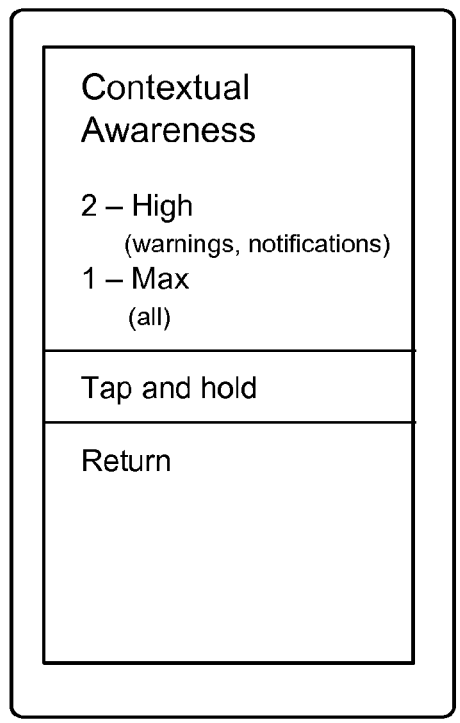
FIG. 22 shows an example of an overlay menu that, in this particular case, is presented in the settings workspace.

FIG. 22, by contrast, shows an example of an overlay menu. In this particular example, the user may activate the overlay menu by first advancing to the settings menu shown in FIG. 18, as presented in the settings workspace 1110. The user may then activate the "contextual awareness" menu item in that menu. The AIM 402 responds to the user's action by presenting the overlay menu shown in FIG. 22. Unlike the transient menu shown in FIG. 21, the overlay menu shown in FIG. 22 is presented "over" the settings menu shown in FIG. 18 in the settings workspace 1110, rather than in the home workspace 1102. Overlay menus and transient menus may also exhibit different behaviors in response to the execution of a "back" command, as will be described below.

In the particular case of FIG. 22, the overlay menu allows the user to change the level of contextual awareness provided by the SI module 302. For example, through this menu, the user can set a parameter value which determines the quantity of information that is forwarded to the user. In one case, the user may opt to receive all information that is potentially relevant to his or her current context. In another case, the user may opt to receive only warnings and other information items that are deemed of high importance.

Figure 23:
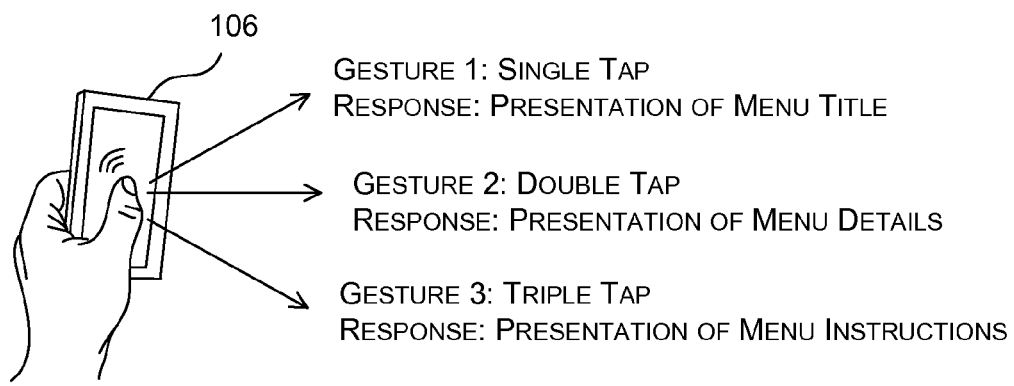
FIG. 23 demonstrates gestures that a user may use to obtain audio information regarding his or her current context.

FIG. 23 demonstrates one manner by which the user may instruct the SI module 302 to present information regarding his or her current context, at any juncture in the user's journey. According to one non-limiting case, the user may use a digit (e.g., a thumb) to make a single-tap gesture on the touch-sensitive surface of the user device 106, at any location on the surface. In response to detecting this gesture, the SI module 302 can present, as a spoken message, high-level information regarding the user's current context. For example, the SI module 302 can announce the title of the context menu that would be appropriate for this context. For instance, in the example of FIG. 14, the SI module 302 could announce, "Carriage E: London Paddington."

Alternatively, the user may make a double tab gesture. In response to detecting this gesture, the SI module 302 can present more detailed information regarding the user's current context, again as a spoken message. For example, upon a double tap, the SI module 302 can announce the menu items in the menu shown in FIG. 14.

Next assume that the user performs a triple tap gesture. In response to detecting this gesture, the SI module 302 can announce instructions that inform the user how to interact with the type of menu shown in FIG. 14, if that menu, in fact, pertains to the user's current context. For example, the instructions can inform the user how to activate the menu, how to navigate within the menu, how to select menu items within the menu, and so on.

Advancing to FIG. 24, this figure shows how a user may activate a menu, and then how the user may subsequently interact with the menu. In one non-limiting case, the user may activate the menu shown in FIG. 24 by making a tap-and-hold gesture anywhere on the surface of the touch-sensitive display surface of the user device 106. For example, as shown in FIG. 24, a dashed-lined circle 2402 indicates the location at which the user has tapped and held his or her thumb on the surface of the touch-sensitive surface.

In response to detecting this gesture, the AIM 402 presents the menu 2404. The menu is centered at the point (corresponding to a display location) on the surface at which the user touched the surface (corresponding to a touch location). The user may find this feature useful because it eliminates the need to hunt for a particular element in a user interface presentation for the purpose of activating the menu 2404. Rather, the user may execute the tap-and-hold gesture anywhere on the surface. This feature, in turn, reduces the distractions placed on the user in using the system 102. But not all locations will result in the successful activation of the menu 2404. For example, if the user taps too close to the top or bottom of the surface, the AIM 402 may optionally present an error message to the user (e.g., as a spoken message), asking the user to repeat his or her tap-and-hold gesture closer to the middle of the surface.

The menus illustrated thus far have a particular uniform menu structure. The menu 2404 shown in FIG. 24 has the same structure, which will now be described below, with the caveat that this structure is set forth in the spirit of illustration, not limitation. Other implementations can adopt other menu structures and behaviors. For example, this subsection will close with an example of an implementation which adopts a different menu structure compared to the menu 2404 of FIG. 24, and which exhibits a different menu behavior. Further, the menus described herein present their menu items in the form of linear lists; but other menus can be used (e.g., radial or pie menus, etc.), which present their menu items in other ways.

Figure 24:
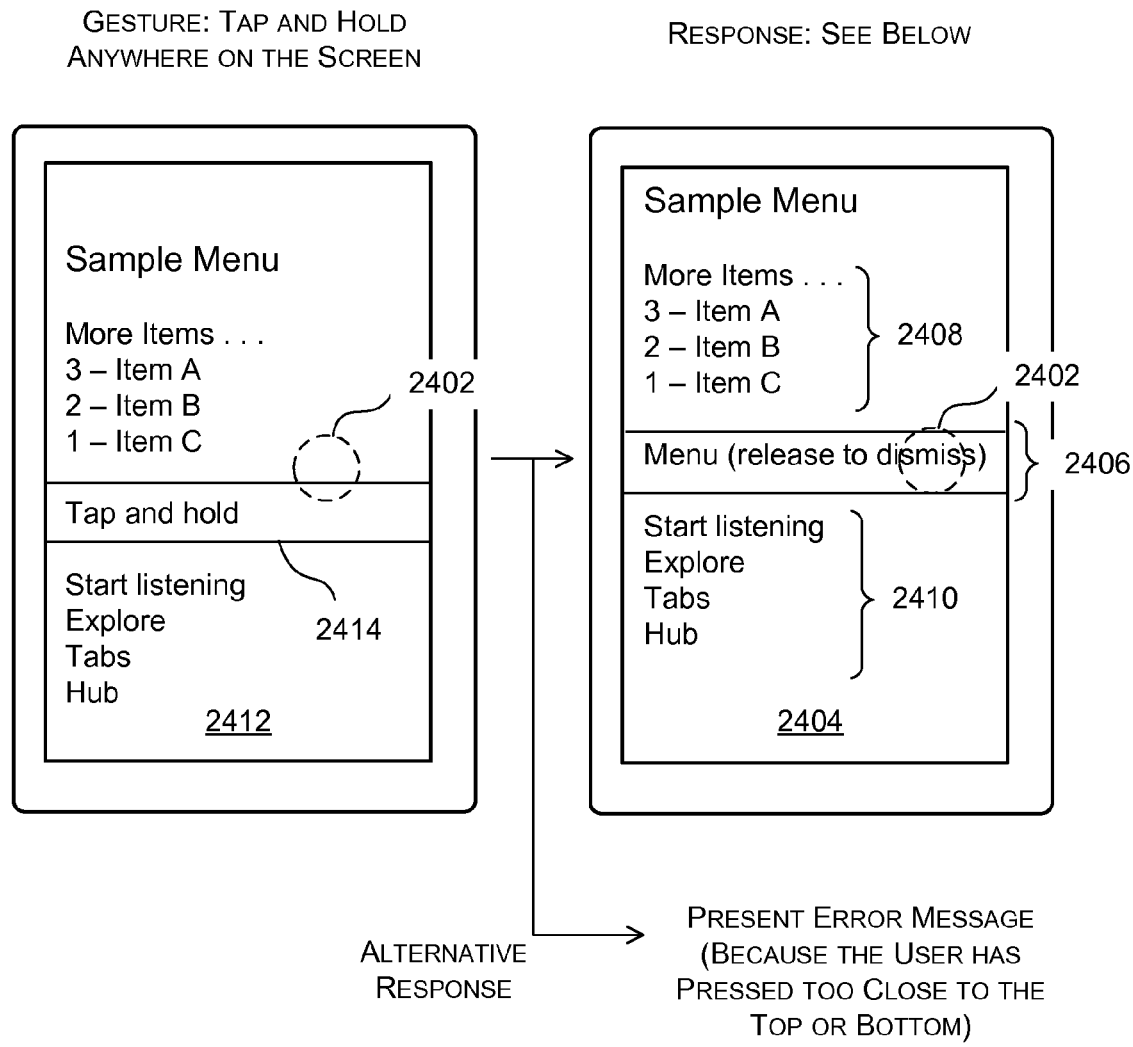
FIG. 24 shows a gesture that a user may use to activate any menu in any workspace.

The menu structure shown in FIG. 24 has two groupings of menu items, separated by a marker item 2406. More specifically, a first grouping 2408 of menu items presents menu items that are particularly pertinent to the user's current context or task at hand. A second grouping 2410 of menu items presents menu items that are relevant to multiple types of menus that may be presented in different workspaces, and therefore may be referred to as global or general menu items. For example, the "stop listening" command, which is a menu item in the second grouping 2410, is relevant across different menus and workspaces, whereas the menu item "item A," which is a menu item in the first grouping 2408, may be chosen because it is particularly relevant to whatever task that the user is attempting to accomplish by interacting with the menu 2404.

The second grouping 2410, however, may omit certain global choices that are not relevant for a particular menu. For example, if the user is already viewing a "tabs" menu, the second grouping associated with that menu may omit a menu option that allows the user to access the tabs menu (because the user is already viewing that menu).

Different menu items (in either the first grouping 2408 or the second grouping 2410) invoke different operations when selected. For example, a first type of menu item may invoke an action when selected. For example, the menu item "start listening," when invoked, instructs the SI module 302 to start listening for the user's voice commands. A second type of menu item may present information when invoked, such as battery status information, etc. A third type of menu item may present an opportunity for the user to change a property value, when that menu item is invoked. For example, in some cases, the user's activation of this type of menu item may activate an overlay menu. The user may then interact with the overlay menu to change a property value under consideration. In another case, the user's activation of this type of menu item may directly change the property value, e.g., by toggling a setting from an "on" status to an "off" status, or vice versa. Still other types of menu items and associated invocation behaviors are possible.

The marker item 2406 displays the message "release to dismiss." This message informs the user that he or she can release their finger from the surface of the touch-sensitive surface without selecting any menu item, assuming, that is, that the user releases his or her finger while it was positioned on the marker item 2406, and not some other menu item. In response to such a gesture, the AIM 402 can display the menu 2412 in its original deactivated state. The marker item 2414 in that menu 2412 bears the message "tap and hold," which invites the user execute a tap-and-hold gesture to reactivate the menu 2404 in its active state.

Figure 25:
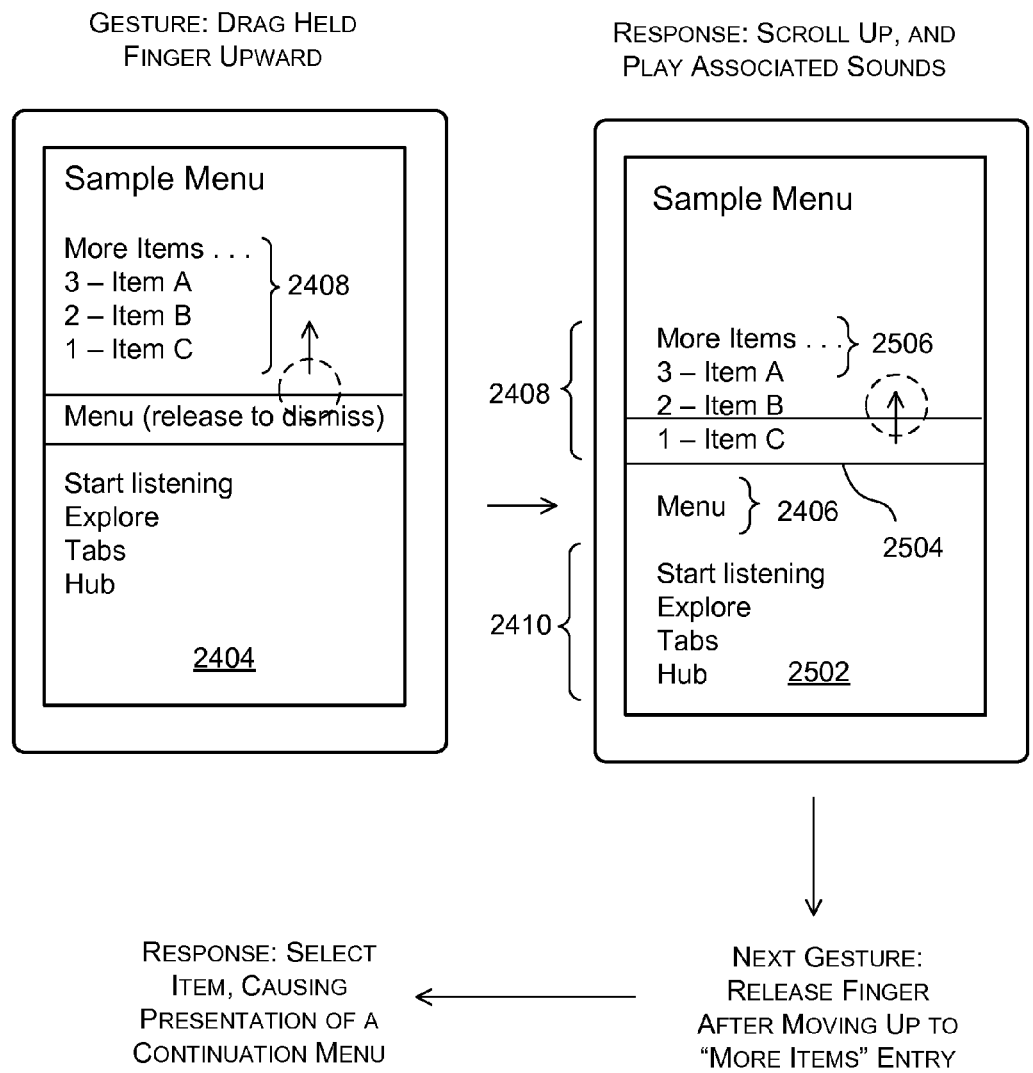
FIG. 25 shows a gesture that a user may use to navigate through a collection of menu items in any menu.

Advancing to FIG. 25, assume that, instead of deactivating the menu 2404, the user decides to scroll up through items in the first grouping 2408. The user may perform this action by moving his or her finger in the upward direction, while maintaining his or her finger on the touch-sensitive surface. In response, the AIM 402 can produce the menu state 2502 shown in FIG. 25. In particular, the AIM 402 has responded to the user's gesture may moving the menu items in the downward direction, which causes a first menu item 2504 to become highlighted, instead of the marker item 2406. To select this menu item 2504, the user may release his or her finger from the menu item 2504. Alternatively, the user may deactivate the menu by moving back to the marker item 2406 and then releasing his or her finger while positioned at that item. Or the user may scroll down in the opposite direction to the second grouping 2410 of menu items. The user can release his or finger while it is positioned on one of the menu items in the second grouping 2410 to select that menu item. A user may find the above user interface behavior beneficial because he or she can interact with the user device 106 with one hand in a seamless and fluid manner, with minimal distractions placed on the user as he or she moves through the environment. For instance, in this implementation, the user is not required to hunt for and select a series of command buttons or menu items; doing so would require the user to give special attention to the user device 106.

In the specific example of FIG. 25, assume that the user scrolls up to the top of the first grouping 2408 of items to select a "more items" menu item 2506, and then releases his or her finger on this menu item 2506. In response, the AIM 402 presents the menu 2602 shown in FIG. 26. That menu provides another first grouping 2604 of menu items that represents a continuation of the first grouping 2408 shown in the previous menu; that is, while the first grouping 2408 in FIG. 25 presents menu items 1, 2, and 3, the first grouping

Figure 26:
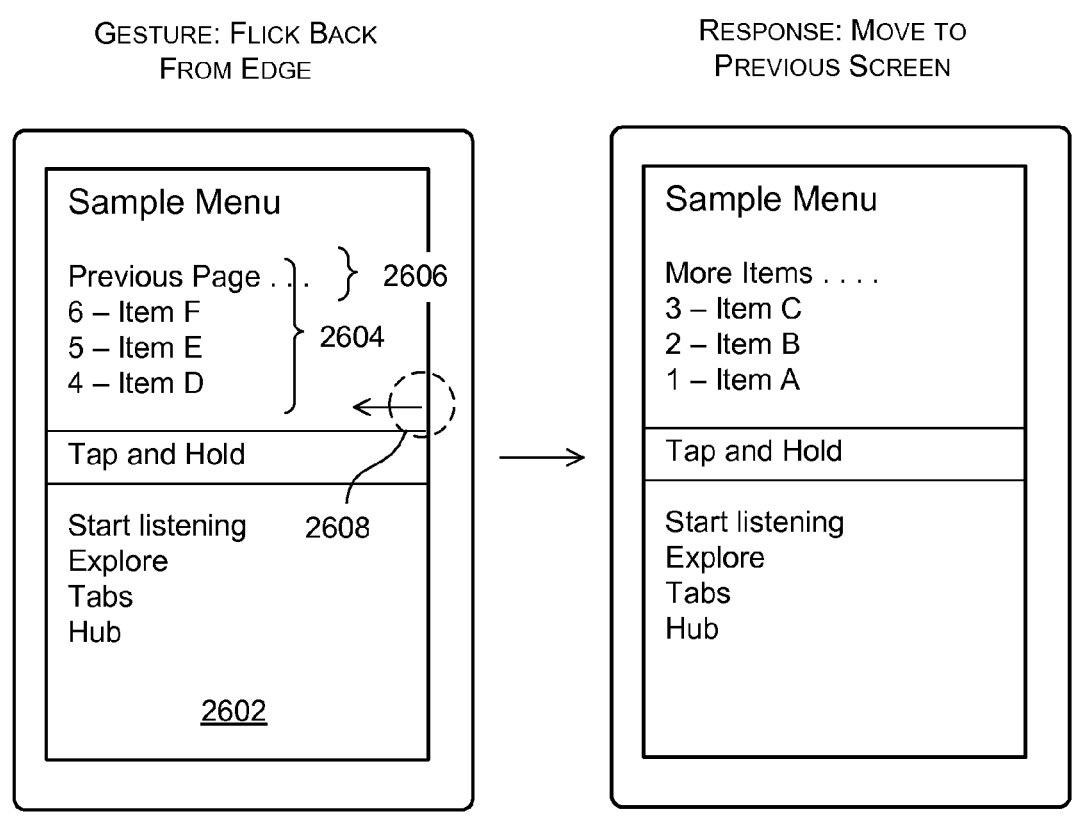
FIG. 26 shows a back gesture that a user may use to navigate from a current menu to some other preceding menu.

2604 of FIG. 26 presents menu items 4, 5, and 6. More generally, the menu structure may represent a complete list of menu items as a series of linked smaller lists. Two linked lists are shown in the example of FIGS. 25 and 26, but the complete list can be formed through any number of linked lists.

The user may return to the menu state 2502 shown in FIG. 25 by scrolling up to the "previous page" menu item 2606, and then releasing his or finger from this item. Alternatively, to execute this back instruction, as shown in FIG. 26, the user may move his or her finger to the periphery of the touch-sensitive surface (e.g., as indicated by the dashed-line circle 2608), and then flick inward towards to the center of the surface. The user may execute the same operation by flicking inward from the opposite edge of the surface.

Although not shown in FIG. 26, the menu 2606 may also give the user the option (via an appropriate menu item) to return to the first page in a series of cascaded menu lists, e.g., rather than successively moving back through the linked lists by issuing a series of back instructions. Further, although also not shown in the drawings, each grouping may include an end-of-list marker item, which designates the end of a grouping. The user can deactivate the menu by moving to this item and removing his or her finger while it is placed on that item.

More generally, the user may execute the type of back gesture shown in FIG. 26 on different types of menus, which may produce different types of actions. For example, a back action on a root (primary) menu presented in the home workspace 1102 may cause the user to exit the application associated with the SI module 302, upon confirmation by the user that this is what he or she intends to do. A back action on a transient menu that is presented in the home workspace 1102 may cause the AIM 402 to present whatever context menu was last presented in the home workspace 1102. A back action on an overlay menu may sometimes result in the presentation of an "underlying" secondary menu in a secondary workspace. For example, a back action on a particular settings-related overlay menu (e.g., as shown in FIG. 22) may result in the display of an underlying settings menu (e.g., as shown in FIG. 18) in the settings workspace 1110.

Figure 27:
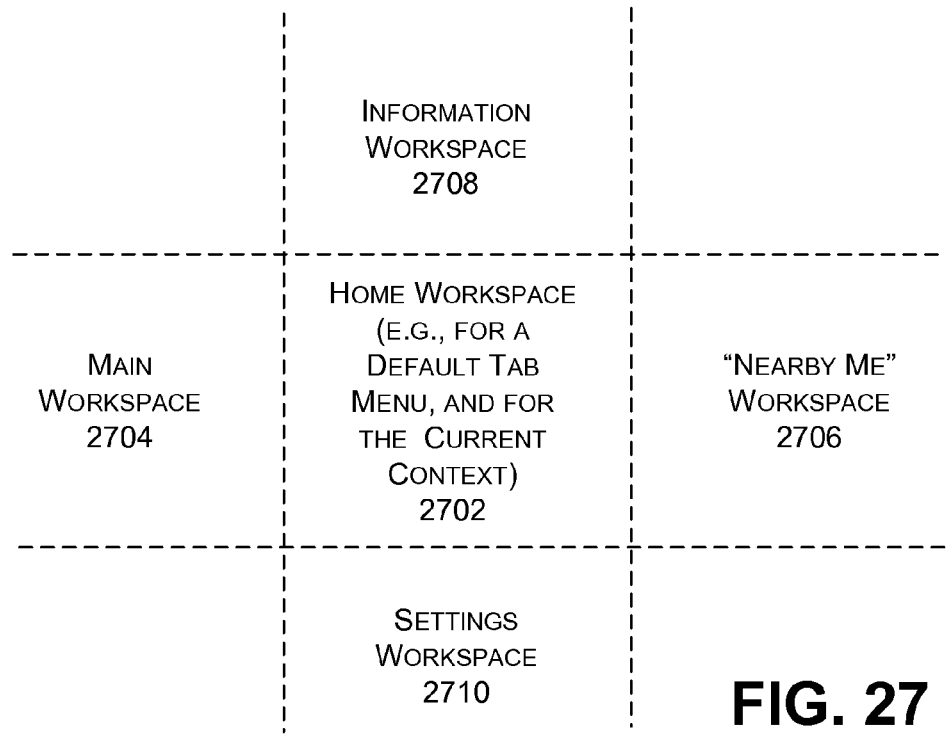
FIG. 27 shows an alternative organization of workspaces, compared to the implementation of FIG. 11.

FIG. 27 shows an alternative organization of workspaces, compared to the implementation of FIG. 11, corresponding to a second implementation of menu functionality provided by the AIM 402. By way of overview, the workspace structure of FIG. 27 includes five workspaces (2702, 2704, 2706, 2708, 2710) that serve the same basic functions as those shown in FIG. 11. For example, the home workspace 2702 continues to serves as the central focus of the user's attention throughout a journey. The home workspace 2702 also continues to display menus and other information associated with the current context encountered in the user's journey (or other type of interaction with a space). But the home workspace 2702 no longer presents a hub menu as a default. Rather, the home workspace is devoted to showing tab-related information as a default.

Figure 28:
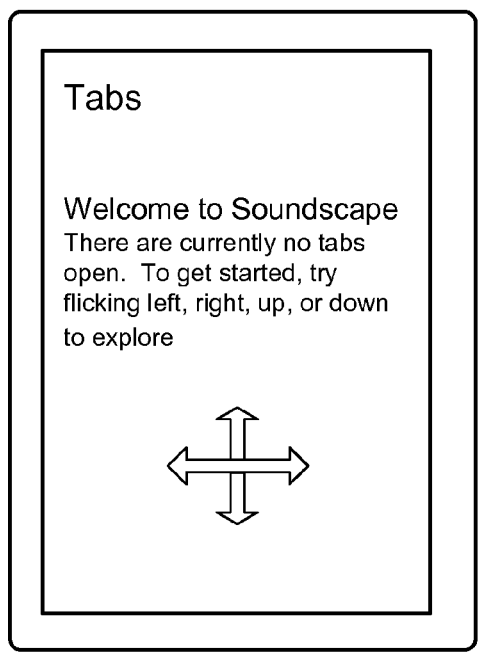
FIG. 28 shows tab information in a home workspace of FIG. 27, corresponding to a state in which a user has not yet created any tabs.

More specifically, the home workspace 2702 shows the default tabs information shown in FIG. 28 when there are no active tabs. The default tabs information may provide guidance on how the user may get started to create tabs. In contrast, the home workspace 2702 may display the tabs menu shown in FIG. 29 when there are active tabs. By default, the tabs menu item having the first position in the list (i.e., tab No. 1) corresponds to a current context.

Figure 29:
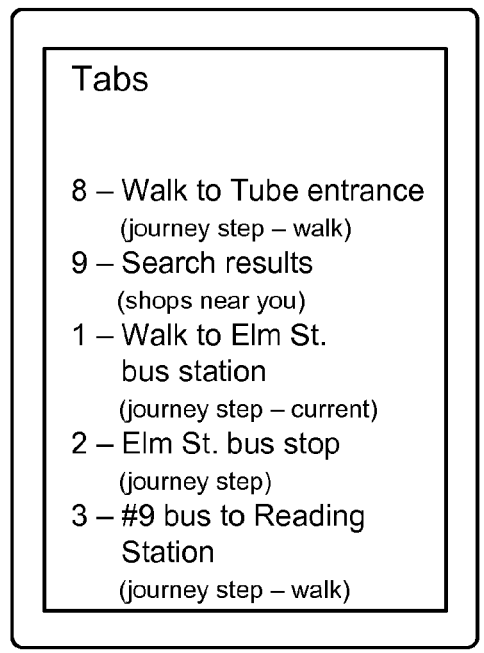
FIG. 29 shows a tab menu in the home workspace of FIG. 27, corresponding to a state in which a user has now created a collection of tabs.

FIG. 29 also shows that the second implementation offers a different menu structure compared to the menu structure described thus far. For example, the second implementation no longer organizes the menu into two groups of menu items, separated by a menu marker. Rather, the second implementation presents a single list of menu items that are determined to be relevant to the user's current focus of interest. If the user wishes to access the type of global menu items that were previously presented in the second grouping, the user may navigate to the main workspace 2704 to access those items.

Figure 30:
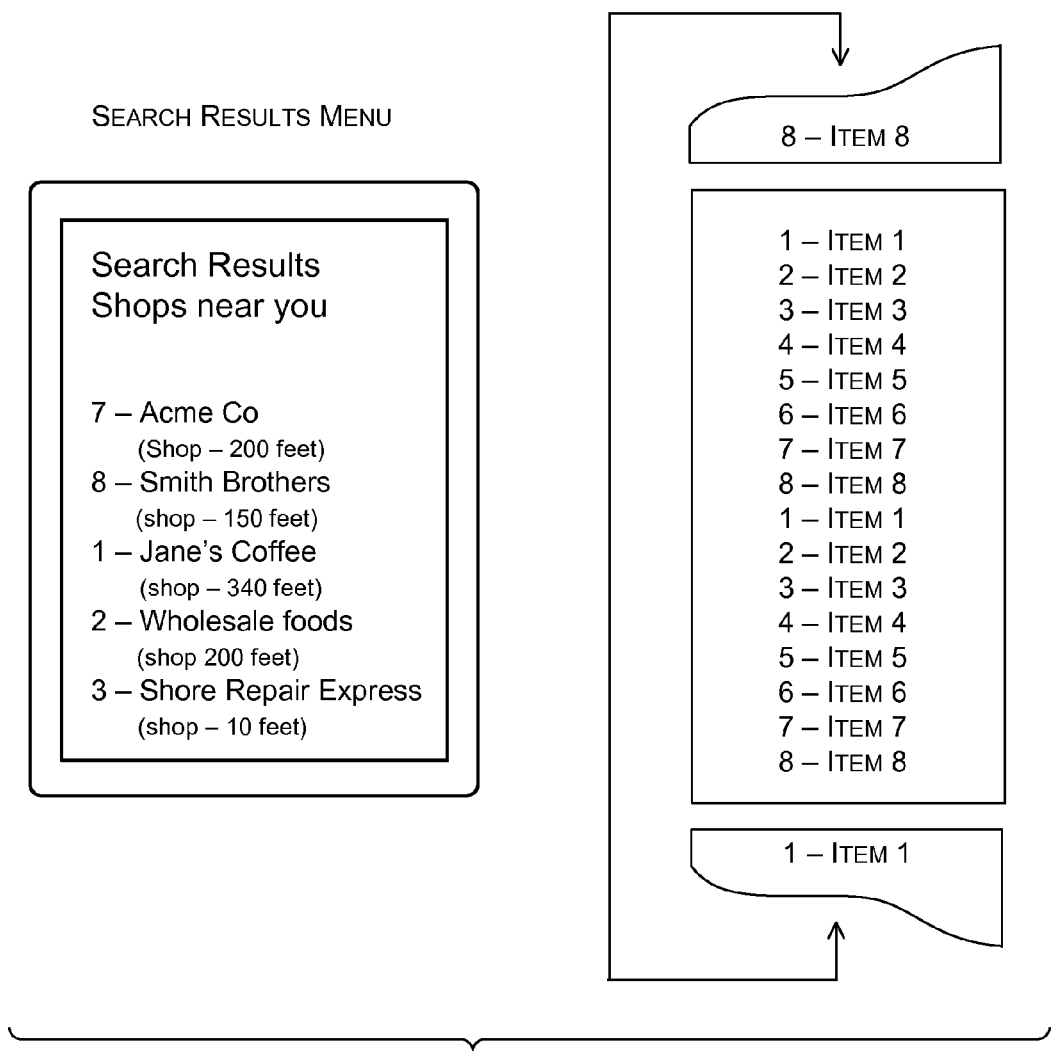
FIG. 30 shows an alternative manner of organizing menu items within a menu, compared to the implementation of FIG. 25.

FIG. 30 presents additional information regarding one possible organization of menu items in a list of menu items. Here, the menu items represent search result items that are produced in response to conducting a search for shops that are nearby the user. The user may activate any menu, such as the menu shown in FIG. 30, by performing the tap-and-hold gesture described above with respect to the first implementation (and as illustrated in FIGS. 23 and 24).

Upon activation of the menu, in the second implementation, the AIM 402 presents the first entry in the list near the middle of the user device's display surface. The user may then move up through the list by making one or more panning gestures in an upward direction, or move down through the list by making one or more panning gestures in the downward direction. When the user reaches the end of the list in either direction, the list repeats. That is, when the user advances past the last item in the list, the user will encounter, as a next entry, the first item. When the user advances past the first item in the list, the user will encounter the last item. Due to this menu presentation strategy, the second implementation may dispense with the use of multiple-page lists, as used in the first implementation. That is, the user navigates through a single master list using one or more panning gestures. A user makes a panning gesture by placing one or more fingers in contact with the touch-sensitive surface, and dragging those finger(s) in a desired direction of panning; the movement here is slower compared to a flick gesture.

Figure 31:
FIGS. 31 and 32 show an alternative manner of scrolling through menu items within a menu, and then selecting a menu item, compared to the implementation of FIG. 25.
Figure 31:

FIG. 31 provides additional information regarding the above-described behavior. The user here makes a panning gesture by dragging the displayed menu in the downward direction. But unlike the case of the first implementation, the user need not keep his or her finger on the surface when navigating through the list. For instance, the user may make plural panning gestures; between each panning gesture, the user may remove his or her finger from the surface. The second implementation will not interpret the removal of the user's finger from the surface as an instruction to select whatever menu item happens to be highlighted at that time. The second implementation may deactivate a menu after a prescribed amount of time of inactivity by the user, or when the user makes a back gesture.

Figure 32:
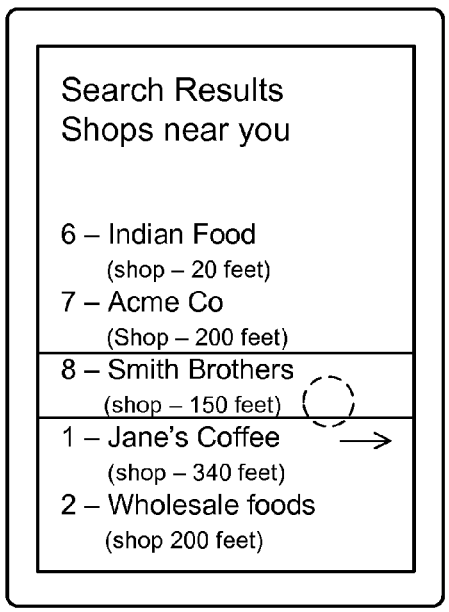

As shown in FIG. 32, a user may select a highlighted item in the list by making a short touch-and-drag gesture towards the periphery of the surface. The AIM 402 will provide audible and/or haptic feedback when it has interpreted the user's gesture as a request to select the highlighted item. Then, the AIM 402 will select the item when the user removes his or her finger from the surface of the user device 106. Alternatively, instead of removing his or her finger, the user may drag his or her finger back in the opposite direction to cancel the selection operation, which the AIM 402 will again confirm (e.g., by providing an appropriate cue or cues).

Figure 33:
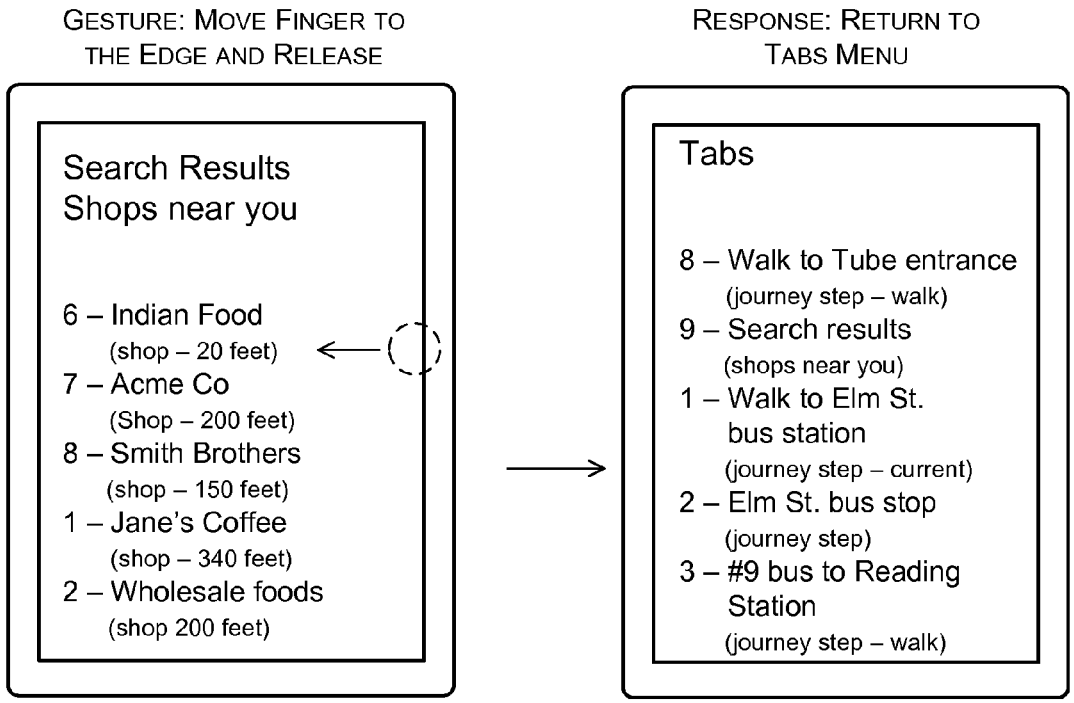
FIG. 33 shows a back gesture performed at the periphery of a menu, and an action that is performed in response to this gesture.

FIG. 33 shows a back gesture performed at the periphery of a menu, and the response to this gesture. More specifically, the user may now perform a back gesture by pulling left or right from the respective edge for a short distance until the AIM 402 indicates that it has understood the user's gesture (e.g., by providing an appropriate cue or cues). At that time, the user can release his or her finger to perform a back action. Or the user may move his or finger in the opposite direction until the AIM 402 interprets the user's action as a request to revoke the back action. In the example of FIG. 33, the back action causes the AIM 402 to transition from a search results menu to a tabs menu.

Figure 34:
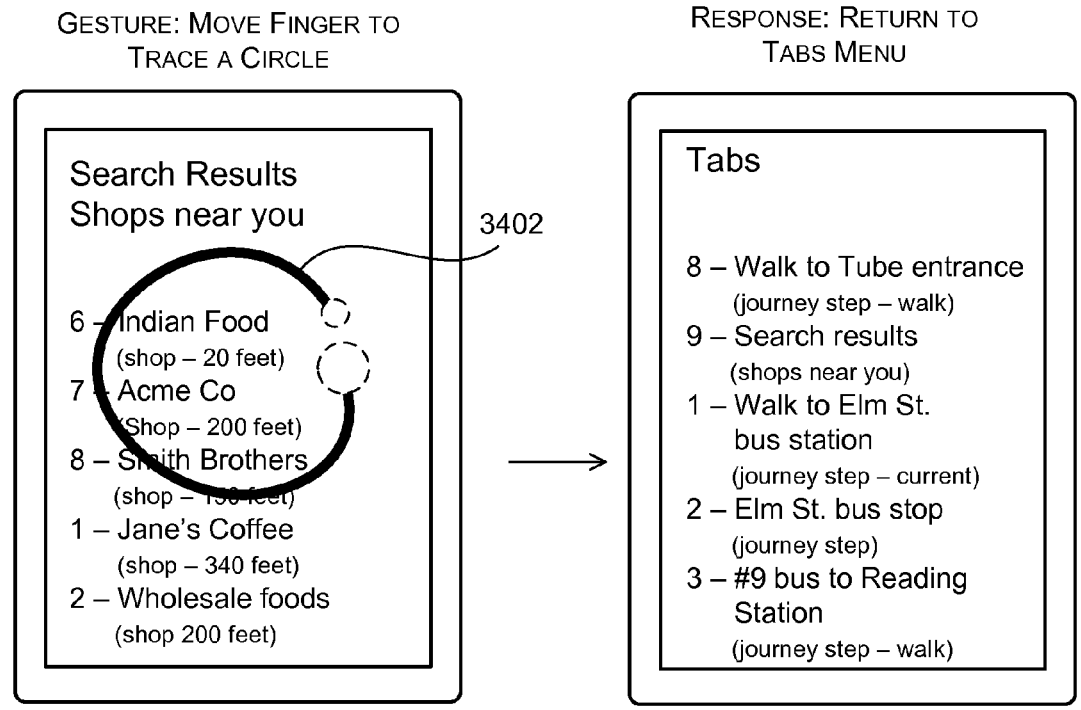
FIG. 34 shows a gesture that is performed by drawing a circle shape on a menu, and a back action that is performed in response to the gesture.

FIG. 34 shows a gesture that a user may perform by drawing a circle shape 3402 on a menu, e.g., by tracing out a circle on a search results menu (for example) that is presented in the home workspace 2702. In response to this gesture, the AIM 402 will return to the tabs menu. Although not shown, the user may subsequently perform the same circle gesture on the tabs menu. In response, the AIM 402 will return to the search results menu (or whatever page from which the user originated—that is, whatever page on which the user drew the original circle).

Figure 35:
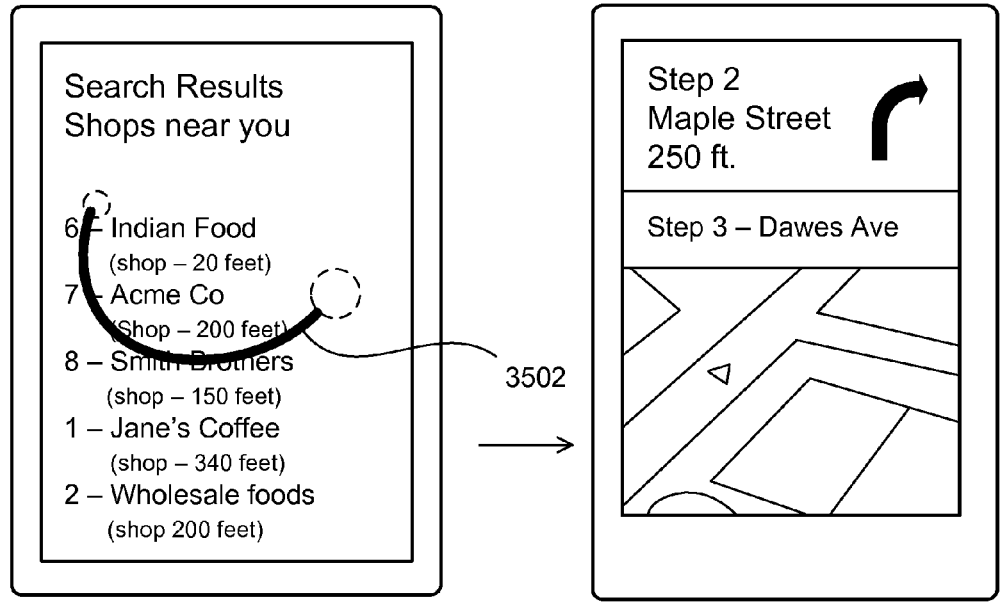
FIG. 35 shows a gesture that is performed by drawing a half-circle on a menu, and a back action that is performed in response to the gesture.

FIG. 35 shows a gesture that the user may perform by drawing a half-circle 3502 on a menu, e.g., by tracing out a half-circle on a search results menu (for example) that is presented in the home workspace 2702. In response, the AIM 402 will return focus to whatever was being presented in the current context. In the example of FIG. 35, the AIM 402 returns to information associated with a current step in the journey (as shown on the right side of FIG. 35). If the user is not currently undertaking a journey, the current context may correspond to whatever menu was opened last. The user can reverse this transition by drawing a half-circle on the page shown on the right side of FIG. 35.

Figure 36:
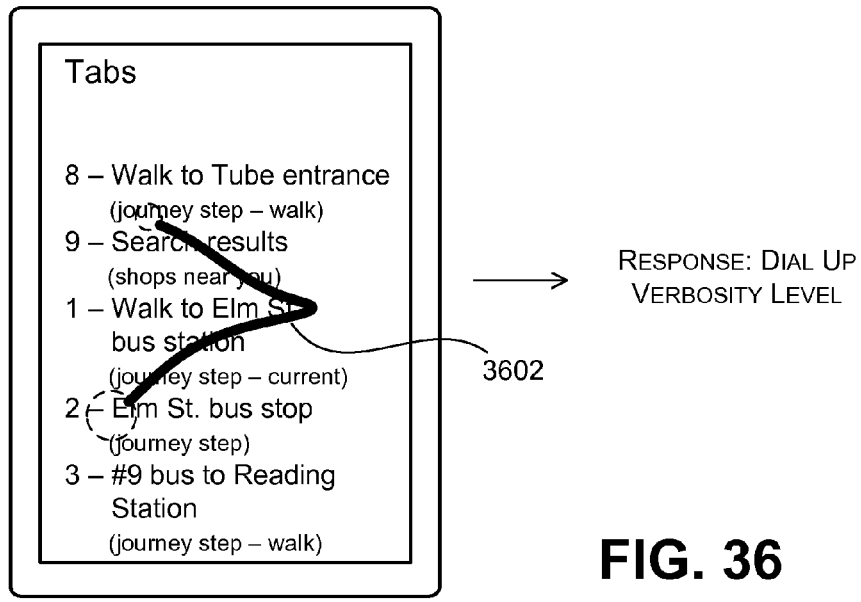
FIGS. 36 and 37 show different gestures that can be used to increase and decrease, respectively, a level of verbosity provided by the system of FIG. 1, and a level of contextual information provided by the system.
Figure 37:
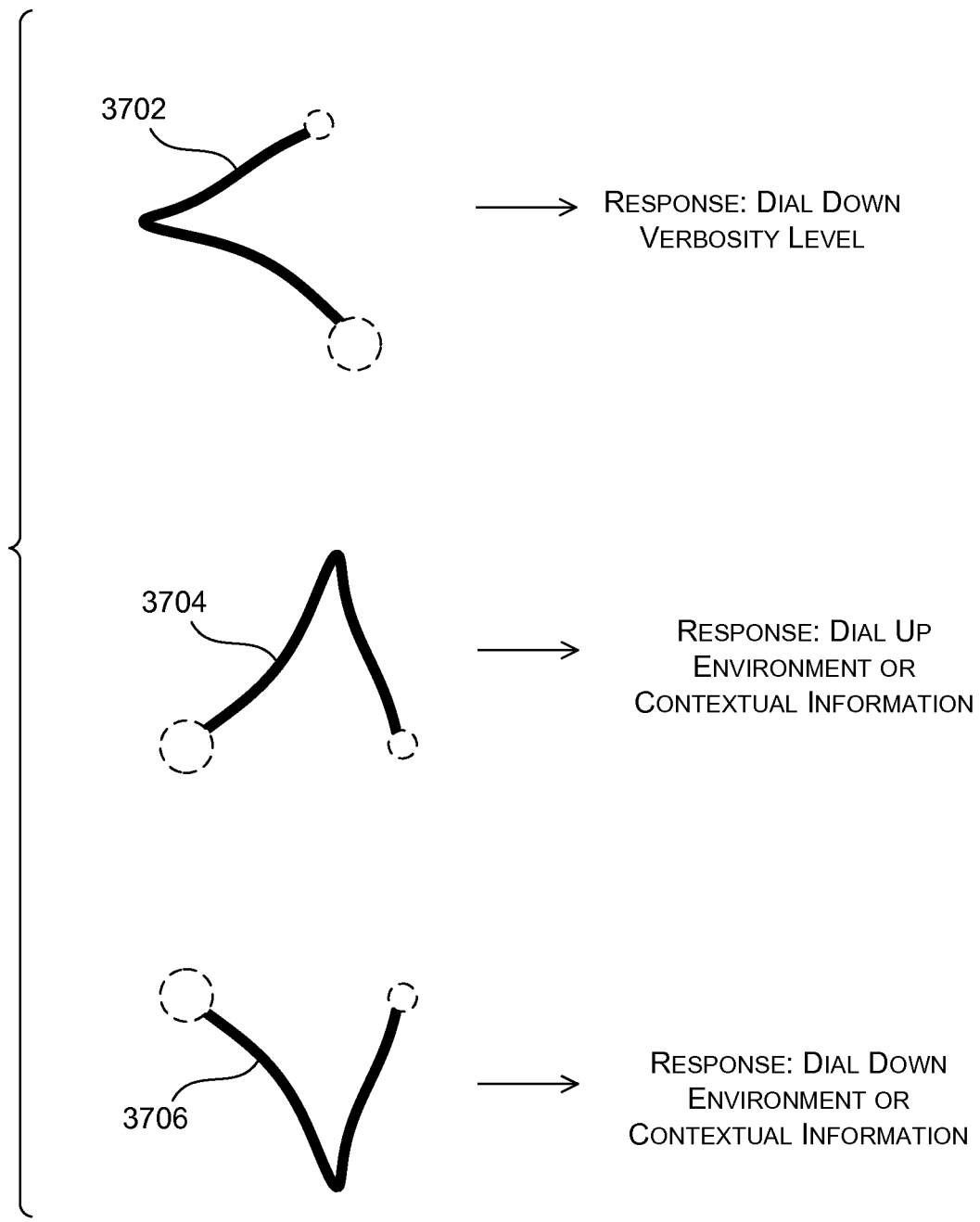

FIGS. 36 and 37 show different gestures that can be used to increase and decrease, respectively, a level of verbosity provided by the system of FIG. 1, and a level of contextual information provided by the system. For example, as indicated in FIG. 36, the user may draw a right-arrow shape 3602 on any menu (here, a tabs menu) to increase the verbosity level of the SI module 302. As indicated in FIG. 37, the user may draw the left-arrow shape 3702 on any menu to decrease the level of verbosity of the SI module 302. The level of verbosity refers to the brevity at which the SI module 302 delivers its audio information, e.g., ranging from terse to detailed.

As also indicated in FIG. 37, the user may draw an up-arrow shape 3704 or a down-arrow shape 3706 on any menu to increase or decrease, respectively, a level of information that is provided to the user. For example, the user may scale back on the quantity of contextual information by refraining from sending the user information regarding one or more of the least critical categories of information items (such as by omitting contextual information, but sending warning information and journey information).

The second implementation may also execute other new gestures (compared to the first implementation), although not specifically illustrated in the figures. For example, the user can perform a tap-and-hold gesture on a first menu to transition from that menu to an actions menu (where the actions pertain to actions that are relevant to the context associated with the first menu). The user may perform the same gesture on the actions menu to return to the original (first) menu. The tap-and-hold gesture in this case involves a longer hold action than the tap-and-hold gesture that is used to generally activate any menu.

As another new gesture, the user may perform a vertical flick gesture while on the menu items of a menu. The AIM 402 will interpret this action as a request to quickly advance through the menu items, in either an up or down direction, depending on the direction of the flick. As another new gesture, the user may perform a horizontal flick gesture on a menu item in a menu to advance to the next menu item in the list. The user can make multiple such horizontal flick features to successively advance through the list, one menu item at a time.

In either of the first or second implementations (corresponding to FIGS. 11 and 27), the user may execute a gesture to place the user device 106 in a pocket mode. When the user device 106 detects that gesture, it will ignore any subsequent gestures that the user may make, with the exception of a gesture that has the effect of canceling the pocket mode. As the name suggestions, the pocket mode is useful in those cases in which the user wishes to stow the user device 106 in a pocket or some other compartment (such as a purse, bag, etc.). When active, the pocket mode prevents accidental touch contact and/or movements by the user as being (incorrectly) interpreted as meaningful gestures. The gestures used to invoke and revoke the mode can correspond, for instance, to telltale swipe gestures, etc.

C.2. Sounds and Haptic Cues

The AIM 402 can present various sounds by leveraging the use of the sound generation module 414. The AIM 402 can also present various haptic feedback experiences (e.g., vibration cues) using the haptic cue generation module 418. The AIM 402 can produce such sounds and vibrational cues in response to different types of triggering events. For example, the AIM 402 can present these sounds and haptic cues in response to certain changes in state, in response to certain interface actions taken by the user (such as navigation among menu items), in response to certain events in a journey, and so on.

The following listing describes representative sounds (and associated haptic cues), and the illustrative circumstances in which they are invoked.

Loading/Busy. The AIM 402 can repeatedly play a Loading/Busy sound while the SI module 302 is in a state in which the user is unable to interact with it. The sound reassures the user that the SI module 302 is working but it is presently busy performing an action. For example, this sound may resemble a ping pong ball bouncing up and down; the frequency of the bounce may increase as the processing nears completion, and may end with a flourish-type sound.

Transition-To-Zone-Menu. This sound indicates that a secondary menu, presented in one of the dedicated secondary workspace zones, has moved into focus and is now being presented instead of the current context menu in the home workspace. This sound may also convey the direction in which the user has performed the corresponding gesture. For example, the sound may resemble a swoosh, like a gust of wind in a respective direction. Further, in one case, the AIM 402 may express this sound as a three-dimensional sound.

Transition-From-Zone-Menu. This sound indicates that the current context menu has moved back into focus and is now being presented instead of a secondary menu in one of the dedicated workspace zones. This sound may also convey the direction in which the user has performed the corresponding gesture. For example, the sound may resemble a swoosh that is the counterpart of the Transition-To-Zone-Menu swoosh, but moving in the opposite direction than the Transition-To-Zone-Menu sound. Again, the AIM 402 may optionally express this sound as a three-dimensional sound.

Menu-Activation. This sound indicates that a menu is now active and can be manipulated. This sound may be described as a fade-in sound that terminates with a snap-in-type sound. In addition, the AIM 402 can present a short vibration cue that confirms the user's intention to produce a change in state. Further still, the AIM 402 may invoke a verbal cue that announces, for example, "menu release to dismiss." That cue informs the user that the menu is active, and that the user can deactivate the menu by releasing his or her finger from the marker item.

Menu-Deactivation. This sound indicates the menu has been deactivated, and thus can no longer be manipulated without reactivating it. The sound may be described as a fade-away-type sound.

Unsupported-Gesture. The AIM 402 may play this short sound that indicates that a gesture was recognized but that it is otherwise invalid (e.g., because it is currently not supported). This sound may resemble a thud, followed by a soft two-tone access-denied-style notification. The AIM 402 may play a more specific Cannot-Go-Back sound to indicate that a back gesture has been performed, but it cannot be performed, e.g., because it is not possible to go further back.

Change-In-Menu-Item-Selection. This sound indicates that the user has moved to a menu item in a menu. The tone of this sound depends on the position of the menu item in the menu, e.g., where the tone may increase as the user moves up the list, and decrease as the user moves down the list. Further, in one implementation, the AIM 402 can present different scales when traversing the first grouping of the menu items (associated with the context-specific items), compared to the second grouping of menu items (associated with the global items). In both cases, the user may perceive the sounds that are produced as similar to the running of a hand over the keys of a piano; but each sound in this case may be shorter that a piano tone, and similar to the pop of a bubble.

Further, the AIM 402 can present a vibration cue upon traversing each menu item. The user may experience the vibration cues as similar to running a hand over a bumpy surface, with each bump representing a different menu item. A user can consciously or subconsciously count the bumps to quickly get a general idea of his or her position within the list. Further, the AIM 402 can present an audio message upon advancing to a menu item that informs the user that the menu item is in focus and will be selected upon release of the user's finger. For instance, the AIM 402 can announce the menu item by giving its number in the list, and then announcing a description of the item.

Confirm-Menu-Selection. This short sound indicates when an action has resulted in a change to the state. It may be implemented as a short and precise sound with a flourish at the end. For instance, the sound may resemble a bleep followed by a travelling grating sound that fades out towards its end. The AIM 402 may also execute a short vibration cue that confirms the select action. Further, the AIM 402 can play a verbal cue that confirms that the item has been selected.

Show-Dialog-Menu. This short sound indicates that an overlay menu is now being presented on top of other content. This sound may resemble a fade-in ascending-type sound. The AIM 402 can also provide an accompanying short vibration cue, which further confirms that a change in state has taken place. Further, the AIM 402 can play a verbal cue that states that the overlay menu is now being presented.

Close-Dialog-Menu. This short sound indicates that a dialog (e.g., an overlay menu) has been closed and that the focus has returned to a previous context. The sound may resemble a fade-out descending-type sound.

Context-Switch. This short and distinct sound indicates that the state of the current context menu has transitioned to present new content, e.g., because the user has advanced to a new journey step, etc. The sound may resemble a bleep followed by a subtle turnstile noise.

The above-described sounds are representative, and not exhaustive of the full suite of sounds that the AIM 402 may provide. The following additional sounds, for instance, may be triggered upon certain actions, performed by the user, while interacting with the AIM 402: a) a To-Actions sound to indicate that a menu of actions is presented, based on a selection of a menu item made in a prior menu; b) a From-Actions sound to indicate that an active menu is presented in response to the return from a menu of actions; c) an Actions-Unavailable sound to indicate that an instruction to present actions for a particular menu has been recognized, but that there are no actions associated with the particular menu; d) an Item-Selectable sound that indicates that a menu item has been successfully marked for selection upon release of the user's finger; e) an Item-Non-Selectable sound to indicate that an item that was previously marked for selection-upon-release has now been successfully un-selected, and thus will no longer be selected upon release of the user's finger; f) an Item-Not-Selectable sound to indicate that a gesture to mark an item for selection has been recognized, but the gesture is not applicable to the item under consideration; g) a Select-But-No-Change sound to indicate that a selection has been made, but that no change in focus is appropriate; h) a Back-Success sound to indicate that a back gesture was recognized and the back action has been invoked; i) a Switch-To-Tabs sound to indicate that a switch-to-tabs gesture has been successfully recognized and that the tabs menu is now being presented; j) a Switch-From-Tabs sound to indicate that a switch-from-tabs gesture has been recognized and the prior menu, that was presented prior to switching to the tabs menu, has been restored; k) a Start-Listening sound to indicate that the SI module 302 is now listening for a user's voice commands; l) a Cancel-Listening sound to indicate that the voice recognition mode has now been canceled; m) a Finished-Processing sound to indicate that the application has completed receiving and processing a voice input; n) an Action-Taken sound to indicate that an action has been taken as a result of a voice-based input, and so on. Further, the AIM 402 can also present any type of haptic cues that will accompany any of the sounds described above.

The following illustrative sounds may be triggered upon certain events that may occur in the course of the user's interaction with the headset 108: a) a Button-Tap sound (played prior to performing an action) to indicate that a tap gesture has been recognized on a headset button; b) a Button-Press sound (played prior to performing any action) to indicate that a press gesture has been recognized on a headset button; c) a Buttons-Held sound (played prior to performing an action) that indicates that a hold gesture has been recognized on a headset button; d) a Cancel-Action sound that indicates that any previous action, invoked from a headset button, has been cancelled, e.g., for a request to stop announcing contextual IOIs as part of the orientation action, and so on. Further, the AIM 402 can also present any type of haptic cues that will accompany any of the sounds described above.

The following illustrative sounds may be triggered upon certain events that may occur during the course of a journey: a) a Started-Journey sound to indicate that a journey has been started and that navigation is now in progress; b) a Mode-Switch sound that indicates that the user has switched his or her mode of transport (e.g., from walking to train, etc.); c) a Beat sound to directionally indicate the next point along the journey that the user is trying to get to as part of navigation; d) a Warning sound to indicate that warning information is about to be read aloud, played to heighten the user's awareness and give the user time to tune-in for that information; e) a Waypoint-Reached sound to indicate that the user has reached a journey waypoint and that navigation information is about to be read aloud, played to heighten the user's awareness and give the user time to tune-in for that information; f) an Approaching Waypoint sound to indicate that the user is approaching a waypoint and that navigation information is about to be read aloud, played to heighten the user's awareness and give the user time to tune-in for that information; g) a Journey-Update sound that is played to indicate that information regarding a change to the current journey is about to be read aloud, played to heighten the user's awareness and give the user time to tune-in for that information; h) a Contextual-Information sound that indicates that contextual information is about to be read aloud; i) a Further-Information sound that indicates that additional information is about to be read aloud, and so on. Further, the AIM 402 can also present any type of haptic cues that will accompany any of the sounds described above.

Generally, the above sounds and haptic cues further promote the goal of providing useful information to the user as the user interacts with his or her environment, without unduly distracting the user. For example, the sounds and haptic cues that the user hears while navigating a menu allow the user to interact with the menu without diverting his or her attention from the environment.

C.3. Voice Recognition Mode

The system 102 supports a voice-recognition mode in which the user may issue commands to the system 102 via spoken instructions, e.g., in addition to manually interacting with the headset 108 and/or user device 106. Or the system 102 can use the voice-recognition mode as the sole mode in which the user interacts with the system 102. To perform recognition of the user's voice commands, the system 102 may rely on pre-existing voice recognition technology (e.g., the CORTANA system provided by MICROSOFT Corporation), and/or native voice recognition technology. FIG. 3 illustrates the voice recognition technology as the speech processing engine 328.

As mentioned above, the user can invoke the voice-recognition mode via an appropriate command issued through the headset 108 and/or the menus of the user device 106. In other cases, the user device 106 may already be interacting with a voice recognition system (e.g., COR-TANA) as part of its default manner of operation, but not in the context of performing navigation. Here, the user may interact with the SI module 302 in the voice-recognition mode by issuing a spoken command that is preceded by the name of the navigation application, e.g., by speaking the command, "Soundscape, start explore mode." If the user has already activated the voice-recognition mode in the context of the navigation application, the user can just say, "Start explore mode," or the like.

The following list identifies illustrative operations that may be initiated in voice mode: a) the user may open an existing (saved) journey; b) the user may activate or reactive the orientation mode; c) the user may activate or deactivate the explore mode; d) the user may ask for more information about a particular topic; e) the user may request the cessation of all (or some) spoken messages; f) the user may make various parameter settings; g) the user may save journey information, and so on.

Illustrative commands may correspond to: a) "Create a route to destination [x], leaving at time [y], using only public transport [z]"; "Find the closest coffee shop"; c) "Get me to a train station"; d) "What is the time?"; e) "Increase volume"; f) "Remove restaurants from items of interest," etc.

The speech processing engine 328 may sometimes encounter a situation in which it understands the user's command, but it determines that the command omits one or more items of necessary information. In response, the speech processing engine 328 can ask the user to supply the missing items of information.

In other cases, the speech processing engine 328 may encounter a situation in which it does not understand the user's command. In those cases, the speech processing engine 328 can ask the user to rephrase the command. If that is not successful, the speech processing engine 328 may present proposed interpretations of the user's utterance to the user (e.g., based on the detection of keywords in the user's command), and then ask the user whether any of the interpretations are correct. If that is not successful, the speech processing engine 328 may invite the user to enter an equivalent command via the headset 108 and/or the user device 106.

Figure 38:
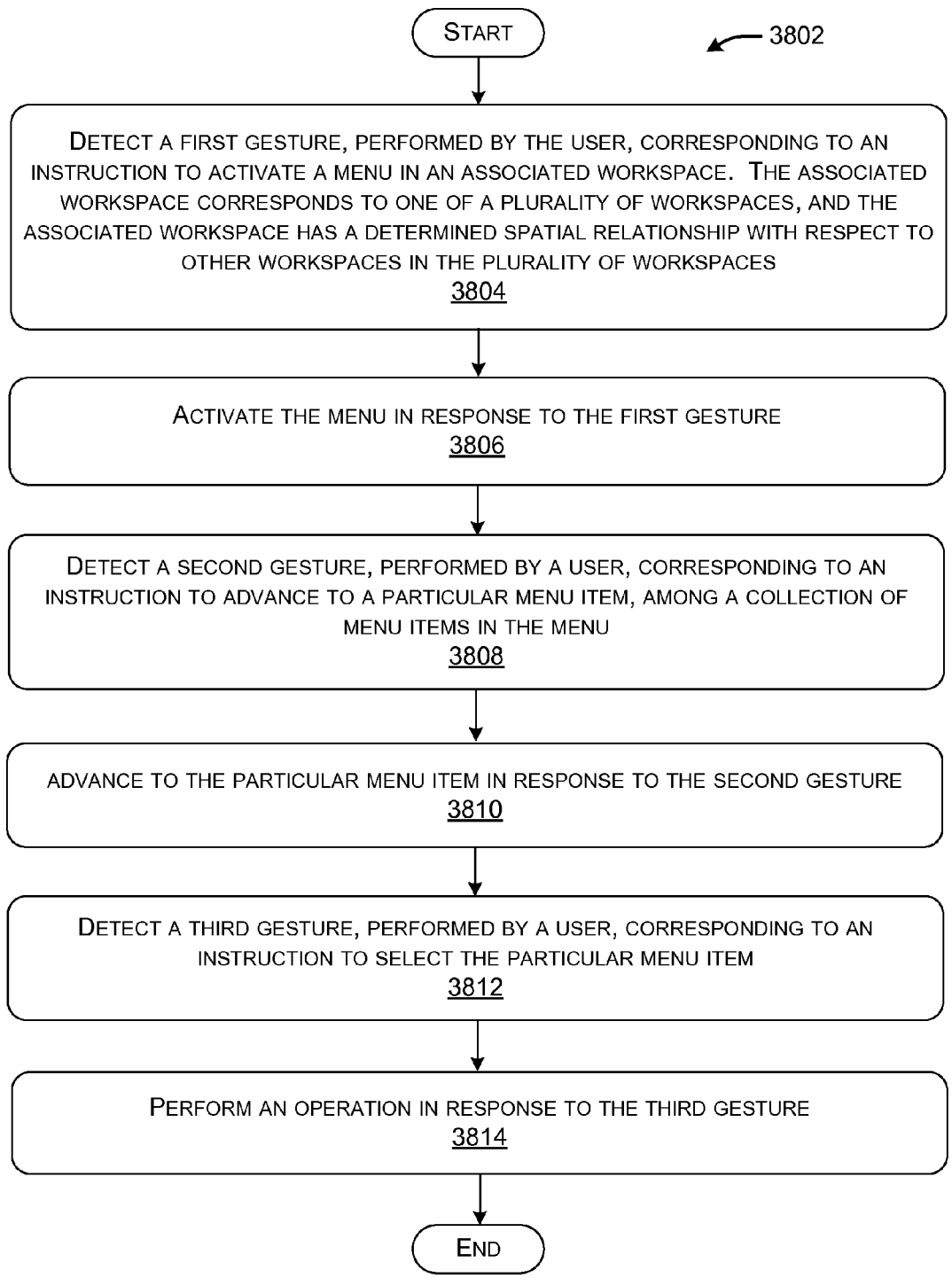
FIG. 38 is a flowchart which summarizes one manner of operation of the application interface module of FIGS. 4 and 5.

FIG. 38 shows a process 3802 which summarizes one manner of operation of the AIM 402 of FIGS. 4 and 5. In block 3804, the AIM 402 detects a first gesture, performed by the user, corresponding to an instruction to activate a menu in an associated workspace. The associated workspace corresponds to one of a plurality of workspaces, and the associated workspace has a determined spatial relationship with respect to other workspaces in the plurality of workspaces. The first gesture, for example, may correspond to the above-described tap-and-hold gesture described with reference to FIG. 24. In block 3206, the AIM 402 activates the menu in response to the first gesture.

In block 3808, the AIM 402 detects a second gesture, performed by a user, corresponding to an instruction to advance to a particular menu item, among a collection of menu items in the menu. The second gesture, for example, may correspond to any of the types of scrolling or panning gestures described above (e.g., with reference to FIGS. 25 and 31). In block 3810, the AIM 402 advances to the particular menu item in response to the second gesture.

In block 3812, the AIM 402 detects a third gesture, performed by a user, corresponding to an instruction to select a particular menu item. The third gesture, for example, may correspond to the type of release gesture shown in FIG. 25 or the type of pull-to-the-side gesture show in FIG. 32. In block 3814, the AIM 402 performs an operation in response to the third gesture. The operation may correspond to the invocation of an action, the setting of a parameter, the presentation of information, etc.

In summary, the above features allow the user to safely and efficiently move through his or her environment. For example, the workspaces provide a user-friendly way of surfacing the most relevant information to the user as the user moves through the environment. Further, some of the features allow the user to interact with a user interface presentation without directing visual attention to that presentation, and/or without having to perform cumbersome and complex gestures that divert the user's attention from the physical task of interacting with the environment. For instance, the user may perform some of the gestures with a single hand without looking at the user interface presentation.

D. Facilitating Interaction Between Users and their Environments Using Sounds

Figure 39:
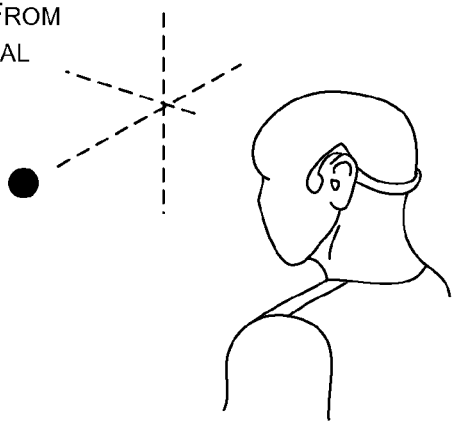
FIG. 39 demonstrates the use of three-dimensional audio information to create a perception of sound which emanates from a particular location within space.
Figure 40:
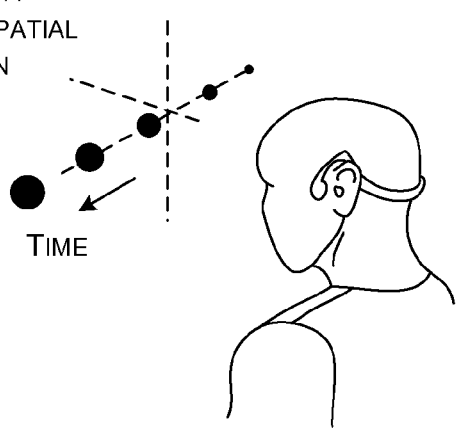
FIG. 40 demonstrates the use of three-dimensional audio information to create a perception of sound that moves across a series of locations within space.

As described in the introductory Section A, the sound generation module 414 (of FIG. 4) can generate non-three-dimensional (non-spatial) sounds and three-dimensional (spatial) sounds. A three-dimensional sound is a sound which the user perceives as emanating from at least one location in physical space, even though it has no actual origin in physical space. For specifically, FIG. 39 demonstrates the use of three-dimensional audio information to create a perception of sound which emanates from a particular location within space. FIG. 40 demonstrates the use of three-dimensional audio information to create a perception of sound that moves across a series of locations within space.

In one implementation, the sound generation module 414 can produce a three-dimensional sound using a library of Head-Related Transfer Functions (HRTFs), e.g., as provided in the data store 416. An HRTF models the anatomical features a person's face that have a person-specific bearing on the manner in which that person perceives the origin of sound in his or her environment. To produce a three-dimensional sound, the sound generation module 414 can choose an HRTF that is appropriate for a particular person, and for a particular sound location in space (relative to the person's location). The sound generation module 414 can then apply that HRTF to modify a non-three-dimensional sound (e.g., a flat or non-spatial sound), to produce the three-dimensional sound, e.g., by convolving the non-spatial sound with the chosen HRTF.

More specifically, in one case, the sound generation module 414 can receive input information which describes: (a) the non-three-dimensional sound to be played; (b) the location in space at which the sound is to be perceived as originating; and (c) (optionally) the identity of the user. The input information can describe the non-three-dimensional sound by providing reference information which identifies audio information in the data store 416, and/or may provide the audio information itself. For example, the non-three-dimensional sound may correspond to a telltale tone and/or a spoken message. Then, for each ear of the user, the sound generation module 414 can: (a) identify an HRTF associated with the location, for the particular user under consideration; and (b) apply the HRTF to the non-three-dimensional sound to produce the three-dimensional sound. The input information that is provided to the sound generation module 414 may originate from one or more of the other modules of the SI module 302 described below, e.g., corresponding to the path guidance module 420, the relevant information determination (RID) module 426, the exploration module 430, the orientation module 432, etc.

The sound generation module 414 performs the above functions with respect to a library of HRTFs provided in a data store 416. In one implementation, the SI module 302 can store HRTFs in the data store 416 that have been prepared for particular individuals (and which thus take into account the particular anatomical features of these people). For example, the HRTFs, for each person, can be obtained by measuring the physical characteristics of each person's face. That task, in turn, can be performed in manual fashion (e.g., by using physical distance-measuring tools), by using a depth camera (e.g., by using the KINECT system provided by MICROSOFT Corporation of Redmond, Wash.), and so on. More specifically, the set of HRTFs that is generated, for a particular person, includes an HRTF for each location of sound in space (with respect to the position of the user's head), and for each of the user's two ears. Different implementations may entrust different individuals to create these HRTFs (e.g., acoustic engineers, system administers, end users, etc.).

In a second implementation, the sound generation module 414 can store separate groups of HRTFs that perform well for different respective groups of people. The system 102 can then invite an end user to choose the set of HRTFs that is perceived as producing the most realistic three-dimensional sounds. For instance, a user may make this choice in a set-up phase, by asking the system 102 to produce the same three-dimensional sound(s) using different HRTFs; the user may choose the sound(s) (and the corresponding HRTF) that produce the most desirable result. In a third implementation, the sound generation module 414 can store a single set of HRTFs that have proven suitable for a large population of users, even though these HRTFs are not customized for any particular person or group of people. Still other techniques may be used to generate and/or select suitable HRTFs.

In one implementation, the sound generation module 414 generates three-dimensional sounds that convey wideband audio information. Wideband audio information is audio information that includes a wide distribution of audio frequencies, e.g., in one implementation, in the range of 300 Hz to 3.4 kHz. Further, the individual three-dimensional sounds are expressive in nature to further emphasize their directionality. For example, one such three-dimensional sound may resemble a gust of wind blowing from left to right or from left to right. Other properties of the audio information (besides its HRTF-based directionality) may contribute to its expressiveness, such as by providing variations in volume, tone, reverberation, looping frequency (for repeating sounds), etc. All of these factors contribute to a realistic perception that sound is originating from a particular location (or locations) in physical space.

As also described in Section A, different modules may leverage the use of three-dimensional sounds for different purposes and in different modes of operation. These modules include the path guidance module 420, the RID module 426, the exploration module 420, the orientation module 432, etc. To simplify description, each such module is sometimes described as producing three-dimensional sounds. In actuality, each module produces the sound by generating the above-described input information, which it feeds to the sound generation module 414; the sound generation module 414 then uses the input information to produce the actual three-dimensional sounds.

With reference to FIG. 41, first consider the operation of the path guidance module 420. As already described, the path guidance module 420 determines the current direction in which the user is headed. The path guidance module 420 can make this assessment based on any of the information provided by the system's orientation determination mechanism(s), motion determination mechanism(s), position determination mechanism(s), and so on. In one case, for instance, the path guidance module 420 can determine the direction in which the user's head is pointed (e.g., based on an orientation determination mechanism in the headset 108), and then use this information as a proxy for the direction in which the user is presumed to be headed. Alternatively, or in addition, the path guidance module 420 can determine a series of locations that the user has recently traversed. The path guidance module 420 can use this information to project a direction that the user appears to be headed. Alternatively, or in addition, the path guidance module 420 can determine the direction in which the user is purposely pointing his or her user device 106.

The path guidance module 420 can also determine the desired direction of the user. The path guidance module 420 can determine the desired direction based at least the current location of the user and the location of the next waypoint. The path guidance module 420 can also take into consideration map information when determining the desired direction. For example, the map information may reveal that the user's path is restricted in various ways, e.g., by the course of a roadway, obstacles of any type etc. The path guidance module 420 can use all of this information to determine the direction that the user should be headed to ultimately place the user on course to reach the next waypoint, in the most efficient manner possible.

Based on the actual direction and the desired direction, the path guidance module 420 can then determine the extent to which the user may be deviating from the desired direction, e.g., to provide deviation information. The path guidance module 420 can then use the deviation information to generate a three-dimensional sound that will have the effect of steering the user in a desired direction, e.g., by feeding the deviation information to the sound generation module 414 as part of the input information.

To clarify the above description, consider the illustration of FIG. 41. Here, the user is located at a current location 4102. The next waypoint (w) is located at target location 4104. The user's current (actual) direction is denoted as direction 4106. The user's desired direction 4108 corresponds to that vector which connects the current location 4102 of the user with the target location 4104, although, as noted above, this need not be the case in all situations (e.g., due to an obstruction which blocks a direct route from the current location 4102 to the target destination 4104). The deviation information may correspond to the angular difference between the current direction 4106 and the desired direction 4108.

In response to the above determinations, the path guidance module 420 can produce a three-dimensional sound (using the sound generation module 414) which appears to originate from the location 4110. In other words, the user is currently headed off to the left of the desired direction 4108. The user will hear the directional cue emanating off to the right. The user will perceive that cue as urging the user to veer towards the right to correct the direction of his or her path. If the user starts moving in a direction that is too far to the right of the desired direction 4108, the path guidance module 420 may produce a three-dimensional sound (using the sound generation module 414) off to the left of the user. The user may continue on, essentially following or pursuing the direction of the perceived three-dimensional sound. When the user is headed in the correct direction, the three-dimensional sound will be perceived as emanating directly in front of the user; the user then heads straight for that sound.

As noted above, the path guidance module 420 can use the sound generation module 414 to create a three-dimensional sound that is periodic in nature, e.g., corresponding to a beat sound. For instance, the beat sound may correspond to a repeating single tone or a two-tone or n-tone clip-clop sound, and so on. In addition, or alternatively, the three-dimensional sound can appear to move in the direction that the user is being urged to move, e.g., from left to right, or right to left, etc.

Moreover, the path guidance module 420 can provide input information to the sound generation module 414 which has the effect of varying one or more audio characteristics of the beat sound, depending on an extent to which the user's actual current direction 4106 deviates from the desired direction 4108. For instance, the path guidance module 420 (in conjunction with the sound generation module 414) can generate a beat sound having a first tone and/or a first looping frequency when the user's current deviation from the ideal path is within a first threshold. The path guidance module 420 (in conjunction with the sound generation module 414) can generate a beat sound having a second tone and/or a second looping frequency when the user's current deviation is outside the first threshold, but within a second threshold, and so on. The path guidance module 420 can classify the user's deviation into any number of such deviation categories, each being associated with a particular beat sound.

In the particular example of FIG. 41, the path guidance module 420 defines a first range 4112 of deviations from the desired direction 4108 and a second range 4114 of deviations from the desired direction 4108, the second range 4114 being larger than the first range 4112. The current direction 4106 falls within the second range 4114, and therefore the path guidance module 420 (in conjunction with the sound generation module 414) will generate a beat sound that is appropriate for this range 4114.

In actual practice, the path guidance module 420 is useful in many circumstances, but may be perceived as most useful in two circumstances. In a first case, a user may reach an intersection at which he or she is expected to turn in a particular direction, among a fixed set of available options. Or the user may reach a fork in the road in which he is expected to choose one of the possible paths. The path guidance module 420 (in conjunction with the sound generation module 414) can provide unambiguous guidance to the user by playing a three-dimensional beat sound that the user perceives as resolving his or her navigation choices. For example, when standing in an intersection, the user will hear the beat sound leading him or her to the left or right (for example). When standing at a fork in the road, the user will perceive the beat sound as leading him or her down the correct fork in the road.

In a second scenario, the user is moving across a more open space in which he or she is given more latitude to gradually veer off course (compared to the case in which the user is walking down a well-defined road or path). Here, the path guidance module 420 may give the user incremental nudges in the manner illustrated in FIG. 41 to keep the user on a proper heading.

In another use scenario, the relevant information determination (RID) module 426 can determine, at each point along a user's path, and for each corresponding current context, the location of relevant items of interest (IOIs), such as contextual IOIs. The RID module 426 can then use the sound generation module 414 to generate a three-dimensional sound for each IOI. The user will perceive that sound as originating from the actual location of the corresponding physical entity in physical space, that is, assuming that the IOI corresponds to a physical entity having a discrete physical location in space. For example, the RID module 426 (in conjunction with the sound generation module 414) can generate the following audio information for a particular IOI that has a counterpart physical entity in the user's vicinity: [3D sound], "Jane's Coffee Shop, restaurant, 30 feet ahead." In other words, in this case, the audio information includes a three-dimensional sound, followed shortly thereafter by a spoken message. The user will perceive the three-dimensional preliminary sound as emanating from a physical location of Jane's Coffee Shop. The spoken message may also be presented as a three-dimensional sound (although it need not be). The spoken message could alternatively include additional (or fewer) fields of information, or could be omitted entirely.

In other cases, an IOI may have a general origin in space, rather than a pinpoint location. For example the IOI may correspond to an advertisement that is associated with a general area that, in turn, corresponds to a bus stop. The RID module 426 (in conjunction with the sound generation module 414) can generate a sound for that IOI that is perceived by the user as emanating from the general area of the bus stop, or from the center of that area, etc. That type of IOI may be considered virtual insofar as it is not intended to describe the bus stop, but operates as an audio attribute of the bus stop.

In another implementation, the audio information can also include a verbal cue which specifies the directional location of the IOI, relative to the user. That directional cue can be expressed broadly (e.g., by specifying that Jane's Coffee Shop is ahead of the user and to the right), or more narrowly (e.g., by specifying that Jane's Coffee Shop is located at 10 o'clock, relative to the current direction of the user). In addition, or alternatively, the RID module 426 (in conjunction with the sound generation module 414) can provide different three-dimensional sounds for different respective categories of IOIs, e.g., by playing a first type of sound for restaurants and a second type of sound for restroom facilities, etc.

Both the exploration module 430 and the orientation module 432 leverage the above-described behavior of the RID module 426, e.g., in the explore mode and the orientation mode, respectively. As described in Section A, the user may enter a command to expressly activate and deactivate these modes, e.g., via manual interaction with the headset 108 and/or the user device 106, and/or via a voice instruction.

More specifically, FIG. 42 shows the illustrative behavior of the exploration module 430, operating in the explore mode. In this mode, once the explore mode is activated by the user, the exploration module 430 determines the current location of the user and the current focus of interest of the user. For example, the exploration module 430 can use any position determination mechanism(s) on the headset 108 and/or on the user device 106 to determine the location of the user at the present time (e.g., using a GPS sensor, etc.). The exploration module 430 can use any orientation mechanism(s) on the headset 108 and/or on the user device 106 to determine the direction at which the user appears to be orienting his body. For example, the orientation mechanism(s) on the headset 108 can determine the direction at which the user's head is pointed, which can be used as a proxy-indication of the user's focus of interest. Alternatively, or in addition, the system 102 may instruct the user to point the user device 106 in the direction that matches his or her focus of interest; in that case, the orientation mechanism(s) of the user device 106 will correctly reflect the user's intended focus of interest. Still other techniques can be used to assess the user's presumed focus of interest.

Next, the exploration module 430 defines a search space of interest. In one case, the exploration module 430 may define the search space as a volume of any shape that is centered on the user's presumed focus of interest. For example, the volume may correspond to a wedge-shape volume which originates from the user's current location and which is bisected by the user's presumed focus of interest. System-defined and/or user-defined parameter settings may specify the depth of the volume, the angular span of the volume, the width of the volume, etc.

Next, the exploration module 430 may use the RID module 416 to search the volume for the presence of IOIs of interest, such as, but not limited to, contextual IOIs. The RID module 416 can perform this task by consulting one or more data stores which provide information about IOIs, together with any parameter settings which define the user's particular interests (for example, the user may have indicated that he or she is, by default, interested in restaurant information, with the exclusion of coffee shop information). In some cases, an IOI may be associated with the search space because it has a counterpart physical entity that is physically located in the search space. In other cases, an IOI may be associated with the search space because of some other nexus established in any other way. For example, an administrator (or an end user himself or herself) can manually specify, in advance, that the area near the exit of a subway station is to be associated with a weather report IOI, and so on.

Finally, the exploration module 430 can generate three-dimensional audio messages which announce the presence of the IOIs that have been identified. The exploration module 430 can generate these messages in any manner described above by leveraging the sound generation module 414. For example, as described above, the audio information may correspond to an introductory sound, followed by a spoken message which announces the IOI. The exploration module 430 (in conjunction with the sound generation module 414) can read off these IOIs in an order, such as in clockwise order across the volume, or counterclockwise order, and/or by increasing or decreasing distance relative the location of the user, etc.

FIG. 42 clarifies the manner of operation described above. Here, the user is presently located at a current location 4202. The user's current direction of attention is indicated by the dashed line 4204. The search volume is defined by the contour 4206, which is bisected by the user's direction of attention. That search volume defines an angular swath, and may also have a prescribed height (not shown), such as 30 feet. Overall, the search volume resembles a wedge. The exploration module 430 uses the RID module 426 to find three contextual IOIs in the search volume. The exploration module 430 (in conjunction with the sound generation module 414) announces these contextual IOIs by three-dimensional sounds which appear to originate from the locations of the physical entities associated with the contextual IOIs.

Overall, the user may interact with the exploration module 430 by rotating his direction of attention, by pivoting about his current location, in stages. At each stage, the user may wait to hear the IOIs that lie within (or are otherwise associated with) the search volume thus defined by his current presumed attention of focus, prior to moving on to a new focus of attention. For example, in one case, the swath encompassed by a user's direction of interest is 45 degrees. The user could conduct a complete inventory of IOIs around him by turning to the northeast, the southeast, the southwest, and the northwest, in succession. At each orientation, the user will hear the IOIs that are encompasses in that quadrant of interest.

According to another illustrative feature, the user may select an IOI in any manner after hearing it announced. For example, the user may issue the voice instruction "take me there" or "more information" after hearing about Jane's coffee shop. Or the user may select the IOI by turning his or her focus of attention towards the perceived location of the IOI (e.g., based on the perceived location of the three-dimensional sound which announces this IOI). The user may perform this task, for instance, by turning his head or body or user device 106 directly towards the perceived location of the IOI. Or the user may select the IOI via an appropriate menu provided by the user device 106. Or the user may make an appropriate selection via a headset button after hearing the IOI being announced, etc. In response to the selection of the IOI, in whatever manner made, the SI module 302 can present additional information regarding the IOI, or provide instructions on how to reach the IOI, etc. The SI module 302 can also confirm the user's selection by increasing the volume of the three-dimensional sound that announces the presence of the chosen IOI, or by otherwise making that sound more prominent in the user's experience.

Finally, the orientation module 432 operates by determining the current location of the user in the manner described above. It then defines a three-dimensional volume around the user. For example, the three-dimensional volume may correspond to a cylinder or sphere or box or rectangle (for example), with the user located at the center of the volume. The orientation module 432 then uses the RID module 426 to identify the set of IOIs that exist within the volume, if any. The orientation module 432 then uses the sound generation module 414 to read off the IOIs in any order.

For example, in FIG. 43, the orientation module 432 defines a three-dimensional volume having the shape of a cylinder, with the user positioned at its center at a current location 4302. The orientation module 432 uses the RID module 426 to identify the IOIs that lie within the cylinder or are otherwise associated with the space defined by the cylinder. Then the orientation module 432 reads off the IOIs in any order. For example, consider a user who visits a mall having three floors. Assume that the user is standing in the open-air atrium on the first floor of the mall. The orientation module 432 can read off the IOIs that it finds on a floor-by-floor basis, e.g., floor $z_1$, floor $z_2$, and then floor $z_3$. The orientation module 432 can announce the IOIs on each floor in any order, such as a clockwise order, a counterclockwise order, etc. The user may then optionally select any IOI in any of the ways described above.

As closing comment, the above explanation set forth the use of three-dimensional sounds to announce the presence of contextual IOIs, such as restaurants, etc. But the SI module 302 can use three-dimensional sounds to announce the presence of any types of IOIs, such as warning IOIs and journey IOIs. For example, the SI module 302 can generate a warning regarding a pothole in the road that appears to emanate from the location of the pothole. As another clarification, the SI module 302 can also deliver many types of IOIs in a flat or non-spatial manner. For example, the SI module 302 can produce another warning IOI that has no directivity to generally notify the user that the road on which he is currently traveling is slick due to rain.

Further, the above description was predicated on the use of sound that the user perceives as originating from locations in physical space. In addition, or alternatively, the haptic cue generation module 418 can generate vibration cues which convey directional information. For example, the headset 108 can include two or more vibration mechanisms, e.g., a first vibration mechanism on the left side of its frame 602 and a second vibration mechanism on the right side of its frame 602. The haptic cue generation module 418 can activate either the first or second vibration mechanism to provide instructions to the user to turn left or right, respectively. This type of instruction can include additional gradations by including additional vibration mechanisms. The same effect can be achieved by activating different vibration mechanisms on the user device 106, e.g., by activating a left-side vibration mechanism to provide a cue to turn left, and a right-side vibration mechanism as a cue to right. The vibration mechanisms can be coupled to yet other devices or parts of the user's body.

Figure 44:
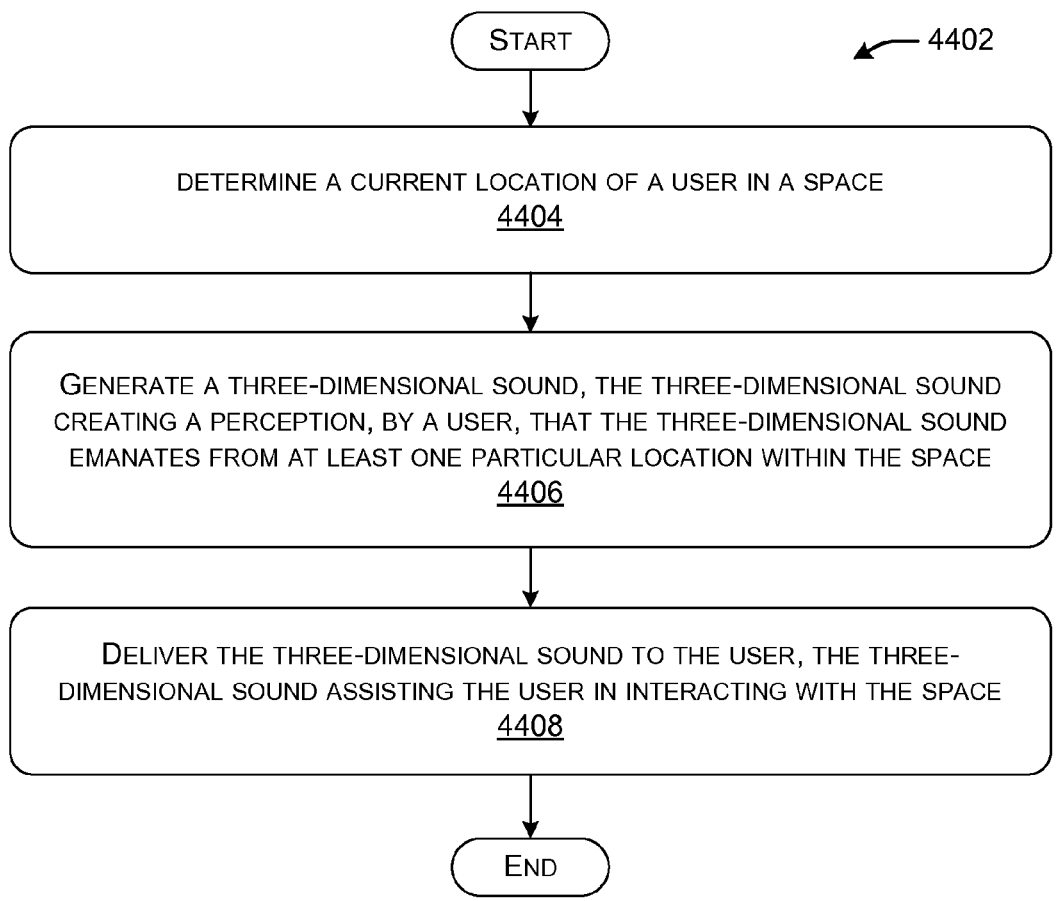
FIG. 44 is a flowchart that describes the use of three-dimensional sounds to assist the user in interacting with a space.

FIG. 44 shows a process 4402 that describes a use of three-dimensional sounds to guide the user in navigating along a desired route. In block 4404, the SI module 302 determines a current location of a user along a route, within the space. In block 4406, the SI module 302 generates a three-dimensional sound. The three-dimensional sound creates a perception, by the user, that the three-dimensional sound emanates from at least one particular location within the space. In block 4408, the SI module 302 delivers the three-dimensional sound to the user. The three-dimensional sound assists the user in navigating along the route.

Figure 45:
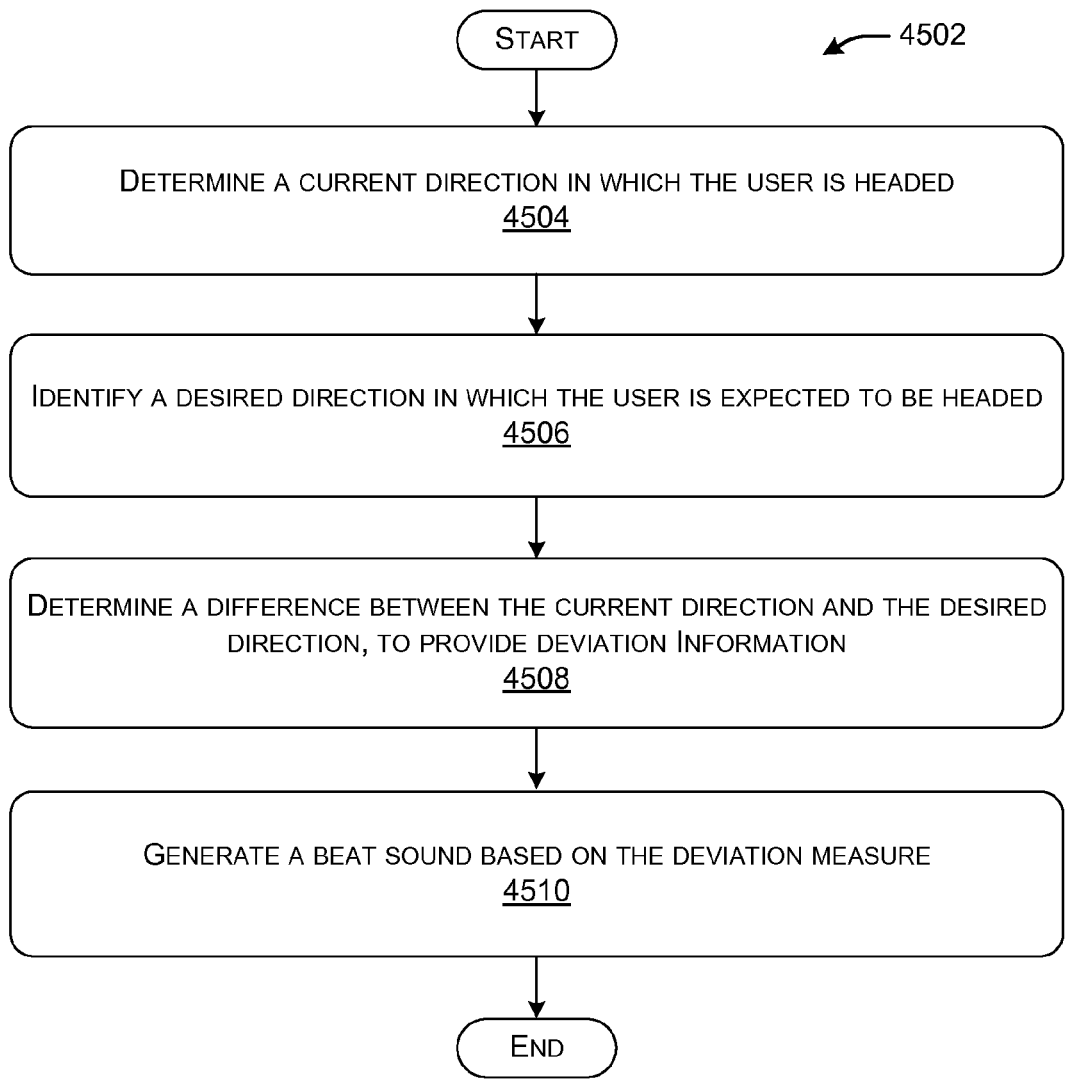
FIG. 45 is a flowchart that describes one manner in which the path guidance module (of FIGS. 4 and 41) may use the three-dimensional sounds to guide the user along a desired route.

FIG. 45 shows a process 4502 that describes one manner in which the path guidance module 420 may use the three-dimensional sounds to guide the user along a desired route. In block 4504, the path guidance module 420 determines a current direction in which the user is headed. In block 4506, the path guidance module 420 identifies a desired direction in which the user is expected to be headed. In block 4508, the path guidance module 420 determines a difference between the current direction and the desired direction, to provide deviation information. In block 4510, the path guidance module 420 uses the sound generation module 414 to generate a periodic three-dimensional sound (e.g., a beat sound), based on the deviation information. That three-dimensional sound directs the user towards the desired direction. The three-dimensional sound may have one or more properties (such as tone) which depend on the extent to which the user has deviated from the desired direction.

Figure 46:
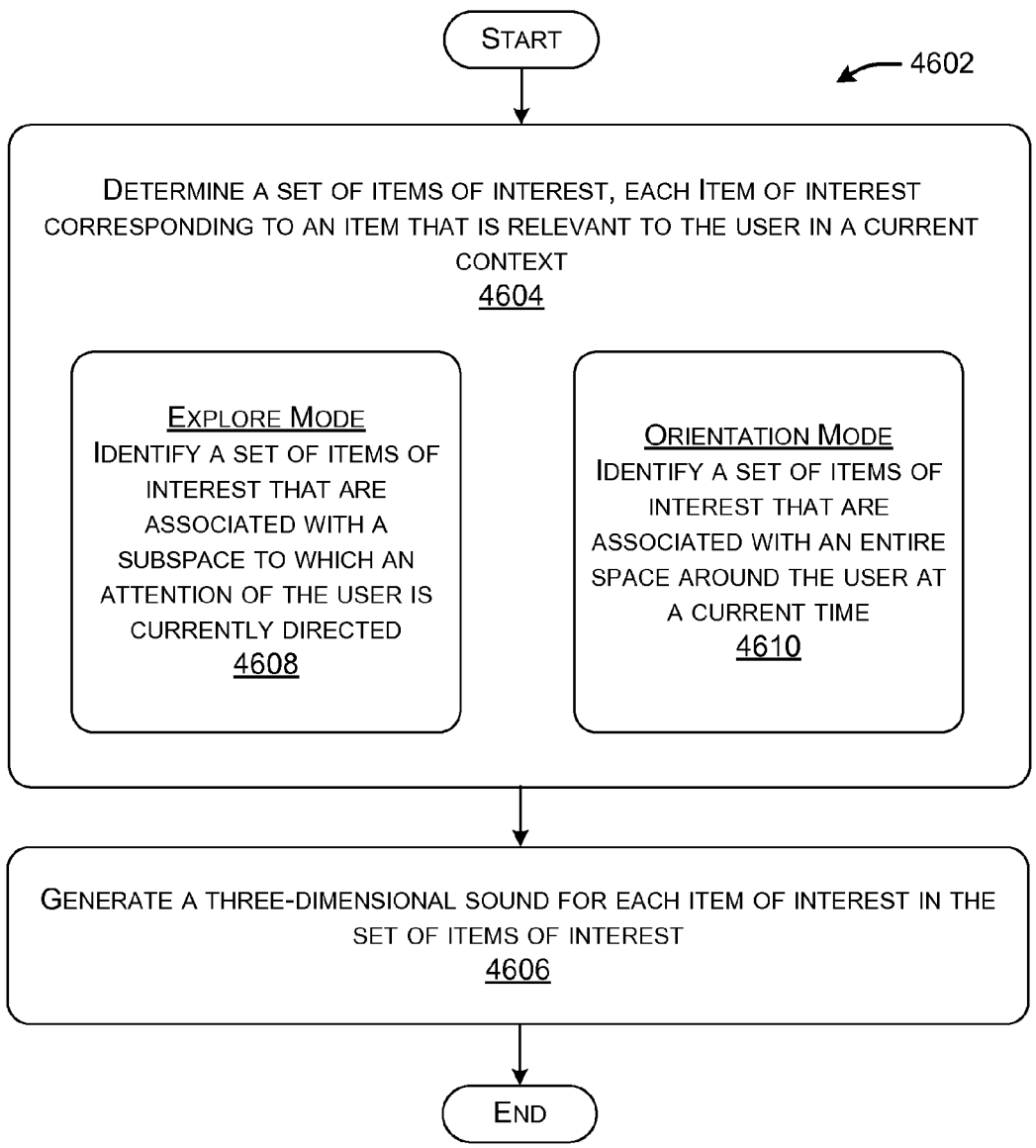
FIG. 46 is a flowchart that describes one manner in which the space interaction module can use three-dimensional sounds to identify IOIs, e.g., in an automated mode (e.g., while the user traverses a route or otherwise moves in space), in an explore mode, or in an orientation mode.

FIG. 46 shows a process 4602 that describes one manner in which the SI module 302 can use three-dimensional sounds to identify and announce IOIs. In block 4604, the SI module 302 determines a set of items of interest (IOIs), each item of interest corresponding to an entity or event or piece of information that is relevant to the user in a current context. In block 4606, the SI module 302 generates a three-dimensional sound for each item of interest. The user will perceive the sound as originating from the same physical location (or locations) that, in turn, is associated with the item of interest, e.g., by perceiving a sound associated with a store as emanating from the location of the store.

In one case, the SI module 302 can apply the process 4602 as a background service as the user traverses a route. For example, the RID module 426 can alert the user to the existence of IOIs when the user draws sufficiently close to the locations associated with these IOIs, as governed by any distance-based parameter setting.

In another scenario, as indicated in block 4608, the exploration module 430 may apply the above general process 4602 by using the RID module 426 to identify a set of IOIs that are associated with a subspace to which an attention of the user is current directed, or presumed to be currently directed. In another scenario, as indicated in block 4610, the orientation module 432 can apply the above general process 4602 by using the RID module 416 to identify a set of IOIs that are associated with an entire space around the user at the current time, without reference to the user's current focus of interest (because the user is now interested in the complete volume of space around him or her at the moment). The user can invoke and suspend the readout of the exploration module 430 or the orientation module 432 by issuing appropriate instructions, e.g., via the headset 108 or the user device 106.

As a final topic, the above examples were based on the simplifying assumption that the position of the virtual sound-producing entity (e.g., the virtual sound source) in space is stable relative to the location of the listener, at least over the course of the delivery of the three-dimensional sound. This may be a valid assumption in many cases, but it may not hold true for all situations.

For example, consider the following scenarios. In a first case, a user may listen to a three-dimensional sound that describes (or otherwise relates to) a fixed-position entity, as the user passes the entity in a vehicle of any type (e.g., on a train). For example, the user may listen to a message that describes Seattle's Space Needle tower as the user is traveling as a passenger in a car, in any direction relative to the Space Needle. In a second case, the may listen to a three-dimensional sound that describes (or otherwise relates to) a fixed-position entity, as the user stands still, but nevertheless moves his or her head about, such that the position of the user's left and right ears are changing relative to the location of the fixed-position entity. In a third case, a user may listen to a three-dimensional sound that describes (or otherwise relates to) an in-motion entity, relative to a fixed position of the listener. For example, the user may listen to a message that announces the arrival of an airplane that is moving down a runway, while the user remains at a fixed position in the airport's terminal. In a fourth case, both the location of an IOI and the user may be in motion during the delivery of the audio information.

Further note that an IOI need not always correspond to a physical entity, such as the Space Needle or a moving airplane. For example, a moving "virtual" IOI may correspond to a virtual billboard which delivers a spatial message that the user perceives as moving down the street towards the entrance of a nightclub, enticing the user to enter that establishment. Further, everything that is set forth herein with respect to sounds associated with IOIs applies equally to other sounds, such as the periodic beat sound.

To address any of the above situations, the SI module 302 can dynamically update the three-dimensional audio information that it is producing over the course of its delivery, to reflect, at each instance of time, the relative position between the user's head and the IOI (e.g., the location of the Space Needle or the moving airplane, in the examples cited above). The SI module 302 can perform this task in different ways. In one non-limiting approach, the SI module 302 can perform the following operations in an iterative process over the delivery of the audio information: (a) determine the position of the user's head relative to the IOI, to provide relative position information; (b) select an HRTF (per ear) based on the relative position information; (c) convolve whatever audio information is to be delivered at the current time by the selected HRTF, to produce a three-dimensional sound that is suitable based on the relative position information.

To cite one specific example, consider a message that takes five seconds to deliver to the user. The SI module 302 can determine, for each second of that delivery, the relative position between the user's head and the IOI. The SI module 302 can use that information to produce a three-dimensional sound for each second of the message's delivery that is based on the relative position between the user's head and the IOI at that instance of time.

More generally, the above iterative processing can be performed at different update rates. The update rate may depend on the rate at which the relative position between the listener and the IOI changes. That is, the SI module 302 can update the HRTFs at a relatively quick rate for large relative changes to the relative position information, and at a slower rate for slower changes. The update rate may also take into consideration the amount of processing resources that are available in the system 102 to update the three-dimensional sound information.

The SI module 302 can also apply various techniques that are designed to expedite the above dynamic processing (which may represent a large processing burden on its resources). For example, in some cases, the system 102 can pre-compute a dynamic sound for at least one predicted trajectory; each such trajectory defines some type of expected relative movement between a listener and the IOI, due to: (a) the movement of the listener in space; or (b) the movement of the IOI in space; or (c) the movement of both the listener and the IOI. For example, assume that a train passes by an IOI at generally the same speed each day. In this case, it is possible to pre-calculate a three-dimensional sound (per ear) that is predicated on a dynamically-changing HRTF. That three-dimensional sound takes into account a presumed progression of the user's head as the train moves down the tracks, and may be based on the simplifying assumption that the user's head has a predetermined fixed orientation as the user moves down the tracks. The SI module 302 can launch that three-dimensional sound when it detects that a listener's position reaches a predetermined triggering location relative to the IOI, such as a location along the tracks that is a predetermined distance from the IOI.

The above manner of operation can be expanded to account for different scenarios. For example, the system 102 can pre-compute different dynamic three-dimensional sounds to take account for different train speeds, different fixed head orientations (e.g., indicating whether the user is looking straight ahead during the delivery of the message, or looking out the window, etc.), and so on.

The above situation can also be extended to a more general setting in which the movement between the user and an IOI can be decomposed into a number of possibilities, allowing for the pre-calculation of respective dynamic three-dimensional sounds for these possibilities. The SI module 302 can then launch any pre-calculated sound when it determines that the user's current context matches one of the predetermined possibilities.

In another case, the SI module 302 can dynamically perform processing to predict the movement of the user relative to the location of an IOI, e.g., on the basis of the user's current heading. The SI module 302 can then dynamically pre-compute a three-dimensional sound based on a projected trajectory of the user relative to the IOI.

Still other techniques can be used to expedite the computation of dynamically-changing three-dimensional sounds. In some implementations, for instance, the SI module 302 can draw on the enhanced processing capabilities of the remote processing resources 112, e.g., by leveraging parallel processing performed by those resources 112.

In summary, the above features contribute to the above-stated goal of allowing the user to efficiently, safely, and enjoyably move through his or her environment. For instance, the features provide the user with different categories of information as the user traverses the environment, using different modes of presentation. The functionality presents this information to the user in a user-friendly manner that avoids overwhelming the user with too much information at any given time. The use of three-dimensional sounds further enhances the ability of the user to understand the nexus between the information that is provided and objects, regions, and events in the environment.

E. Use of Beacons for Assistance to Users in Interacting with their Environments The following section provides additional information regarding the operation of the beacon-based guidance module 422. To repeat, the beacon-based guidance module 422 provides a strategy for guiding the user through a space by leveraging the use of beacons having defined respective ranges. The space may correspond to an indoor space, e.g., a space defined by the interior of one or more buildings or structures of any type. Alternatively, or in addition, the space may correspond to an outdoors space.

The beacons may emit electromagnetic radiation of any type, such as radio waves, infrared waves, etc. In other cases, the beacons may emit sound waves (e.g., in the ultrasound range). Further, in some cases, the beacons may generate signals according any protocol or combination of protocols, such as the BLUETOOTH protocol, the Wi-Fi protocol, etc. For example, without limitation, the beacons may correspond to BLUETOOTH Low Energy (BLE) beacons. Further, a beacon can have a range of any desired depth, to best suit the target environment in which it is deployed. In some indoor settings, for example, beacons are chosen having relatively short ranges, e.g., ranges of one or more meters. In some cases, a beacon's stated range may be based on the implicit or explicitly-stated assumption that its signals are to be detected by a particular type of user device (such as a particular smartphone), or a particular class of user devices (such as a particular class of smartphones), which have known and stable signal-receiving characteristics.

In yet another case, each beacon is a passive device (such as a passive RFID) that may be interrogated by the user device 106 (or some other interrogating device) when that device is within a prescribed distance to the beacon. That prescribed distance corresponds to the range of the device. However, to facilitate explanation, the remaining description will assume that each beacon actively emits a signal.

In one implementation, each beacon possesses a code which defines it identity. The beacon may constantly or periodically (or in an on-demand manner) emit signals that announce its code (and/or any other application-specific information), which may be detected by receiving devices within the range of the beacon. For example, consider a BLE beacon that has a range of about one meter. A receiving device that lies within that range may detect the beacon's signal and read its particular code.

Figure 47:
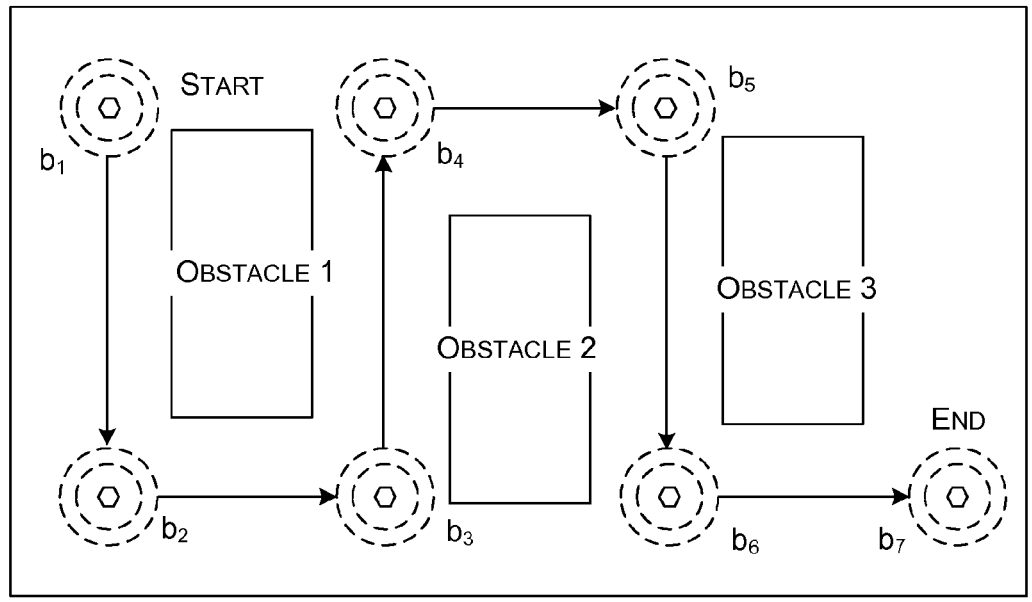
FIG. 47 shows an environment having a plurality of beacons. In one illustrative implementation, the beacons produce non-overlapping ranges in which their respective signals may be detected by a user who moves across the environment or otherwise interacts with the environment.

In the example of FIG. 47, an indoor (and/or outdoor) environment is characterized by a collection of corridors and obstacles (e.g., obstacle 1, obstacle 2, and obstacle 3). This scenario involves pre-populating the environment with a collection of beacons (e.g., beacons $b_1$, $b_2$, ... $b_7$), e.g., by placing the beacons at every intersection of two or more corridors. The outmost dashed-line circle surrounding each beacon represents the range of the beacon. As noted above, a receiving device that lies within the range of a beacon can successfully detect the beacon; otherwise, the receiving device will have no knowledge of the beacon. Note that, in one illustrative implementation, the ranges of the beacons do not overlap. This characteristic is advantageous because it eliminates any ambiguity as to the location of the user at any given time. In other words, the user's device cannot simultaneously detect two or more beacons, because the ranges of these beacons do not overlap, and the user cannot simultaneously exist at two places at the same time. In some environments, the non-overlapping nature of the beacon ranges may be ensured by also taking into consideration the nature of the user device (or class of devices) that will be receiving the signals emitted from the beacons.

As a first preliminary step, the locations of all beacons in the environment of FIG. 47 may be loaded in the data store 424. The data store 424 may also store the codes associated with those beacons.

As a second preliminary step, the system 102 can use any route planning tool to generate a route through the environment of FIG. 47. The route planning tool can apply any algorithm to perform this task. For example, the routing planning tool can express the search space defined by the corridors and obstacles as a graph having a plurality of nodes and links. That is, the links represent corridors and the nodes represent intersections of corridors. The routing planning tool can then use any algorithm (such as the well-known Dijkstra's algorithm) to find the most efficient path through the graph. Once the route is defined, the beacon-based guidance module 422 can identify a subset of beacons (referred to herein as route-specific beacons) that will be traversed by the user in traveling the route, and store the identities of those beacons. In the case of FIG. 47, the user is expected to encounter all of the beacons, but this is generally not the case (to be clarified below).

Now assume that the user embarks on the route using the above-described system 102 as guidance. The system 102 may provide real-time guidance to the user in the manner described above via the headset 108 and/or the user device 106. In this case, however, the system 102 uses a different technique to determine the user's current location at each time, compared to techniques described above.

More specifically, the beacon-based guidance module 422 constantly scans the environment to determine whether the user is in the range of any beacon. If so, the beacon-based guidance module 422 identifies the current location of the user as the current location of the beacon that has been detected. In other words, the beacon-based guidance module 422 knows, a priori, the code associated with the detected beacon and its location in the environment. If the user's headset 108 or user device 106 detects the presence of that beacon (based on the code conveyed by the detected signal), then the beacon-based guidance module 422 may make the assumption that the user has the same location as the detected beacon.

At this juncture, the beacon-based guidance module 422 can leverage the services of the path guidance module 420 to direct the user in the desired direction using a three-dimensional sound and/or based on other guidance information (such as a non-three-dimensional sound, displayed instructions, etc.). For example, assume that the user's user device 106 detects that it is in the range of beacon $b_4$. The path guidance module 420 will determine, based on the predetermined journey information, that the next waypoint along the user's journey corresponds to the beacon $b_5$. The path guidance module 420 can then generate a three-dimensional sound which the user will perceive as originating from the right side of the user, which serves to direct the user towards the next waypoint (e.g., beacon $b_5$). The user will interpret this cue as an instruction that he or she should turn to the right. The user will continue in this direction until he or she encounters another beacon (e.g., beacon $b_5$), at which time the direction of the user may be updated.

Figure 48:
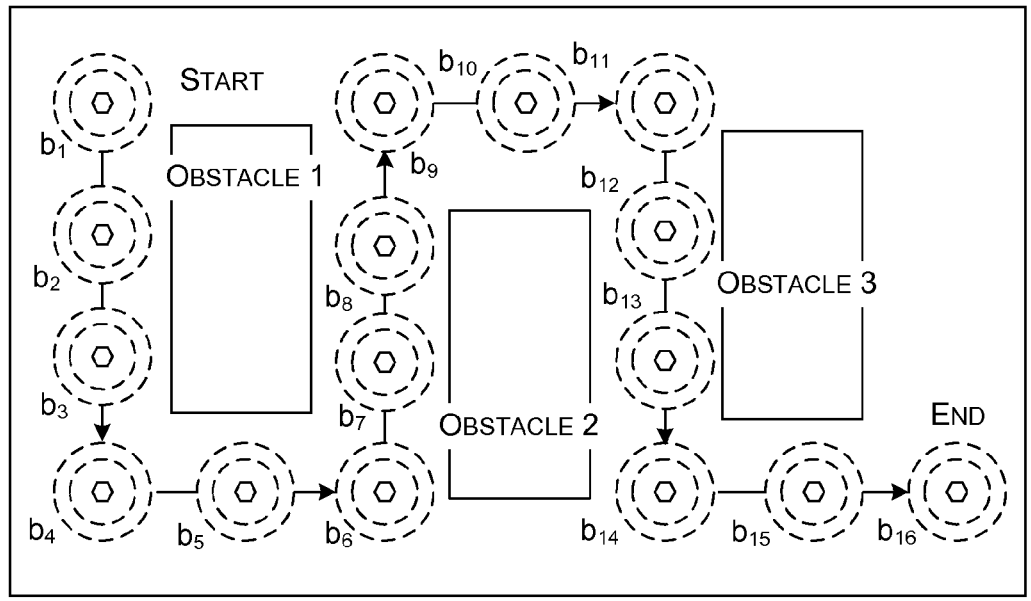
FIGS. 48-50 show other environments, each having a greater number of beacons compared to the example of FIG. 47.

In some cases, a user may deviate in an unexpected manner from a planned path in such a manner that he or she falls outside the range of the beacon that he or she was expected to encounter next. FIG. 48 represents one manner of addressing this situation. The strategy there is to increase the number of beacons along the planned route of the user, which has the effect of increasing the frequency at which the user's current position is assessed, and hence decreasing the potential that the user may wander off route (e.g., to the extent the he or she falls outside the range of a beacon that he or she is expected to encounter). Note that FIG. 48 shows only those beacons that the user is expected to traverse on the planned route. But the environment may include additional beacons (that are not shown) that the user is not expected to traverse.

The opportunity for a user to go significantly astray is not great in FIGS. 47 and 48, e.g., because the user's choices are significantly restricted by the obstacles. Nevertheless, a user may become confused and take a wrong turn, causing him to leave the planned route. Or the user may purposely decide to deviate from the planned path. For example, at the intersection associated with beacon $b_9$ in FIG. 48, the user may take a left turn rather than a right turn. The user may therefore eventually encounter an out-of-path beacon (not shown), which he is not expected to encounter.

The beacon-based guidance module 422 can address this situation in different ways. In one case, the beacon-based guidance module 422 can inform the user that guidance can no longer be provided to the user, because the user appears to have wandered off track, and it is no longer possible to determine the heading and intent of the user. The beacon-based guidance module 422 can also query the user whether he or she intends to pursue the original defined path through the environment.

In another case, if sufficient information can be obtained regarding the current location, heading, and intent of the user, the beacon-based guidance module 422 can direct the user back onto the planned route. For example, the beacon-based guidance module 422 can determine the direction that the user appears to be currently headed (although it appears to be wrong), by forming a trajectory based on a set of the user's most recent known positions. The beacon-based guidance module 422 can then use that heading information, together with information regarding the user's current position (if known), to steer the user back onto the planned route. Or the beacon-based guidance module 422 can query the user to determine whether he or she intends to still pursue the planned route, or select another route.

In any scenario, the beacon-based guidance module 422 can also rely on other evidence of the current location and heading of the user (in addition to information provided by the BLE beacons), when that information is available. For example, the beacon-based guidance module 422 can collect that information from GPS sensor sources, dead reckoning techniques, etc. In other cases, it is assumed that at least some of these additional sources are not available, or are not reliable.

Figure 49:
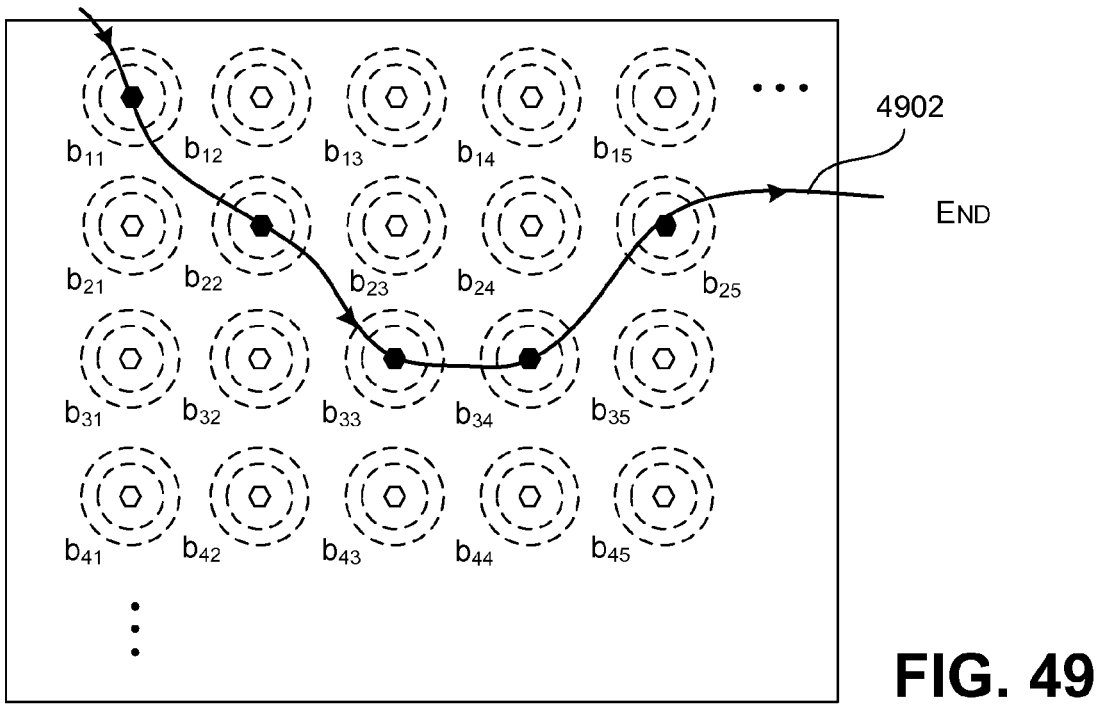

FIG. 49 describes another situation in which the space over which the user traverses is more open-ended, compared to the examples of FIGS. 47 and 48. The space is prepopulated with a collection of short-range beacons. For example, the space may be populated with a regular matrix of such beacons, if permitted by the physical characteristics of the space. The beacons have ranges that do not overlap with each other.

Again, a route planning tool may generate a route 4902 through the space based on any input objective, and using any route planning algorithm for this purpose. The beacon-based guidance module 422 then determines the beacons that the user is expected to traverse as he or she travels the planned route 4902. These beacons are represented as solid-black beacon symbols.

During the actual traversal of the route 4902, the beacon-based guidance module 422 performs the same function as described above. That is, when the beacon-based guidance module 422 determines that the user has entered the range of a beacon along the expected path (such as beacon $b_{22}$), then it accepts the location of that beacon as the current location of the user. It then recalculates the heading of the user and updates the three-dimensional beat sound (and/or other guidance information) to guide the user towards the next beacon (e.g., beacon $b_{33}$).

Figure 50:
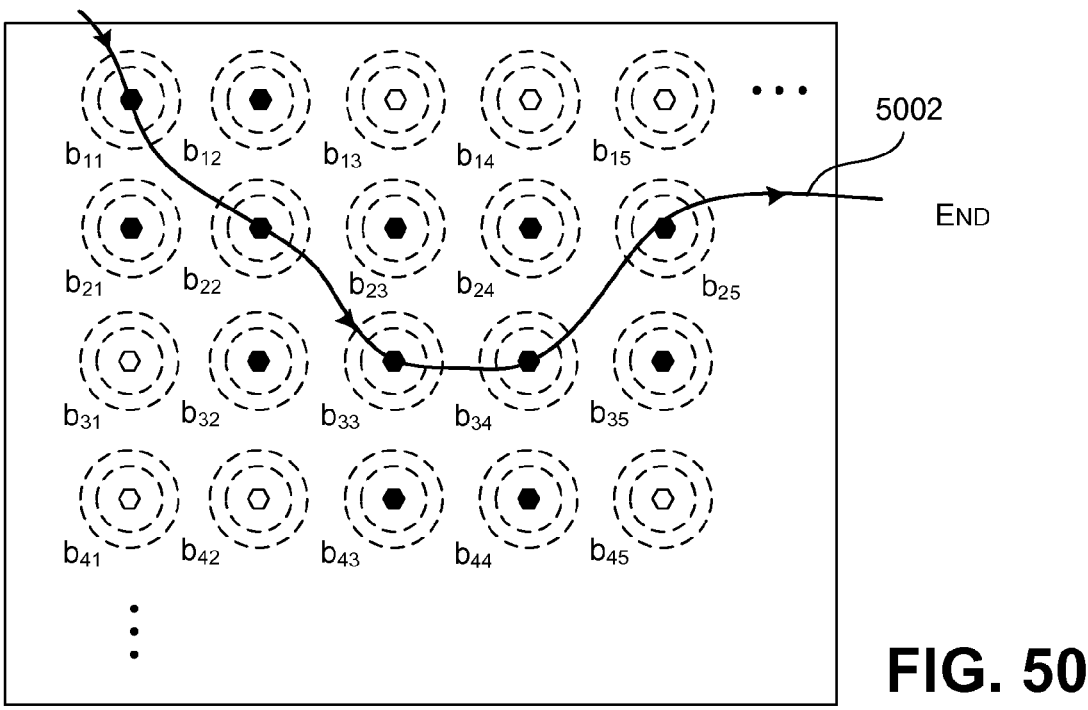

The risk that the user will veer off track in the case of FIG. 49 is greater than the case of FIG. 48 because the user is given more degrees of freedom in which the err. FIG. 50 describes one way of addressing this situation. Here, the beacon-based guidance module 422 defines the beacons (represented as solid-black beacon symbols) that the user may encounter along a planned route 5002 in a more general manner, e.g., by also encompassing neighboring beacons that lie to either side of the most optimal route 5002. The beacon-based guidance module 422 may continue to provide guidance to the user if he or she wanders into the range of these neighboring beacons, under the assumption that the user is still attempting to adhere to the planned route 5002, but has veered only slightly off course. The beacon-based guidance module 422 may only generate an error condition when the user wanders beyond the boundaries associated with outermost neighboring beacons.

In another implementation, the beacon-based guidance module 422 can form a postulate as to the desired destination of the user based on the beacons that the user has already encountered along his or her path, thus far. For instance, the beacon-based guidance module 422 can form a trajectory based on the locations of the beacons encountered thus far. The beacon-based guidance module 422 can then determine a likely intermediary or final destination to which the trajectory points, e.g., by extending the trajectory along its current direction. The beacon-based guidance module 422 can then ask the user whether he or she wishes to pursue a path toward the assumed destination. If so, then the beacon-based guidance module 422 can thereafter provide the same type of navigational assistance described above that helps the user reach the identified destination.

In any of the cases described herein, the beacon-based guidance module 422 can also take into consideration historical information regarding the user's previous travel habits, and/or historical information regarding the travel habits of others (with respect to a specified environment). That information, when available, may provide further evidence of the user's intent in reaching a desired destination.

Figure 51:
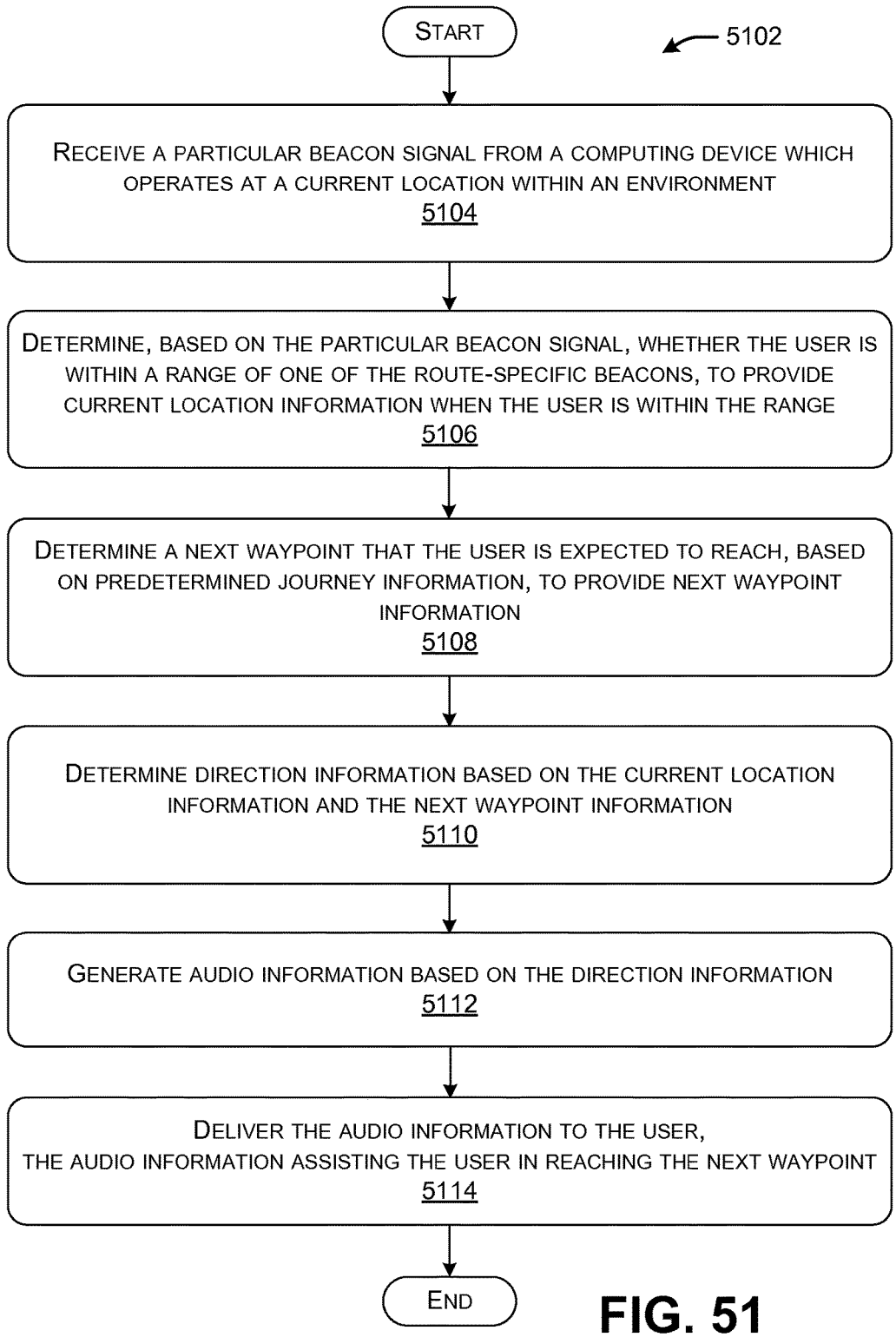
FIG. 51 is a flowchart that shows one manner of operation of a beacon-based guidance module, within the context of the types of environments of FIGS. 47-50.

FIG. 51 shows a process 5102 that describes one manner of operation of the beacon-based guidance module 422, e.g., within the context of the types of environments of FIGS. 47-50. In block 5104, the beacon-based guidance module 422 receives a particular beacon signal from a sensor (or sensors) of a computing device which operates at a current location within an environment. The computing device may correspond to the user device 108, or the headset 108, etc. As described above, the environment is populated with a plurality of beacons having, in one illustrative implementation, respective non-overlapping ranges. Further, as a preliminary step, a route planning module may have defined a desired route, which is described by journey information. Or the desired route can be generated in a dynamic manner as the user traverses the environment, based on assumptions that are made as to the intended intermediary or final destination of the user. In any case, that desired route traverses ranges associated with a route-specific set of beacons, from among the total set of beacons in the environment.

In block 5106, the beacon-based guidance module 422 determines, based on the particular beacon signal, whether the user is within a range of one of the route-specific beacons; this operation yields current location information when the user is within the range. In block 5108, the beacon-based guidance module 422 determines a next waypoint that the user is expected to reach, based on the predetermined journey information, to provide next waypoint information. In some cases, that next waypoint may correspond to the next beacon along the user's predetermined journey. In block 5110, the beacon-based guidance module 422 next determines direction information based on the current location information and the next waypoint information. The direction information reflects a direction that the user is advised to travel to reach the next waypoint. In block 5112, the beacon-based guidance module 422 generates audio information (and/or other guidance information) based on the direction information. In block 5114 the beacon-based guidance module 422 delivers the audio information to the user, e.g., as a three-dimensional beat sound. The audio information assists the user in reaching the next waypoint. The beacon-based guidance module 422 can perform the above functions with the assistance of the path guidance module 420 and the sound generation module 414.

Figure 52:
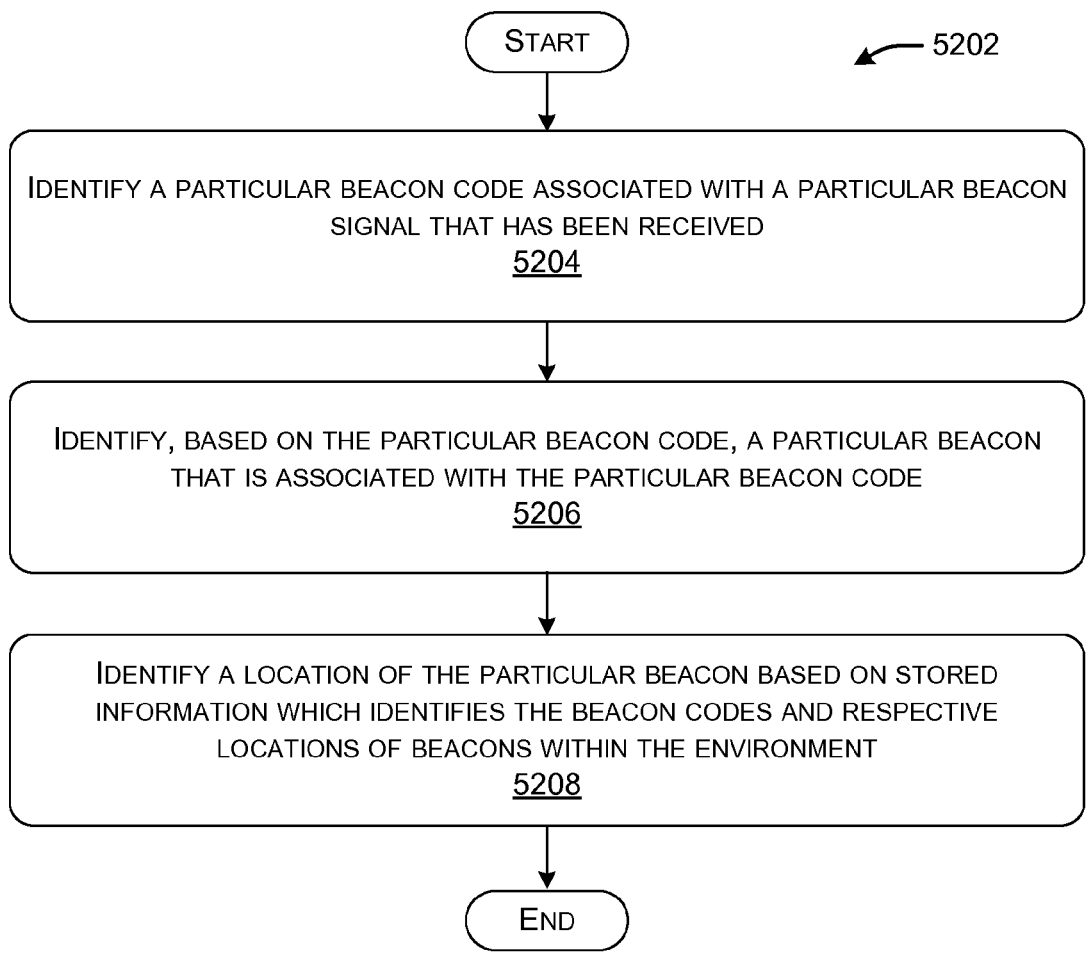
FIG. 52 is a flowchart that provides further details regarding one manner in which the beacon-based guidance module can determine the current location of the user within an environment.

FIG. 52 shows a process 5202 that provides further detail regarding one manner in which the beacon-based guidance module 422 can determine the current location of the user within an environment. In block 5204, the beacon-based guidance module 422 identifies a particular beacon code associated with a particular beacon signal that has been received. In block 5206, the beacon-based guidance module 422 identifies, based on the particular beacon code, a particular beacon that is associated with the particular beacon code. In block 5208, the beacon-based guidance module 422 identifies a location of the particular beacon based on stored information (in the data store 424) which identifies the beacon codes and respective locations of beacons within the environment.

In summary, the above features contribute to the above-stated goal of allowing the user to safely and efficiently move through his or her environment, particularly in those situations in which the user cannot rely on other modes of determining his or her location (e.g., based on the use of a satellite-based navigation system). In addition, the use of non-overlapping beacon ranges (according to one illustrative implementation) provides an efficient mechanism for disambiguating the location of the user, since the user cannot simultaneously exist within the ranges of two or more beacons at the same time.

In the above description of a first implementation, the assumption was made that the user device 106 (and/or the handset 108) receives, at any given time, a signal transmitted by either zero beacons or a single beacon, but not plural beacons. In other implementations, the above characteristic can be relaxed in different ways.

For instance, in a second implementation, the beacon-based guidance module 422 will conclude the user device 106 and/or the handset 108 is within range of a particular beacon if it receives a signal from that beacon having a signal strength that is above a prescribed threshold. But unlike the first implementation, the beacon-based guidance module 422 may also simultaneously receive weaker signals from one or more other beacons in the environment, where the strength of each of those signals is below the prescribed threshold. In this scenario, the environment is populated with beacons having positions such that, at any given time, the beacon-based guidance module 422 will receive either: (1) no signal having a signal strength that is above the threshold; or (2) just one signal having a signal strength that is above the threshold. In practice the second implementation functions in the same manner as the first and offers the same benefits, e.g., by providing a binary mechanism for disambiguating the location of the user at any given time, assuming that the user is within the range of one of the beacons. The beacons in the second implementation may therefore be considered as functionally or effectively non-overlapping due to the above behavior. And accordingly, any reference to "non-overlapping" as used herein is to be understood as encompassing both the case in which the beacons have ranges that literally do not overlap, as well as the case in which the ranges may be considered non-overlapping because the user device 106 and/or headset 108 can at most receive a signal from one beacon having a signal strength above the prescribed threshold.

In a third implementation, the beacon-based guidance module 422 may receive, at any given time, signals from any number of beacons having any arbitrary signal strengths. The set of signals (and strengths) at a particular location defines signal profile information for that location. In a preliminary operation, the beacon-based guidance module 422 can store signal profile information for each navigable location in the environment, e.g., constituting information regarding the signals and their respective strengths at that location. Collectively, the stored information constitutes a profile map of the environment. During navigation, the beacon-based guidance module 422 can determine the signals that it is receiving at a given time at a given location, to provide current signal profile information. Then, the beacon-based guidance module 422 can use the current signal profile information as a key to find the location having the closest matching signal profile information. That location defines the probable location of the user at the given time. In some environments, the strengths of the signals emitted by the beacons and/or the ability to detect those signals may vary over time for various environment-specific reasons. The beacon-based guidance module 422 can address this issue by comparing normalized versions of the signal profile information. Note that the positions of the beacons in the third implementation need not meet the non-overlapping constraints associated with the first or second above-described implementations.

F. Representative Computing Functionality

FIG. 53 shows computing functionality 5302 that can be used to implement any aspect of the system 102 set forth above. For instance, the type of computing functionality 5302 shown in FIG. 53 can be used to implement any of the user device 106, any of the remote processing resources 112, the processing equipment used by the headset 108, the separate user computing device 110, and so on. In all cases, the computing functionality 5302 represents one or more physical and tangible processing mechanisms.

The computing functionality 5302 can include one or more processing devices 5304, such as one or more central processing units (CPUs), and/or one or more graphical processing units (GPUs), and so on.

The computing functionality 5302 can also include any storage resources 5306 for storing any kind of information, such as code, settings, data, etc. Without limitation, for instance, the storage resources 5306 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 5302. The computing functionality 5302 may perform any of the functions described above when the processing devices 5304 carry out instructions stored in any storage resource or combination of storage resources.

As to terminology, any of the storage resources 5306, or any combination of the storage resources 5306, may be regarded as a computer readable medium. In many cases, a computer readable medium represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computing functionality 5302 also includes one or more drive mechanisms 5308 for interacting with any storage resource, such as a hard disk drive mechanism, an optical disk drive mechanism, and so on.

The computing functionality 5302 also includes an input/output module 5310 for receiving various inputs (via input devices 5312), and for providing various outputs (via output devices 5314). Illustrative input devices include a keyboard device, a mouse input device, a touch-sensitive input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), and so on. One particular output mechanism may include a presentation device 5316 and an associated graphical user interface (GUI) 5318. Other output devices include a printer, a model-generating mechanism, a tactile output mechanism, an archival mechanism (for storing output information), and so on. The computing functionality 5302 can also include one or more network interfaces 5320 for exchanging data with other devices via one or more communication conduits 5322. One or more communication buses 5324 communicatively couple the above-described components together.

The communication conduit(s) 5322 can be implemented in any manner, e.g., by a local area network, a wide area network (e.g., the Internet), point-to-point connections, etc., or any combination thereof. The communication conduit(s) 5322 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 5302 can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the following recitation summarizes respective aspects of the above-described system 102.

According to a first aspect, a system is described for assisting a user in interacting with a space. The system includes a headset for presenting audio information to the user as the user interacts with the space. The headset, in turn, has at least a set of input mechanisms for receiving commands from the user, the command invoking respective space-interaction-related functions to be performed by a space interaction module.

According to a second aspect, the headset uses a bone conducting mechanism to deliver the audio information to the user.

According to a third aspect, at least one command instructs the space interaction module to start a listening mode. In the listening mode, the space interaction module receives instructions that are verbalized by the user.

According to a fourth aspect, at least one command instructs the space interaction module to stop delivering the audio information.

According to a fifth aspect, at least one command instructs the space interaction module to repeat one or more prior-delivered items of audio information.

According to a sixth aspect, at least one command instructs the space interaction module to start an explore mode. In the explore mode, the space interaction module provides information regarding a set of items of interest that are associated with a subspace to which attention of the user is currently directed.

According to a seventh aspect, at least one command instructs the space interaction module to start an orientation mode. In the orientation mode, the space interaction module provides information regarding a set of items of interest that are associated with an entire space around the user, at a current time.

According to an eighth aspect, at least one command instructs the space interaction module to perform a more-information function. The space interaction module performs the more-information function by providing additional information regarding a topic associated with a previously delivered item of interest.

According to a ninth aspect, at least one input mechanism can invoke plural functions depending on a manner in which a user interacts with the input mechanism.

According to a tenth aspect, the space interaction module is implemented by the headset.

According an eleventh aspect, the headset further includes one or more of: a headset orientation determination mechanism for determining an orientation of the headset, to provide headset orientation information; a headset motion determination mechanism for determining a movement of the headset, to provide headset movement information; and/or a headset position determination mechanism for determining a position of the headset, to provide headset position information.

According to a twelfth aspect, the system further comprises at least one user computing device. The user computing device provides a display output mechanism for displaying information pertaining to interaction, by the user, with the space. The user computing device implements at least part of functionality associated with the space interaction module. Further, the headset includes a first communication mechanism for communicating with the user computing device, and the user computing device includes a second communication mechanism for communicating with the headset.

According to a thirteenth aspect, the user computing device is configured to perform processing based on the headset orientation information and/or the headset movement information and/or the headset position information to generate a result, and to forward the result to the headset.

According to a fourteenth aspect, the user computing device further includes: a device orientation determination mechanism for determining an orientation of the user computing device, to provide device orientation information; a device motion determination mechanism for determining a movement of the user computing device, to provide device movement information; and/or a device position determination mechanism for determining a position of the user computing device, to provide device position information.

According to a fifteenth aspect, the headset is configured to perform functions based on the device orientation information and/or the device movement information and/or the device position information, as supplied by the user computing device, when counterpart information is not available from the headset.

According to a sixteenth aspect, at least the headset and/or the user computing device is configured to receive information and/or to use functionality provided by an external computing device.

According to a seventeenth aspect, a method, implemented by a system, is described for assisting a user in interacting with a space. The method includes: receiving an instruction based on actuation, by the user, of at least one input mechanism that is coupled to a headset; performing a function based on the instruction, to provide an output result; and based on the output result, delivering audio information, via the headset, which assists the user in interacting with the space.

According to an eighteenth aspect, the operation of performing the function entails performing the function using a space interaction module that is implemented, at least in part, by the headset.

According to a nineteenth aspect, the operation of performing the function entails performing the function using a space interaction module that is implemented, at least in part, by a separate user computing device which is communicatively coupled to the headset.

According to twentieth aspect, a headset is described that includes: an audio output mechanism for presenting audio information that assists a user as the user interacts with a space; and a set of input mechanisms for receiving commands from the user, the commands invoking respective space-interaction-related functions to be performed by a space interaction module. At least one command instructs the space interaction module to start an explore mode, and at least one command instructs the space interaction module to start an orientation mode. In the explore mode, the space interaction module provides information regarding a set of items of interest that are associated with a subspace to which attention of the user is currently directed. In the orientation mode, the space interaction module provides information regarding a set of items of interest that are associated with an entire space around the user, at a current time.

A twenty-first aspect corresponds to any combination (e.g., any permutation or subset) of the above-referenced first through twentieth aspects.

According to a twenty-second aspect, one or more computing devices (and/or one or more headsets) are provided for implementing any of the first through twenty-first aspects.

According to a twenty-third aspect, a system is provided for implementing any of the first through twenty-first aspects.

According to a twenty-fourth aspect, one or more computer readable storage mediums are provided that include logic that is configured to implement any of the first through twenty-first aspects.

According to a twenty-fifth aspect, one or more means are provided for implementing any of the first through twenty-first aspects.

Further, in closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
   a headset configured to present audio information to a user as the user interacts with a space; and
   one or more processing devices provided on the headset or on a separate computing device,
   the headset comprising a set of input mechanisms configured to receive commands from the user invoking respective space-interaction-related functions to be performed by the one or more processing devices,
   one or more processing being configured to:
      when instructed by a specific command received from the user, enter an explore mode;
      while in the explore mode:
         identify an orientation of the headset;
         based at least on the orientation of the headset, identify a subspace to which the user is currently directing attention;
         identify specific items of interest within the subspace to which the user is currently directing attention; and
         cause the headset to generate corresponding sounds for the specific items of interest;
      when instructed by another specific command received from the user, enter an orientation mode; and
      while in the orientation mode:
         identify vertically-arranged items of interest outside of the subspace to which the user is currently directing attention;
         based at least on vertical relationships among the vertically-arranged items of interest, determine a specific order in which to announce the vertically-arranged items of interest; and
         cause the headset to generate, in the specific order, other corresponding sounds for the vertically-arranged items of interest.

2. The system of claim 1, wherein the headset uses a bone conducting mechanism to deliver the audio information to the user.

3. The system of claim 1,
   wherein the one or more processing devices are configured to:
   receive a further command instructing the system to start a listening mode;
   enter the listening mode responsive to the further command; and
   while in the listening mode, receive and follow instructions that are verbalized by the user.

4. The system of claim 1, wherein the one or more processing devices are configured to:
   receive a further command instructing the system to stop delivering the audio information; and
   stop delivering the audio information responsive to the further command.

5. The system of claim 1, wherein the one or more processing devices are configured to:

receive a further command instructing the system to repeat one or more prior-delivered items of audio information; and repeat the one or more prior-delivered items of audio information responsive to the further command.

6. The system of claim 1, wherein the sounds include a first three-dimensional sound identifying a first item of interest within the subspace and a second three-dimensional sound identifying a second item of interest within the subspace.

7. The system of claim 1, wherein the vertically-arranged items of interest are on different floors of a building.

8. The system of claim 7, wherein the one or more processing devices are configured to:
specify that the vertically-arranged items of interest are announced on a floor-by-floor basis.

9. The system of claim 1, wherein the one or more processing devices are configured to:
specify that the vertically-arranged items of interest are announced starting from a vertically lowest item of interest to progressively higher items of interest.

10. The system of claim 1, wherein the one or more processing devices are provided on the headset.

11. The system of claim 1, wherein the headset further includes:
a headset orientation determination mechanism configured to determine the orientation of the headset.

12. The system of claim 11, wherein the system further comprises at least one user computing device that includes the one or more processing devices.

13. The system of claim 12, wherein the user computing device and the headset are configured to communicate using short-range wireless radio transmission.

14. The system of claim 12, wherein the user computing device comprises a smartphone or a tablet-type computing device.

15. The system of claim 1, wherein the specific items of interest include a physical item of interest and a virtual item of interest.

16. A method comprising:
identifying an orientation of a headset worn by a user;
based at least on the orientation of the headset, identifying a search volume of interest to the user;
delivering audio information, via the headset, which identifies at least two different items of interest present in the search volume of interest to the user;
identifying vertically-arranged items of interest outside of the search volume;
based at least on vertical relationships among the vertically-arranged items of interest, determining a specific order in which to announce the vertically-arranged items of interest; and
delivering, via the headset and in the specific order, other audio information that identifies the vertically-arranged items of interest.

17. The method of claim 16, performed by the headset.

18. The method of claim 16, performed by a separate user computing device which is communicatively coupled to the headset.

19. A system comprising:
a wearable device having an audio output mechanism;
a processing device; and
logic which, when executed by the processing device, causes the processing device to:
determine an orientation of the wearable device;
based at least on the orientation of the wearable device, identify a search volume around the wearable device;
identify an item of interest that is located within the search volume;
cause the audio output mechanism of the wearable device to output a sound indicating that the item of interest is present in the search volume;
identify vertically-arranged items of interest outside of the search volume;
based at least on vertical relationships among the vertically-arranged items of interest, determine as specific order in which to announce the vertically-arranged items of interest; and
cause the audio output mechanism of the wearable device to output, in the specific order, other sounds identifying the vertically-arranged items of interest.

20. The system of claim 19, the search volume comprising an angular swath of less than 180 degrees.

21. The system of claim 19, wherein the logic, when executed by the processing device, causes the processing device to:
identify a cylindrical volume around the system, the cylindrical volume including an area not encompassed by the search volume; and
identify the vertically-arranged items of interest within the cylindrical volume.

* * * * *

UNITED STATES PATENT AND TRADEMARK OFFICE
CERTIFICATE OF CORRECTION

PATENT NO. : 9,977,573 B2
APPLICATION NO. : 14/690422
DATED : May 22, 2018
INVENTOR(S) : Ermilov et al.

It is certified that error appears in the above-identified patent and that said Letters Patent is hereby corrected as shown below:

Column 62, Line 22, "one or more processing being configured to:" should read --the one or more processing devices being configured to:--.

Signed and Sealed this
Twenty-first Day of August, 2018

Andrei Iancu
*Director of the United States Patent and Trademark Office*